(12) United States Patent
Westwood et al.

(10) Patent No.: US 12,237,548 B2
(45) Date of Patent: Feb. 25, 2025

(54) STACK OF ELECTRIC BATTERIES INCLUDING SERIES OF FLUIDLY CONNECTED UNIT CELLS

(71) Applicant: FORM ENERGY INC., Somerville, MA (US)

(72) Inventors: Mitchell Terrance Westwood, Boston, MA (US); Alexander H. Slocum, Bow, NH (US); William Henry Woodford, Cambridge, MA (US); Yet-Ming Chiang, Weston, MA (US); Ian Salmon McKay, Seattle, WA (US); Mateo Cristian Jaramillo, San Francisco, CA (US); Eric Weber, Pittsburgh, PA (US); Jarrod David Milshtein, Cambridge, MA (US); Liang Su, Medfield, MA (US); Rupak Chakraborty, Brookline, MA (US); Rachel Elizabeth Mumma, Somerville, MA (US); Marc-Antoni Goulet, Somerville, MA (US); Brian Beggan, Boston, MA (US); Marco Ferrara, Boston, MA (US); Theodore Alan Wiley, Somerville, MA (US)

(73) Assignee: FORM ENERGY, INC., Somerville, MA (US)

(*) Notice: Subject to any disclaimer, the term of this patent is extended or adjusted under 35 U.S.C. 154(b) by 0 days.

(21) Appl. No.: 16/457,253

(22) Filed: Jun. 28, 2019

(65) Prior Publication Data

US 2020/0006745 A1    Jan. 2, 2020

Related U.S. Application Data

(60) Provisional application No. 62/692,375, filed on Jun. 29, 2018.

(51) Int. Cl.
*H01M 50/636* (2021.01)
*H01M 50/152* (2021.01)
(Continued)

(52) U.S. Cl.
CPC ....... *H01M 50/152* (2021.01); *H01M 50/184* (2021.01); *H01M 50/191* (2021.01);
(Continued)

(58) Field of Classification Search
CPC .. H01M 50/636; H01M 50/152; H01M 50/54; H01M 50/183; H01M 50/46; H01M 50/411
(Continued)

(56) References Cited

U.S. PATENT DOCUMENTS 2,083,364 A    6/1937  Cook, Jr. et al.
2,643,276 A    6/1953  Salauze
(Continued)

FOREIGN PATENT DOCUMENTS

CN    1233861 A    11/1999
CN    1535489 A    10/2004
(Continued)

OTHER PUBLICATIONS

"Low." Lexico.com US Dictionary, Oxford University Press, https://www.lexico.com/en/definition/low. Accessed Oct. 13, 2021. (Year: 2021).*
(Continued)

*Primary Examiner* — Sean P Cullen
(74) *Attorney, Agent, or Firm* — The Marbury Law Group PLLC

(57) ABSTRACT

Systems and methods of the various embodiments may provide a battery including a rolling diaphragm configured to move to accommodate an internal volume change of one or more components of the battery. Systems and methods of
(Continued)

the various embodiments may provide a battery housing including a rolling diaphragm seal disposed between an interior volume of the battery and an electrode assembly within the battery. Various embodiments may provide an air electrode assembly including an air electrode supported on a buoyant platform such that the air electrode is above a surface of a volume of electrolyte when the buoyant platform is floating in the electrolyte.

2 Claims, 37 Drawing Sheets

(51) Int. Cl.
| | |
|---|---|
| *H01M 50/183* | (2021.01) |
| *H01M 50/184* | (2021.01) |
| *H01M 50/191* | (2021.01) |
| *H01M 50/411* | (2021.01) |
| *H01M 50/46* | (2021.01) |
| *H01M 50/54* | (2021.01) |
| *H01M 50/414* | (2021.01) |
| *H01M 50/417* | (2021.01) |
| *H01M 50/426* | (2021.01) |
| *H01M 50/429* | (2021.01) |
| *H01M 50/491* | (2021.01) |

(52) U.S. Cl.
CPC ........... *H01M 50/46* (2021.01); *H01M 50/54* (2021.01); *H01M 50/636* (2021.01); *H01M 50/414* (2021.01); *H01M 50/417* (2021.01); *H01M 50/426* (2021.01); *H01M 50/429* (2021.01); *H01M 50/491* (2021.01)

(58) Field of Classification Search
USPC .................................. 429/171, 402, 403, 405
See application file for complete search history.

(56) References Cited

U.S. PATENT DOCUMENTS

| | | |
|---|---|---|
| 2,683,182 A | 7/1954 | Salauze |
| 3,219,486 A | 11/1965 | Salcedo et al. |
| 3,223,611 A | 12/1965 | Kergan et al. |
| 3,329,530 A | 7/1967 | Yutaka et al. |
| 3,338,746 A | 8/1967 | Gunther et al. |
| 3,363,570 A | 1/1968 | Scott |
| 3,415,689 A | 12/1968 | Carson, Jr. et al. |
| 3,483,036 A | 12/1969 | Gregor et al. |
| 3,484,291 A | 12/1969 | MacKenzie et al. |
| 3,489,610 A | 1/1970 | Berger et al. |
| 3,525,643 A | 8/1970 | Spahrbier et al. |
| 3,532,548 A | 10/1970 | Stachurski et al. |
| 3,615,843 A | 10/1971 | Moran |
| 3,615,844 A | 10/1971 | Spengler |
| 3,650,837 A | 3/1972 | Palmer |
| 3,686,225 A | 8/1972 | Pedersen et al. |
| 3,713,892 A | 1/1973 | Moran |
| 3,716,413 A | 2/1973 | Eisner |
| 3,717,505 A | 2/1973 | Unkle, Jr. et al. |
| 3,728,244 A | 4/1973 | Cooley et al. |
| 3,785,868 A | 1/1974 | Devitt |
| 3,801,376 A | 4/1974 | Lindstrom |
| 3,822,149 A | 7/1974 | Hale et al. |
| 3,840,455 A | 10/1974 | Cooley et al. |
| 3,847,603 A | 11/1974 | Fukuda et al. |
| 3,850,696 A | 11/1974 | Summers et al. |
| 3,886,426 A | 5/1975 | Daggett |
| 3,888,877 A | 6/1975 | Lehn |
| 3,902,916 A | 9/1975 | Warszawski |
| 3,919,062 A | 11/1975 | Lundquist, Jr. et al. |
| 3,945,849 A | 3/1976 | Hoffman |
| 3,947,292 A | 3/1976 | Jackovitz et al. |
| 3,965,116 A | 6/1976 | Cram |
| 3,966,766 A | 6/1976 | Fehn |
| 3,972,727 A | 8/1976 | Cohn |
| 4,001,212 A | 1/1977 | Richman |
| 4,001,279 A | 1/1977 | Cram |
| 4,007,059 A | 2/1977 | Witherspoon et al. |
| 4,054,725 A | 10/1977 | Tuburaya |
| 4,076,600 A | 2/1978 | Huebner |
| 4,117,205 A | 9/1978 | Kitai |
| 4,119,772 A | 10/1978 | Peters et al. |
| 4,132,837 A | 1/1979 | Soffer |
| 4,139,679 A | 2/1979 | Appleby et al. |
| 4,168,349 A * | 9/1979 | Buzzelli ................. H01M 12/08 429/405 |
| 4,201,653 A | 5/1980 | O'Neill et al. |
| 4,246,324 A | 1/1981 | de Nora et al. |
| 4,250,236 A | 2/1981 | Haschka et al. |
| 4,265,789 A | 5/1981 | Christopherson et al. |
| 4,312,927 A | 1/1982 | Salmon |
| 4,317,863 A | 3/1982 | Struthers |
| 4,331,460 A | 5/1982 | Dillmann et al. |
| 4,336,043 A | 6/1982 | Aonuma et al. |
| 4,340,449 A | 7/1982 | Srinivasan et al. |
| 4,369,235 A | 1/1983 | Bursell |
| 4,375,427 A | 3/1983 | Miller et al. |
| 4,384,928 A | 5/1983 | Hall |
| 4,385,101 A | 5/1983 | Catanzarite |
| 4,385,967 A | 5/1983 | Brady et al. |
| 4,386,141 A | 5/1983 | Weidner et al. |
| 4,447,504 A | 5/1984 | Goebel |
| 4,448,858 A | 5/1984 | Graf et al. |
| 4,450,211 A | 5/1984 | Vignaud |
| 4,461,817 A | 7/1984 | Itoh et al. |
| 4,479,856 A | 10/1984 | Ando |
| 4,484,936 A | 11/1984 | Sakai |
| 4,485,154 A | 11/1984 | Remick et al. |
| 4,487,818 A | 12/1984 | Ovshinsky et al. |
| 4,521,497 A | 6/1985 | Tamminen |
| 4,535,039 A | 8/1985 | Naarmann et al. |
| 4,552,630 A | 11/1985 | Wheeler et al. |
| 4,581,064 A | 4/1986 | Morrison et al. |
| 4,585,710 A | 4/1986 | McEvoy |
| 4,605,626 A | 8/1986 | Beck |
| 4,670,363 A | 6/1987 | Whitney et al. |
| 4,684,585 A | 8/1987 | Tamminen |
| 4,693,946 A | 9/1987 | Niksa et al. |
| 4,732,823 A | 3/1988 | Ito et al. |
| 4,765,799 A | 8/1988 | Waldrop |
| 4,828,942 A | 5/1989 | Licht |
| 4,842,963 A | 6/1989 | Ross, Jr. |
| 4,869,979 A | 9/1989 | Ohtani et al. |
| 4,871,627 A | 10/1989 | Strong et al. |
| 4,894,355 A | 1/1990 | Takeuchi et al. |
| 4,952,289 A | 8/1990 | Ciccone et al. |
| 4,977,044 A | 12/1990 | Ludwig |
| 5,006,424 A | 4/1991 | Evans et al. |
| 5,009,755 A | 4/1991 | Shor |
| 5,011,747 A | 4/1991 | Strong et al. |
| 5,041,194 A | 8/1991 | Mori et al. |
| 5,093,213 A | 3/1992 | O'Callaghan |
| 5,104,497 A | 4/1992 | Tetzlaff et al. |
| 5,130,211 A | 7/1992 | Wilkinson et al. |
| 5,131,387 A | 7/1992 | French et al. |
| 5,145,752 A | 9/1992 | Goldstein et al. |
| 5,185,218 A | 2/1993 | Brokman et al. |
| 5,188,914 A | 2/1993 | Blomgren et al. |
| 5,190,833 A | 3/1993 | Goldstein et al. |
| 5,200,057 A | 4/1993 | Canaris |
| 5,242,763 A * | 9/1993 | Konishi ................. H01M 6/44 429/407 |
| 5,242,765 A | 9/1993 | Naimer et al. |
| 5,284,176 A | 2/1994 | Campau |
| 5,318,861 A | 6/1994 | Harats et al. |
| 5,376,471 A | 12/1994 | Hunter et al. |
| 5,397,532 A | 3/1995 | Blaimschein |
| 5,411,815 A | 5/1995 | Goldstein |
| 5,415,949 A | 5/1995 | Stone et al. |
| 5,419,987 A | 5/1995 | Goldstein et al. |
| 5,431,823 A | 7/1995 | Gofer |

(56) References Cited

U.S. PATENT DOCUMENTS

| | | |
|---|---|---|
| 5,432,022 A | 7/1995 | Cheiky |
| 5,434,020 A | 7/1995 | Cooper |
| 5,439,758 A | 8/1995 | Stone et al. |
| 5,441,820 A | 8/1995 | Siu et al. |
| 5,445,724 A | 8/1995 | Burkhart et al. |
| 5,451,475 A | 9/1995 | Ohta et al. |
| 5,453,334 A | 9/1995 | Melichar |
| 5,458,988 A | 10/1995 | Putt |
| 5,506,067 A | 4/1996 | Tinker |
| 5,512,391 A | 4/1996 | Fleischer |
| 5,549,991 A | 8/1996 | Licht et al. |
| 5,567,540 A | 10/1996 | Stone et al. |
| 5,569,551 A | 10/1996 | Pedicini et al. |
| 5,569,560 A | 10/1996 | Olsen et al. |
| 5,595,949 A | 1/1997 | Goldstein et al. |
| 5,645,952 A | 7/1997 | Lampinen et al. |
| 5,650,240 A | 7/1997 | Rogers |
| 5,652,068 A | 7/1997 | Shuster et al. |
| 5,665,481 A | 9/1997 | Schuster et al. |
| 5,700,596 A | 12/1997 | Ikoma et al. |
| 5,707,757 A | 1/1998 | Lee |
| 5,712,061 A | 1/1998 | Spak et al. |
| 5,716,726 A * | 2/1998 | Cheiky ............... H01M 50/691 429/406 |
| 5,731,105 A | 3/1998 | Fleischer et al. |
| 5,733,667 A | 3/1998 | Nakasuji et al. |
| 5,788,943 A | 8/1998 | Aladjov |
| 5,789,585 A | 8/1998 | Lee et al. |
| 5,840,443 A | 11/1998 | Gregg et al. |
| 5,850,136 A | 12/1998 | Kaneko |
| 5,935,724 A | 8/1999 | Spillman et al. |
| 5,935,728 A | 8/1999 | Spillman et al. |
| 5,938,899 A | 8/1999 | Forand |
| 5,972,531 A | 10/1999 | Kawakami |
| 5,990,352 A | 11/1999 | Nobori et al. |
| 5,998,967 A | 12/1999 | Umeki et al. |
| 6,014,013 A | 1/2000 | Suppanz et al. |
| 6,025,696 A | 2/2000 | Lenhart et al. |
| 6,034,506 A | 3/2000 | Hall |
| 6,046,514 A | 4/2000 | Rouillard et al. |
| 6,054,840 A | 4/2000 | Nakanishi et al. |
| 6,057,052 A | 5/2000 | Shrim et al. |
| 6,091,230 A | 7/2000 | Winzer |
| 6,120,941 A | 9/2000 | Lee et al. |
| 6,127,061 A | 10/2000 | Shun et al. |
| 6,153,328 A | 11/2000 | Colborn |
| 6,162,333 A | 12/2000 | Lemon et al. |
| 6,162,555 A | 12/2000 | Gutierrez et al. |
| 6,164,309 A | 12/2000 | Brecht |
| 6,165,638 A | 12/2000 | Spillman et al. |
| 6,194,098 B1 | 2/2001 | Ying et al. |
| 6,207,037 B1 | 3/2001 | Dartnell et al. |
| 6,210,832 B1 | 4/2001 | Visco et al. |
| 6,211,650 B1 | 4/2001 | Mumaw et al. |
| 6,228,535 B1 | 5/2001 | Fierro et al. |
| 6,249,940 B1 | 6/2001 | Asano et al. |
| 6,265,846 B1 | 7/2001 | Flechsig et al. |
| 6,268,085 B1 | 7/2001 | Manthiram et al. |
| 6,271,646 B1 | 8/2001 | Evers et al. |
| 6,277,508 B1 | 8/2001 | Reiser et al. |
| 6,300,015 B1 | 10/2001 | Nishiyama et al. |
| 6,312,846 B1 | 11/2001 | Marsh |
| 6,355,369 B1 | 3/2002 | Iarochenko et al. |
| 6,358,643 B1 | 3/2002 | Katz et al. |
| 6,368,741 B1 | 4/2002 | Hackel et al. |
| 6,371,995 B1 | 4/2002 | Yasunami |
| 6,379,828 B1 | 4/2002 | Worth |
| 6,383,673 B1 | 5/2002 | Faris et al. |
| 6,383,675 B1 | 5/2002 | Zhong |
| 6,410,174 B1 | 6/2002 | Faris |
| 6,416,649 B1 | 7/2002 | Ray et al. |
| 6,436,576 B1 | 8/2002 | Hossain |
| 6,458,480 B1 | 10/2002 | Morris et al. |
| 6,465,638 B2 | 10/2002 | Gorman et al. |
| 6,465,643 B1 | 10/2002 | Schiemenz et al. |
| 6,472,093 B2 | 10/2002 | Faris et al. |
| 6,475,658 B1 | 11/2002 | Pedicini et al. |
| 6,537,701 B1 | 3/2003 | Nimon et al. |
| 6,541,151 B2 | 4/2003 | Minamiura et al. |
| 6,541,941 B2 | 4/2003 | Adams et al. |
| 6,544,678 B2 | 4/2003 | Faris et al. |
| 6,558,830 B2 | 5/2003 | Faris et al. |
| 6,562,494 B1 | 5/2003 | Tsai et al. |
| 6,562,504 B2 | 5/2003 | Faris et al. |
| 6,566,000 B1 | 5/2003 | Arochenko et al. |
| 6,569,555 B1 | 5/2003 | Faris et al. |
| 6,579,637 B1 | 6/2003 | Savage et al. |
| 6,586,909 B1 | 7/2003 | Trepka |
| 6,641,943 B1 | 11/2003 | Faris et al. |
| 6,645,904 B2 | 11/2003 | Schiemenz et al. |
| 6,646,418 B1 | 11/2003 | Xie et al. |
| 6,649,294 B2 | 11/2003 | Faris et al. |
| 6,653,252 B2 | 11/2003 | Kawahara |
| 6,666,909 B1 | 12/2003 | TeGrotenhuis et al. |
| 6,673,490 B2 | 1/2004 | Miki et al. |
| 6,677,077 B2 | 1/2004 | Spillman et al. |
| 6,706,433 B2 | 3/2004 | Pinto et al. |
| 6,713,206 B2 | 3/2004 | Markoski et al. |
| 6,756,149 B2 | 6/2004 | Knights et al. |
| 6,762,587 B1 | 7/2004 | Barbetta |
| 6,764,588 B2 | 7/2004 | Smedley et al. |
| 6,776,929 B2 | 8/2004 | Hossan et al. |
| 6,786,226 B2 | 9/2004 | Crook et al. |
| 6,787,260 B2 | 9/2004 | Smedley |
| 6,790,265 B2 | 9/2004 | Joshi et al. |
| 6,802,946 B2 | 10/2004 | Basol et al. |
| 6,811,819 B2 | 11/2004 | Joshi et al. |
| 6,811,903 B2 | 11/2004 | Vartak et al. |
| 6,822,423 B2 | 11/2004 | Yau et al. |
| 6,838,203 B2 | 1/2005 | Zheng |
| 6,849,172 B2 | 2/2005 | Rigby et al. |
| 6,849,356 B2 | 2/2005 | Dow et al. |
| 6,855,455 B1 | 2/2005 | Berger et al. |
| 6,858,347 B2 | 2/2005 | Tanigawa et al. |
| 6,866,950 B2 | 3/2005 | Connor et al. |
| 6,899,974 B2 | 5/2005 | Kamisuki et al. |
| 6,902,602 B2 | 6/2005 | Keefer et al. |
| 6,911,274 B1 | 6/2005 | Colborn et al. |
| 6,942,105 B2 | 9/2005 | Smedley et al. |
| 6,949,310 B2 | 9/2005 | Phillips |
| 6,962,992 B2 | 11/2005 | Martin et al. |
| 6,967,064 B2 | 11/2005 | Haltiner, Jr. et al. |
| 6,986,964 B2 | 1/2006 | Faris |
| 7,020,355 B2 | 3/2006 | Lahann et al. |
| 7,040,431 B2 | 5/2006 | Tartamella et al. |
| 7,060,388 B2 | 6/2006 | Naruoka |
| 7,070,632 B1 | 7/2006 | Yisco et al. |
| 7,126,310 B1 | 10/2006 | Barron |
| 7,150,933 B1 | 12/2006 | McLean |
| 7,201,857 B2 | 4/2007 | Ovshinsky et al. |
| 7,226,676 B2 | 6/2007 | Faris et al. |
| 7,238,440 B2 | 7/2007 | Damore et al. |
| 7,252,898 B2 | 8/2007 | Markoski et al. |
| 7,270,906 B2 | 9/2007 | Haltiner, Jr. et al. |
| 7,273,541 B2 | 9/2007 | Choban et al. |
| 7,276,309 B2 | 10/2007 | Smedley et al. |
| 7,279,245 B1 | 10/2007 | Clark |
| 7,285,362 B2 | 10/2007 | Harrup et al. |
| 7,291,186 B2 | 11/2007 | Zhang |
| 7,303,835 B2 | 12/2007 | Mathias et al. |
| 7,466,104 B2 | 12/2008 | Wang et al. |
| 7,468,221 B2 | 12/2008 | LaFollette et al. |
| 7,482,081 B2 | 1/2009 | Hong |
| 7,488,547 B1 | 2/2009 | Iacovelli |
| 7,535,199 B2 | 5/2009 | Kimura et al. |
| 7,556,056 B2 | 7/2009 | Hutchinson |
| 7,598,796 B2 | 10/2009 | Mizuno et al. |
| 7,670,575 B2 | 3/2010 | Jarvinen et al. |
| 7,670,705 B2 | 3/2010 | Ueda et al. |
| 7,670,724 B1 | 3/2010 | Chan et al. |
| 7,722,988 B2 | 5/2010 | Webber |
| 7,794,582 B1 | 9/2010 | Cook et al. |
| 7,964,300 B2 | 6/2011 | Nakazawa et al. |
| 7,997,425 B2 | 8/2011 | Golden et al. |

(56) References Cited

U.S. PATENT DOCUMENTS

| | | |
|---|---|---|
| 8,058,165 B2 | 11/2011 | Kawano et al. |
| 8,168,337 B2 | 5/2012 | Friesen et al. |
| 8,206,469 B2 | 6/2012 | Chiang et al. |
| 8,309,259 B2 | 11/2012 | Friesen et al. |
| 8,329,346 B2 | 12/2012 | Janse Van Rensburg et al. |
| 8,397,508 B2 | 3/2013 | Weimer et al. |
| 8,481,207 B2 | 7/2013 | Friesen et al. |
| 8,491,763 B2 | 7/2013 | Friesen |
| 8,492,052 B2 | 7/2013 | Friesen et al. |
| 8,632,921 B2 | 1/2014 | Friesen et al. |
| 8,659,268 B2 | 2/2014 | Krishnan et al. |
| 8,758,948 B2 | 6/2014 | Narayan et al. |
| 8,877,391 B2 | 11/2014 | Friesen et al. |
| 8,895,197 B2 | 11/2014 | Friesen et al. |
| 8,906,563 B2 | 12/2014 | Friesen et al. |
| 8,911,910 B2 | 12/2014 | Krishnan et al. |
| 9,065,120 B2 | 6/2015 | Carlson |
| 9,105,910 B2 | 8/2015 | Friesen et al. |
| 9,105,946 B2 | 8/2015 | Friesen et al. |
| 9,172,123 B2 | 10/2015 | Albertus et al. |
| 9,178,207 B2 | 11/2015 | Friesen et al. |
| 9,214,708 B2 | 12/2015 | Friesen et al. |
| 9,263,779 B2 | 2/2016 | Lee et al. |
| 9,269,995 B2 | 2/2016 | Friesen et al. |
| 9,269,996 B2 | 2/2016 | Friesen et al. |
| 9,269,998 B2 | 2/2016 | Hayes et al. |
| 9,368,486 B2 | 6/2016 | Licht |
| 9,368,788 B2 | 6/2016 | Ogg et al. |
| 9,419,273 B2 | 8/2016 | Kakeya et al. |
| 9,478,806 B2 | 10/2016 | Ogg et al. |
| 9,537,144 B2 | 1/2017 | Huang et al. |
| 9,559,385 B2 | 1/2017 | Ogg et al. |
| 9,577,298 B2 | 2/2017 | Narayan et al. |
| 9,583,779 B2 | 2/2017 | Chiang et al. |
| 9,660,265 B2 | 5/2017 | Visco et al. |
| 9,680,151 B2 | 6/2017 | Mullins |
| 9,680,154 B2 | 6/2017 | Chen et al. |
| 9,780,379 B2 | 10/2017 | Zhamu et al. |
| 9,843,064 B2 | 12/2017 | Brandon et al. |
| 9,893,397 B2 | 2/2018 | Yoshida et al. |
| 9,911,985 B2 | 3/2018 | Dong et al. |
| 9,947,481 B2 | 4/2018 | Solomon et al. |
| 10,008,754 B2 | 6/2018 | Englert |
| 10,014,530 B2 | 7/2018 | Lang et al. |
| 10,033,036 B2 | 7/2018 | Christensen et al. |
| 10,044,082 B2 | 8/2018 | Suyama et al. |
| 10,147,988 B2 | 12/2018 | Park et al. |
| 10,177,426 B2 | 1/2019 | Nitta |
| 10,530,001 B2 | 1/2020 | Finkelshtain et al. |
| 11,228,066 B2 | 1/2022 | Krishnan et al. |
| 11,611,115 B2 | 3/2023 | Pham et al. |
| 2001/0007725 A1 | 7/2001 | Faris et al. |
| 2002/0015871 A1 | 2/2002 | Tao et al. |
| 2002/0028372 A1 | 3/2002 | Ohlsen et al. |
| 2002/0045075 A1 | 4/2002 | Pinto et al. |
| 2002/0076602 A1 | 6/2002 | Finkelshtain et al. |
| 2002/0098398 A1 | 7/2002 | Chen |
| 2002/0142203 A1 | 10/2002 | Ma et al. |
| 2002/0155351 A1 | 10/2002 | Licht |
| 2003/0054217 A1 | 3/2003 | Faris |
| 2003/0077501 A1 | 4/2003 | Knights et al. |
| 2003/0099882 A1 | 5/2003 | Hampden-Smith et al. |
| 2003/0134163 A1 | 7/2003 | Markoski et al. |
| 2003/0143446 A1 | 7/2003 | Faris et al. |
| 2003/0165727 A1 | 9/2003 | Priestnall et al. |
| 2003/0190504 A1 | 10/2003 | Fisher et al. |
| 2003/0198862 A1 | 10/2003 | Struthers |
| 2004/0005488 A1 | 1/2004 | Faris et al. |
| 2004/0023112 A1 | 2/2004 | Lin |
| 2004/0029723 A1 | 2/2004 | Schiemenz et al. |
| 2004/0031251 A1 | 2/2004 | Priess |
| 2004/0053132 A1 | 3/2004 | Smedley et al. |
| 2004/0058203 A1 | 3/2004 | Priestnall et al. |
| 2004/0058217 A1 | 3/2004 | Ohlsen et al. |
| 2004/0058226 A1 | 3/2004 | Lamarre et al. |
| 2004/0086779 A1 | 5/2004 | Higley et al. |
| 2004/0104124 A1 | 6/2004 | Cobley et al. |
| 2004/0110049 A1 | 6/2004 | Shimotori et al. |
| 2004/0121208 A1 | 6/2004 | James et al. |
| 2004/0146764 A1 | 7/2004 | Tsai et al. |
| 2004/0157092 A1 | 8/2004 | Kimberg et al. |
| 2004/0157101 A1 | 8/2004 | Smedley |
| 2004/0175603 A1 | 9/2004 | Yang et al. |
| 2004/0180246 A1 | 9/2004 | Smedley |
| 2004/0185323 A1 | 9/2004 | Fowler et al. |
| 2004/0185328 A1 | 9/2004 | Lin et al. |
| 2004/0221426 A1 | 11/2004 | Igawa et al. |
| 2004/0225249 A1 | 11/2004 | Leonard et al. |
| 2004/0229107 A1 | 11/2004 | Smedley |
| 2004/0247969 A1 | 12/2004 | Faris et al. |
| 2005/0019634 A1 | 1/2005 | Legg |
| 2005/0019651 A1 | 1/2005 | Tsai et al. |
| 2005/0031911 A1 | 2/2005 | Venkatesan et al. |
| 2005/0042503 A1 | 2/2005 | Kim et al. |
| 2005/0084737 A1 | 4/2005 | Wine et al. |
| 2005/0105229 A1 | 5/2005 | Deng et al. |
| 2005/0123815 A1 | 6/2005 | Tsai et al. |
| 2005/0142398 A1 | 6/2005 | Browall et al. |
| 2005/0170245 A1 | 8/2005 | Vartak et al. |
| 2005/0196656 A1 | 9/2005 | Gomez |
| 2005/0208343 A1 | 9/2005 | Kim et al. |
| 2005/0233191 A1 | 10/2005 | Ushio |
| 2006/0003217 A1 | 1/2006 | Cohen et al. |
| 2006/0024551 A1 | 2/2006 | Smotkin |
| 2006/0038536 A1 | 2/2006 | LaFollette et al. |
| 2006/0039853 A1 | 2/2006 | Fan et al. |
| 2006/0040174 A1 | 2/2006 | Peabody |
| 2006/0076295 A1 | 4/2006 | Leonard et al. |
| 2006/0107639 A1 | 5/2006 | Hamlin et al. |
| 2006/0127731 A1 | 6/2006 | Faris |
| 2006/0175720 A1 | 8/2006 | Kerfoot |
| 2006/0194107 A1 | 8/2006 | Licht |
| 2006/0210867 A1 | 9/2006 | Kenis et al. |
| 2006/0228622 A1 | 10/2006 | Cohen et al. |
| 2006/0234855 A1 | 10/2006 | Gorte et al. |
| 2006/0269826 A1 | 11/2006 | Katz et al. |
| 2006/0281000 A1 | 12/2006 | Hayashigawa |
| 2006/0292407 A1 | 12/2006 | Gervasio et al. |
| 2007/0020496 A1 | 1/2007 | Pelton et al. |
| 2007/0048577 A1 | 3/2007 | Ringeisen et al. |
| 2007/0077491 A1 | 4/2007 | Burchardt |
| 2007/0092787 A1 | 4/2007 | Wang Chen |
| 2007/0099037 A1 | 5/2007 | Senner |
| 2007/0120091 A1 | 5/2007 | Ovshinsky et al. |
| 2007/0134527 A1 | 6/2007 | Desouza et al. |
| 2007/0141415 A1 | 6/2007 | Yang et al. |
| 2007/0141430 A1 | 6/2007 | Huang et al. |
| 2007/0141432 A1 | 6/2007 | Wang et al. |
| 2007/0141440 A1 | 6/2007 | Yang et al. |
| 2007/0141450 A1 | 6/2007 | Yang et al. |
| 2007/0154766 A1 | 7/2007 | Baik et al. |
| 2007/0166602 A1 | 7/2007 | Burchardt |
| 2007/0184314 A1 | 8/2007 | Kagami |
| 2007/0224500 A1 | 9/2007 | White et al. |
| 2007/0234900 A1 | 10/2007 | Soloveichik et al. |
| 2007/0237993 A1 | 10/2007 | Carlsson et al. |
| 2007/0248845 A1 | 10/2007 | Armstrong et al. |
| 2007/0248868 A1 | 10/2007 | Haltiner, Jr. et al. |
| 2007/0259234 A1 | 11/2007 | Chua et al. |
| 2007/0264550 A1 | 11/2007 | Zhang et al. |
| 2007/0269695 A1 | 11/2007 | Yamazaki et al. |
| 2007/0278107 A1 | 12/2007 | Barnett et al. |
| 2007/0283811 A1 | 12/2007 | Wu |
| 2007/0287034 A1 | 12/2007 | Minteer et al. |
| 2008/0008911 A1 | 1/2008 | Stroock et al. |
| 2008/0009780 A1 | 1/2008 | Leonard et al. |
| 2008/0026265 A1 | 1/2008 | Markoski et al. |
| 2008/0032170 A1 | 2/2008 | Wainright et al. |
| 2008/0044721 A1 | 2/2008 | Heller et al. |
| 2008/0118826 A1 | 5/2008 | Shimamura et al. |
| 2008/0131762 A1 | 6/2008 | Joo et al. |
| 2008/0145719 A1 | 6/2008 | Yang et al. |
| 2008/0145721 A1 | 6/2008 | Shapiro et al. |
| 2008/0145737 A1 | 6/2008 | Cai et al. |

(56) References Cited

U.S. PATENT DOCUMENTS

| | | |
|---|---|---|
| 2008/0154101 A1 | 6/2008 | Jain et al. |
| 2008/0231231 A1 | 9/2008 | Hartzog |
| 2008/0241617 A1 | 10/2008 | Sato |
| 2008/0252257 A1 | 10/2008 | Sufrin-Disler et al. |
| 2008/0268341 A1 | 10/2008 | Zhang |
| 2009/0018668 A1 | 1/2009 | Galbraith |
| 2009/0027006 A1 | 1/2009 | Vezzini et al. |
| 2009/0081488 A1 | 3/2009 | Sato et al. |
| 2009/0087700 A1 | 4/2009 | Carlisle et al. |
| 2009/0117429 A1 | 5/2009 | Zillmer et al. |
| 2009/0163394 A1 | 6/2009 | Muraishi et al. |
| 2009/0167242 A1 | 7/2009 | Naganuma et al. |
| 2009/0230921 A1 | 9/2009 | Hsu et al. |
| 2009/0233153 A1 | 9/2009 | Carlisle et al. |
| 2009/0239131 A1 | 9/2009 | Winter |
| 2009/0239132 A1 | 9/2009 | Johnson |
| 2009/0284229 A1 | 11/2009 | Friesen et al. |
| 2009/0286149 A1 | 11/2009 | Ci et al. |
| 2009/0305090 A1 | 12/2009 | Chuang |
| 2010/0003570 A1 | 1/2010 | Finsterwalder et al. |
| 2010/0055508 A1 | 3/2010 | Renn |
| 2010/0062303 A1 | 3/2010 | Bae et al. |
| 2010/0062313 A1 | 3/2010 | Browning et al. |
| 2010/0119895 A1 | 5/2010 | Friesen |
| 2010/0119956 A1 | 5/2010 | Tokuda et al. |
| 2010/0178582 A1 | 7/2010 | Zhang et al. |
| 2010/0196768 A1 | 8/2010 | Roberts et al. |
| 2010/0261272 A1 | 10/2010 | Chalmers et al. |
| 2010/0266907 A1 | 10/2010 | Yazami |
| 2010/0285375 A1 | 11/2010 | Friesen et al. |
| 2010/0310905 A1 | 12/2010 | Oriet et al. |
| 2010/0310933 A1 | 12/2010 | Jiang et al. |
| 2010/0310947 A1 | 12/2010 | Rich et al. |
| 2010/0316935 A1 | 12/2010 | Friesen et al. |
| 2011/0023428 A1 | 2/2011 | Ziebold et al. |
| 2011/0027648 A1 | 2/2011 | Rolison et al. |
| 2011/0039181 A1 | 2/2011 | Friesen et al. |
| 2011/0044528 A1 | 2/2011 | Tsuchiya et al. |
| 2011/0045325 A1 | 2/2011 | Anzai et al. |
| 2011/0059355 A1 | 3/2011 | Zhang et al. |
| 2011/0070481 A1 | 3/2011 | Liang et al. |
| 2011/0070506 A1 | 3/2011 | Friesen et al. |
| 2011/0086278 A1 | 4/2011 | Friesen et al. |
| 2011/0111314 A1 | 5/2011 | Cui et al. |
| 2011/0143219 A1 | 6/2011 | Weiss et al. |
| 2011/0189551 A1 | 8/2011 | Friesen et al. |
| 2011/0200893 A1 | 8/2011 | Friesen et al. |
| 2011/0236730 A1 | 9/2011 | Jones |
| 2011/0250512 A1 | 10/2011 | Friesen et al. |
| 2011/0281184 A1 | 11/2011 | Friesen et al. |
| 2011/0305959 A1 | 12/2011 | Friesen et al. |
| 2011/0316485 A1 | 12/2011 | Krishnan et al. |
| 2012/0009491 A1 | 1/2012 | Friesen et al. |
| 2012/0015264 A1 | 1/2012 | Friesen et al. |
| 2012/0021303 A1* | 1/2012 | Amendola ............ H01M 12/08 429/406 |
| 2012/0034536 A1 | 2/2012 | Isom et al. |
| 2012/0052404 A1 | 3/2012 | Friesen et al. |
| 2012/0068667 A1 | 3/2012 | Friesen et al. |
| 2012/0098499 A1 | 4/2012 | Friesen et al. |
| 2012/0139496 A1 | 6/2012 | Krishnan et al. |
| 2012/0187918 A1 | 7/2012 | Narayan et al. |
| 2012/0193224 A1 | 8/2012 | Suk |
| 2012/0193242 A1 | 8/2012 | Marchal |
| 2012/0202127 A1 | 8/2012 | Friesen et al. |
| 2012/0237838 A1 | 9/2012 | Uesaka |
| 2012/0295172 A1 | 11/2012 | Peled et al. |
| 2012/0321969 A1 | 12/2012 | Friesen et al. |
| 2012/0321970 A1 | 12/2012 | Friesen et al. |
| 2013/0022881 A1 | 1/2013 | Friesen et al. |
| 2013/0052013 A1 | 2/2013 | Eckart |
| 2013/0095393 A1 | 4/2013 | Friesen et al. |
| 2013/0106359 A1 | 5/2013 | Noda et al. |
| 2013/0115523 A1 | 5/2013 | Friesen et al. |
| 2013/0115525 A1 | 5/2013 | Friesen et al. |
| 2013/0115526 A1 | 5/2013 | Friesen et al. |
| 2013/0115531 A1* | 5/2013 | Amendola ............ H01M 12/08 429/406 |
| 2013/0115532 A1 | 5/2013 | Friesen et al. |
| 2013/0115533 A1 | 5/2013 | Friesen et al. |
| 2013/0149615 A1 | 6/2013 | Narayan et al. |
| 2013/0183591 A1 | 7/2013 | Dickson |
| 2013/0189592 A1 | 7/2013 | Roumi et al. |
| 2013/0285597 A1 | 10/2013 | Goldstein |
| 2013/0295471 A1 | 11/2013 | Visco et al. |
| 2014/0091631 A1 | 4/2014 | Naden et al. |
| 2014/0162096 A1 | 6/2014 | Lex et al. |
| 2014/0162129 A1 | 6/2014 | Kim et al. |
| 2014/0217985 A1 | 8/2014 | Gifford et al. |
| 2014/0220256 A1 | 8/2014 | Ogg |
| 2014/0220432 A1 | 8/2014 | Ogg et al. |
| 2014/0220434 A1 | 8/2014 | Ogg |
| 2014/0220435 A1 | 8/2014 | Ogg et al. |
| 2014/0220440 A1 | 8/2014 | Ogg |
| 2014/0220460 A1 | 8/2014 | Ogg et al. |
| 2014/0227615 A1 | 8/2014 | Friesen et al. |
| 2014/0234730 A1 | 8/2014 | Albertus et al. |
| 2014/0262760 A1 | 9/2014 | Hayes et al. |
| 2014/0272477 A1 | 9/2014 | West et al. |
| 2014/0342214 A1 | 11/2014 | Wegner et al. |
| 2015/0010833 A1* | 1/2015 | Amendola ............ H01M 10/26 429/406 |
| 2015/0086884 A1 | 3/2015 | Narayan et al. |
| 2015/0140360 A1 | 5/2015 | Arthur et al. |
| 2015/0140455 A1 | 5/2015 | Imano |
| 2015/0200431 A1 | 7/2015 | Martirosyan et al. |
| 2015/0240368 A1 | 8/2015 | Iacopetti et al. |
| 2015/0295291 A1 | 10/2015 | Sata et al. |
| 2015/0372357 A1 | 12/2015 | Kruglak et al. |
| 2016/0020493 A1 | 1/2016 | Van Dijk et al. |
| 2016/0036094 A1 | 2/2016 | Ogg |
| 2016/0036095 A1 | 2/2016 | Ogg |
| 2016/0045841 A1 | 2/2016 | Kaplan et al. |
| 2016/0111730 A1 | 4/2016 | Kim et al. |
| 2016/0118636 A1 | 4/2016 | Jin et al. |
| 2016/0248136 A1 | 8/2016 | Bugga et al. |
| 2016/0293978 A1 | 10/2016 | Krishnan et al. |
| 2016/0308220 A1 | 10/2016 | Qi et al. |
| 2017/0141434 A1 | 5/2017 | Narayan et al. |
| 2017/0170451 A1 | 6/2017 | Englert |
| 2017/0173557 A1 | 6/2017 | Olson et al. |
| 2017/0207464 A1 | 7/2017 | Gyenge et al. |
| 2017/0271731 A1 | 9/2017 | Hayashi et al. |
| 2017/0301922 A1 | 10/2017 | Goodenough et al. |
| 2017/0346147 A1 | 11/2017 | Weisenstein et al. |
| 2017/0352936 A1 | 12/2017 | Jin |
| 2018/0010228 A1 | 1/2018 | Ogg et al. |
| 2018/0048041 A1 | 2/2018 | Chen et al. |
| 2018/0123116 A1 | 5/2018 | Lee et al. |
| 2018/0145383 A1 | 5/2018 | Krishnan et al. |
| 2018/0219220 A1 | 8/2018 | Hayashi et al. |
| 2018/0241107 A1 | 8/2018 | Su et al. |
| 2018/0287237 A1 | 10/2018 | Manthiram et al. |
| 2018/0366799 A1* | 12/2018 | Amendola .......... H01M 12/065 |
| 2019/0006122 A1 | 1/2019 | Peled et al. |
| 2019/0006695 A1 | 1/2019 | Swiegers et al. |
| 2019/0051908 A1 | 2/2019 | Chen et al. |
| 2019/0074536 A1* | 3/2019 | Lee ...................... H01M 50/77 |
| 2019/0229343 A1 | 7/2019 | Roumi et al. |
| 2020/0006745 A1 | 1/2020 | Westwood et al. |
| 2020/0006796 A1 | 1/2020 | Su et al. |
| 2020/0006828 A1 | 1/2020 | Milshtein et al. |
| 2020/0006896 A1 | 1/2020 | Mahadik et al. |
| 2020/0036002 A1 | 1/2020 | Chakraborty et al. |
| 2020/0136153 A1 | 4/2020 | Jaramillo et al. |
| 2020/0266423 A1 | 8/2020 | Kitagawa et al. |
| 2020/0280064 A1 | 9/2020 | Takahashi et al. |
| 2020/0411879 A1 | 12/2020 | Hartman et al. |
| 2020/0411932 A1 | 12/2020 | Weber et al. |
| 2021/0013536 A1 | 1/2021 | Golden et al. |
| 2021/0028452 A1 | 1/2021 | Su et al. |

(56) References Cited

U.S. PATENT DOCUMENTS

| | | | |
|---|---|---|---|
| 2021/0028457 A1 | 1/2021 | Newhouse et al. | |
| 2021/0351425 A1 | 11/2021 | Smith et al. | |

FOREIGN PATENT DOCUMENTS

| | | | |
|---|---|---|---|
| CN | 1543685 | A | 11/2004 |
| CN | 2888658 | Y | 4/2007 |
| CN | 101142706 | A | 3/2008 |
| CN | 102232004 | A | 11/2011 |
| CN | 103003199 | A | 3/2013 |
| CN | 103098299 | A | 5/2013 |
| CN | 103400947 | A | 11/2013 |
| CN | 103443982 | A | 12/2013 |
| CN | 103515636 | A | 1/2014 |
| CN | 104269570 | A | 1/2015 |
| CN | 104767006 | A | 7/2015 |
| CN | 206340592 | U | 7/2017 |
| CN | 107369813 | A | 11/2017 |
| CN | 109478653 | A | 3/2019 |
| CN | 114134521 | A | 3/2022 |
| DE | 1266021 | B | 4/1968 |
| EP | 0037634 | A1 | 10/1981 |
| EP | 0058090 | A1 | 8/1982 |
| EP | 0277937 | A1 | 8/1988 |
| EP | 0677883 | A1 | 10/1995 |
| EP | 0598144 | B1 | 10/1996 |
| EP | 0637291 | B1 | 10/1997 |
| EP | 0664932 | B1 | 1/1998 |
| EP | 0832502 | A1 | 4/1998 |
| EP | 0823135 | B1 | 11/1998 |
| EP | 0895528 | A1 | 2/1999 |
| EP | 0987349 | A1 | 3/2000 |
| EP | 0835334 | B1 | 9/2002 |
| EP | 1027747 | B1 | 9/2002 |
| EP | 1413001 | B1 | 4/2005 |
| EP | 1266413 | B1 | 5/2005 |
| EP | 1723687 | A1 | 11/2006 |
| EP | 1723687 | B1 | 5/2010 |
| EP | 2274781 | A1 | 1/2011 |
| EP | 1977475 | B1 | 2/2012 |
| EP | 2486622 | B1 | 7/2014 |
| EP | 2424016 | B1 | 10/2014 |
| EP | 2823528 | B1 | 3/2016 |
| EP | 2586092 | B1 | 1/2017 |
| EP | 2619835 | B1 | 6/2017 |
| EP | 2792004 | B1 | 11/2017 |
| EP | 2721688 | B1 | 2/2018 |
| EP | 2774205 | B1 | 3/2018 |
| EP | 2954583 | B1 | 4/2018 |
| EP | 2559097 | B1 | 5/2018 |
| EP | 2596545 | B1 | 6/2018 |
| EP | 2659536 | B1 | 8/2018 |
| GB | 1238356 | A | 7/1971 |
| GB | 1286173 | A | 8/1972 |
| IN | 201917002254 | A | 4/2019 |
| JP | S4827097 | A | 4/1973 |
| JP | S4827097 | B1 | 8/1973 |
| JP | S56500790 | A | 6/1981 |
| JP | S56162870 | A | 12/1981 |
| JP | S56162870 | U | 12/1981 |
| JP | H01159973 | A | 6/1989 |
| JP | H01163977 | A | 6/1989 |
| JP | H0790662 | A | 4/1995 |
| JP | H09501256 | A | 2/1997 |
| JP | H10509554 | A | 9/1998 |
| JP | 2000205200 | A | 7/2000 |
| JP | 2002-194411 | A | 7/2002 |
| JP | 3387724 | B2 | 1/2003 |
| JP | 2008251491 | A | 10/2008 |
| JP | 2008277315 | A | 11/2008 |
| JP | 2009529213 | A | 8/2009 |
| JP | 2009543674 | A | 12/2009 |
| JP | 2010140736 | A | 6/2010 |
| JP | 2010-192313 | A | 9/2010 |
| JP | 2010-262876 | A | 11/2010 |
| JP | 2011003313 | A | 1/2011 |
| JP | 2011173083 | A | 9/2011 |
| JP | 2011228079 | A | 11/2011 |
| JP | 2012518095 | A | 8/2012 |
| JP | 2013503257 | A | 1/2013 |
| JP | 2013505544 | A | 2/2013 |
| JP | 2013507741 | A | 3/2013 |
| JP | 2013134838 | A | 7/2013 |
| JP | 2014127289 | A | 7/2014 |
| JP | 2014150056 | A | 8/2014 |
| JP | 2015076379 | A | 4/2015 |
| JP | 2016091605 | A | 5/2016 |
| JP | 5952540 | B2 | 6/2016 |
| JP | 6032018 | B2 | 11/2016 |
| JP | 2017076595 | A | 4/2017 |
| JP | 2017-139231 | A | 8/2017 |
| JP | 6234917 | B2 | 11/2017 |
| JP | 2017216126 | A | 12/2017 |
| JP | 2018006057 | A | 1/2018 |
| JP | 2018067399 | A | 4/2018 |
| JP | 6352884 | B2 | 6/2018 |
| JP | 6363244 | B2 | 7/2018 |
| JP | 2018529207 | A | 10/2018 |
| JP | 6682102 | B2 | 3/2020 |
| KR | 20120122053 | A | 11/2012 |
| KR | 10-20140068850 | A | 6/2014 |
| KR | 10-20160115912 | A | 10/2016 |
| KR | 10-2018-0063144 | A | 6/2018 |
| KR | 20190066865 | A | 6/2019 |
| TW | 201929311 | A | 7/2019 |
| WO | WO8402429 | A1 | 6/1984 |
| WO | 8905528 | A1 | 6/1989 |
| WO | 9321664 | A1 | 10/1993 |
| WO | 0201666 | A2 | 1/2002 |
| WO | 2008058165 | A2 | 5/2008 |
| WO | 2009087917 | A1 | 7/2009 |
| WO | WO2010065890 | A1 | 6/2010 |
| WO | 2011035176 | A1 | 3/2011 |
| WO | 2011044528 | A1 | 4/2011 |
| WO | 2011103142 | A1 | 8/2011 |
| WO | 2011163553 | A1 | 12/2011 |
| WO | 2012012364 | A1 | 1/2012 |
| WO | WO2012012558 | A2 | 1/2012 |
| WO | 2012138576 | A1 | 10/2012 |
| WO | 2012156972 | A1 | 11/2012 |
| WO | WO2012174433 | A3 | 12/2012 |
| WO | WO2013005050 | A1 | 1/2013 |
| WO | 2013053653 | A2 | 4/2013 |
| WO | WO-2013090680 | A2 * | 6/2013 ............ H01M 4/663 |
| WO | 2014124386 | A1 | 8/2014 |
| WO | WO2014142666 | A1 | 9/2014 |
| WO | WO2015042573 | A1 | 3/2015 |
| WO | 2015076299 | A1 | 5/2015 |
| WO | 2015119041 | A1 | 8/2015 |
| WO | WO2015145690 | A1 | 10/2015 |
| WO | WO2015150784 | A1 | 10/2015 |
| WO | 2016088673 | A1 | 6/2016 |
| WO | 2016138594 | A1 | 9/2016 |
| WO | 2016197109 | A1 | 12/2016 |
| WO | WO2017-006666 | A1 | 1/2017 |
| WO | 2017045072 | A1 | 3/2017 |
| WO | 2017049414 | A1 | 3/2017 |
| WO | WO2017075577 | A1 | 5/2017 |
| WO | WO2017117373 | A1 | 7/2017 |
| WO | WO2017-223219 | A1 | 12/2017 |
| WO | WO2018009930 | A2 | 1/2018 |
| WO | WO2018018036 | A1 | 1/2018 |
| WO | WO2018052376 | A1 | 3/2018 |
| WO | WO2018187561 | A1 | 10/2018 |
| WO | WO2020006419 | A1 | 1/2020 |
| WO | WO2020006436 | A1 | 1/2020 |
| WO | WO2020006506 | A2 | 1/2020 |
| WO | WO2020023912 | A1 | 1/2020 |
| WO | 2020067226 | A1 | 4/2020 |
| WO | 2020264344 | A1 | 12/2020 |
| WO | 2020264415 | A1 | 12/2020 |
| WO | WO2020264386 | A1 | 12/2020 |
| WO | WO2021021681 | A1 | 2/2021 |

(56) References Cited

FOREIGN PATENT DOCUMENTS

| WO | WO2021021685 | A1 | 2/2021 |
|---|---|---|---|
| WO | 2021226399 | A1 | 11/2021 |

OTHER PUBLICATIONS

"High" Lexico.com US Dictionary, Oxford University Press, https://www.lexico.com/en/definition/high. Accessed Oct. 13, 2021. (Year: 2021).*

"Busbar." Lexico.com US Dictionary, Oxford University Press, https://www.lexico.com/en/definition/busbar. Accessed Oct. 13, 2021. (Year: 2021).*

Tekin, B. et al., "A New Sodium-Based Aqueous Rechargeable Battery System: The Special Case of Na0.44MnO2/Dissolved Sodium Polysulfide," View online DOI: 10.1002/ente.201700245, Energy Technol. vol. 5, pp. 2182-2188, (2017).

Tian, B. et al., "The effect of Na2S additive in alkaline electrolyte on improved performances of Fe-based air batteries," Electrochimica Acta, vol. 259, pp. 196-203, (2018).

Trocino, S. et al., "High performance solid-state iron-air rechargeable ceramic battery operating at intermediate temperatures (500-650° C.)," Applied Energy, pp. 233-234 & pp. 386-394, (2019).

Vijayamohanan, K. et al., "Rechargeable Alkaline Iron Electrodes," Journal of Power Sources, vol. 34, pp. 269-285, (1991).

Wei, X. et al., "An Aqueous Redox Flow Battery Based on Neutral Alkali Metal Ferri/ferrocyanide and Polysulfide Electrolytes," Journal of The Electrochemical Society, vol. 163, No. 1, pp. A5150-A5153, (2016).

Weinrich, H. et al., "Understanding the Nanoscale Redox-Behavior of Iron-Anodes for Rechargeable Iron-Air Batteries," View Online https://doi.org/10.1016/j.nanoen.2017.10.023, Nano Energy, Institute of Energy and Climate Research-Fundamental Electrochemistry (IEK-9) Center for Nanophase Materials Sciences, Oak Ridge National Laboratory, Oak Ridge, Tennessee 378, US, 46 pages, (2017).

Wilke, S. K. et al., "Structural evolution of directionally freeze-cast iron foams during oxidation/reduction cycles," Acta Materialia, vol. 162, pp. 90-102, (2019).

Yang, B. et al., "Organo-Sulfur Molecules enable iron-based battery electrodes to meet the challenges of large-scale electrical energy storage," Energy Environ. Sci., vol. 7, pp. 2753-2763, (2014).

Yang, C. et al., "Unique aqueous Li-ion/sulfur chemistry with high energy density and reversibility," View online, www.onas.org/cgi/doi/10.1073/pnas.1703937114, PNAS, vol. 114, No. 24, pp. 6197-6202, (2017).

You, S. et al., "A microbial fuel cell using permanganate as the cathodic electron acceptor," Journal of Power Sources, vol. 162, pp. 1409-1415, (2006).

Yu, X. et al., "A Voltage-Enhanced, Low-Cost Aqueous Iron-Air Battery Enabled with a Mediator-Ion Solid Electrolyte," View Online DOI: 10.1021/acsenergylett.7b00168, ACS Energy Lett., vol. 2, pp. 1050-1055, (2017).

Yun, S. et al., "Materials and Device Constructions for Aqueous Lithium-Sulfur Batteries," View online DOI: 10.1002/adfm. 201707593, Adv. Funct. Mater., vol. 28, pp. 1-17 (1707593), (2018).

Sayilgan, E. et al., "A review of technologies for the recovery of metals from spent alkaline and zinc-carbon batteries", Hydrometallurgy, 2009, vol. 97, Issues 3-4, pp. 158-166.

Chakraborty, R. et al., "Negative Electrodes For Electrochemical Cells," U.S. Appl. No. 16/523,722, filed Jul. 26, 2019.

Al, W. et al., "A Novel Graphene-Polysulfide Anode Material for High-Performance Lithium-Ion Batteries," Scientific Reports, vol. 3, No. 234, pp. 1-5, DOI: 10.1038/srep0234, (2013).

Al-Hoshan, M. S. et al., "Synthesis, Physicochemical and Electrochemical Properties of Nicekl Ferrite Spinels Obtained by Hydrothermal Method for the Oxygen Evolution Reaction (OER)," Int. J. Electrochem. Sci., vol. 7, pp. 4959-4973, (2012).

Arunchander, A. et al., "Synthesis of flower-like molybdenum sulfide/graphene hybrid as an efficient oxygen reduction electrocatalyst for anion exchange membrane fuel cells," Journal of Power Sources, vol. 353, pp. 104-114, (2017).

Bandal, H. et al., "Iron-based heterogeneous catalysts for oxygen evolution reaction; change in perspective from activity promoter to active catalyst," Journal of Power Sources, vol. 395, pp. 106-127, (2018).

Blurton, K. F. et al., "Metal/Air Batteries: Their Status and Potential—A Review," Journal of Power Sources, vol. 4, pp. 263-279, (1979).

Burke, M. S. et al., "Cobalt-Iron (Oxy)Hudroxide Oxygen Evloution Electrocatalysts: The Role of Structur5e and Composition on Activity, Stability, and Mechanism," J. Am. Chem. Soc., vol. 137, pp. 3638-3648, DOI: 10.1021/iacs.5b00281, (2015).

Burke, M. S. et al., "Oxygen Evolution Reaction Electrocatalysis on Transition Metal Oxides and (Oxy)hydroxides Activity Trends and Design Principles," Department of Chemistry and Biochemistry, University of Oregon, Eugene, Dragon 97403, United States, Chemistry of Materials, 10 pages, (2015).

Chen, Y. et al., "Harvesting polysulldes by sealing the sulfur electrode in a composite ion-selective net," Journal of Power Sources, vol. 368, pp. 38-45, (2017).

Chiang, Y.M. et al., High Capacity, Temperature-Stable Lithium Aluminum Manganese Oxide Cahtodes for Rechargeable Batteries, Electrochemical and Solid-State Letters, vol. 2, No. 3, pp. 107-110, (1990).

Colli, A. N. et al., "High energy density MnO4-/MnO42 redox couple for alkaline redox flow batteries," Chem. Commun., vol. 52, pp. 14039-14042, (2016).

Cui, B. et al., "Improved Cycle Iron Molten Air Battery Performance Using a Robust Fin Air Electrode," Journal of The Electrochemical Society, vol. 164, No. 2, pp. A88-A92, (2017).

Demir-Cakan, R. et al., "An aqueous electrolyte rechargeable Li-ion/polysul!de battery," Journal of Materials Chemistry A, View Article Online DOI: 10.1039/c4ta01308e, 5 pages, (2014).

Demir-Cakan, R. et al., "Use of ion-selective polymer membranes for an aqueous electrolyte rechargeable Li-ion-polysulphide battery," View Online DOI: 10 1039/c4ta05756b, J. Mater. Chem. A, vol. 3, pp. 2869-2875, (2015).

Egashira, M. et al., "Iron-Air (Secondary and Primpary)," Yamaguchi University, Yamaguchi, Japan & 2009 Elsevier B.V. All rights reserved, pp. 372-375, (2009).

Figueredo-Rodriguez, H. A. et al., "A Rechargeable, Aqueous Iron Air Battery with Nanostructured Electrodes Capable of High Energy Density Operation," Journal of The Electrochemical Society, vol. 164, No. 6, pp. A1148-A1157, (2017).

Gross, M. M. et al., "Aqueous Polysulfide-Air Battery with a Mediator-Ion Solid Electrolyte and a Copper Sul!de Catalyst for Polysulfide Redox," View Online DOI: 10.1021/acsaem.8b01679, ACS Applied Energy Materials, vol. 1, No. 12, pp. 7230-7236, (2018).

Hall, D. E., "Ni(OH)2_Impregnated Anodes for alkaline Water Electrolysis," J. Electrochem. So., vol. 130, No. 2, pp. 317-321,(1983).

Hall, D. E., Porous Nickel-Coated Steel Anodes for Alkaline Water Electrolysis: Corrosion Resistance J. Electrochem. Soc., vol. 129, No. 2, pp. 310-315, (1982).

Hang, B. T. et al., "Effect of metal-sulfide additives on electrochemical properties of nano-sized Fe2O3-loaded carbon for Fe/air battery anodes," Journal of Power Sources, vol. 168, pp. 522-532, (2007).

Hang, B. T. et al., "Effect of additives on the electrochemical properties of Fe2O3/C nanocomposite for Fe/air battery anode," Journal of Electroanalytical Chemistry, vol. 762, pp. 59-65, (2016).

Notification Concerning Transmittal of a International Preliminary Report on Patentability and Written Opinion of the International Search Authority for International Patent Application No. PCT/US2018/026243, dated Oct. 17, 2019 9 pages.

International Search Report and Written Opinion of the International Searching Authority for International Patent Application No. PCT/US2018/026243, dated Jul. 27, 2018, 12 pages.

(56) References Cited

OTHER PUBLICATIONS

International Search Report and Written Opinion of the International Searching Authority for International Patent Application No. PCT/US2019/039844, dated Oct. 23, 2019, 15 pages.
International Search Report and Written Opinion of the International Searching Authority for International Patent Application No. PCT/US2019/039867, dated Nov. 15, 2019, 19 pages.
International Search Report and Written Opinion of the International Searching Authority for International Patent Application No. PCT/US2019/039973, dated Jan. 13, 2020, 26 pages.
International Search Report and Written Opinion of the International Searching Authority for International Patent Application No. PCT/US2019/043745, dated Nov. 13, 2019, 17 pages.
Ji, X. et al., "Stabilizing lithium-sulphur cathodes using polysulphide reservoirs," View Online DOI: 10.1038/ncomms1293, Nature Communications, vol. 2, No. 325, 8 pages, (2011).
Jin, X. et al., "A high fidelity multiphysics model for the new solid oxide iron-air redox battery part I: Bridging mass transport and charge transfer with redox cycle kinetics," Journal of Power Sources, vol. 280, pp. 195-204, (2015).
Kadyk, T. et al., "How to Enhance Gas Removal from Porous Electrodes?" View Online DOI: 10.1038/SREP38780, Scientific Reports, vol. 6, No. 38780, pp. 1-14, (2016).
Klaus, S. et al., "Elects of Fe Electrolyte Impurities on Ni(OH)2/ NiOOH Structure and Oxygen Evolution Activity," View Online DOI:10.1021/acs.jpcc.5b00105, Journal of Physical Chemistry C, vol. 119, No. 13, pp. 7243-7254, (2015).
Licht, S., "A Novel Aqueous Aluminum permanganate fuel cell," Electrochemistry Communications, vol. 1, pp. 33-36, (1999).
Li, Z. et al., "Air-Breathing Aqueous Sulfur Flow Battery for Ultralow-Cost Long-Duration Electrical Storage," Joule vol. 1, pp. 306-327, Oct. 11, 2017, 2017 Published by Elsevier Inc., (2017).
Li, Z. et al., "A high-energy and low-cost polysul!de/iodide flow battery," Nano Energy, vol. 30, pp. 283-292, (2016).
Mainar, A. R. et al., "Alkaline aqueous electrolytes for secondary zinc-air batteries: an overview," Int. J. Energy Res. 2016; vol. 40, pp. 1032-1049, (2016).
Malkhandi, S. et al., "Organo-Sulfur Additives for Suppressing Hydrogen Evolution in Iron-air Battery," Abstract #688, 220th ECS Meeting, 2011 The Electrochemical Society.
Matsuda, A. et al., "Preparation of hydroxide ion conductive KOH-ZrO2 electrolyte for all-solid state iron/air secondary battery," Solid State Ionics, vol. 262, pp. 188-191, (2014).
Maurya, S. et al., "A review on recent developments of anion exchange membranes for fuel cells and redox flow batteries," View online DOI: 10.1039/c5ra04741b, RSC Adv., vol. 5, pp. 37206-37230, (2015).
McKerracher, R. D. et al., "A Review of the Iron-Air Secondary Battery for Energy Storage," View online DOI: 10.1002/cplu. 201402238, ChemPlusChem 2015, vol. 80, pp. 323-335, (2015).
Merle, G. et al., "Anion exchange membranes for alkaline fuel cells: A review," Journal of Membrane Science, vol. 377, pp. 1-35, (2011).
Mitra, D. et al., "An Efficient and Robust Surface-Modified Iron Electrode for Oxygen Evolution in AlkalineWater Electrolysis,"Journal of The Electrochemical Society, vol. 165, No. 5, pp. F392-F400, (2018).
Mitra, D. et al., "A Stable and Electrocatalytic Iron Electrode for Oxygen Evolution in Alkaline Water Electrolysis," View Online https://doi.org/10.1007/s11244-018-0971-9, Springer Science+ Business Media, LLC, part of Springer Nature 2018.
Narayan, S. R. et al., "Bi-Functional Oxygen Electrodes—Challenges and Prospects," The Electrochemical Society Interface, Summer 2015, pp. 65-69, (2015).
Neburchilov, V. et al., "Metal-Air And Metal-Sulfur Batteries: Fundamentals and Applications," CRC Press Taylor & Francis Group, 6000 Broken Sound Parkway NW, Suite 300, Boca Raton, FL 33487-2742, © 2017 by Taylor & Francis Group, LLC, CRC Press is an imprint of Taylor & Francis Group, an Informa business.
Ojefors, L. et al., "An-iron-Air Vehicle Battery," Journal of Power Sources, vol. 2, pp. 287-296, (1977).

Pan, J. et al., "Constructing Ionic Highway in Alkaline Polymer Electrolytes," Energy Environ. Sci. 2014, vol. 7, pp. 354-360, (2014).
Roe, S. et al., "A High Energy Density Vanadium Redox Flow Battery with 3 M Vanadium Electrolyte," Journal of The Electrochemical Society, vol. 163, No. 1, pp. A5023-A5028, (2016).
Sen, R. K. et al., "Metal-Air Battery Assessment," Prepared for Office of Energy Storage and Distribution Conservation and Renewable Energy, The U.S. Department of Energy under Contract DE-AC06-76RLO 1830, Pacific Northwest Laboratory, Operated for the U.S. Department of Energy, 96 pages, (1988).
Sevinc, S. et al., "In-situ tracking of NaFePO4 formation in aqueous electrolytes and its electrochemical performances in Na-ion/ polysul!de batteries," Journal of Power Sources, vol. 412, pp. 55-62, (2019).
Smith, R. D. L. et al., "Water Oxidation Catalysis: Electrocatalytic Response to Metal Stoichiometry in Amorphous Metal Oxide Films Containing Iron, Cobalt, and Nickel," J. Am. Chem. Soc., vol. 135, No. 31, pp. 11580-115, (2013).
Bisoi, S. et al., "Gas separation properties of Troeger's base-bridged polyamides", e-Polymers, 2017, vol. 17, No. 4, pp. 283-293, (2017).
Carta, M. et al., "The synthesis of microporous polymers using Troeger's base formation", Polymer Chemistry, 2014, vol. 5, pp. 5267-5272, (2014).
Li, Z. et al., "Air-breathing aqueous sulfur flow battery for ultralow-cost long-duration electrical storage", JOULE, 2017, vol. 1, No. 2, pp. 306-327, (2017).
International Search Report and Written Opinion of the International Searching Authority for International Patent Application No. PCT/US2020/039889, dated Oct. 15, 2020, 11 pages.
International Search Report and Written Opinion of the International Searching Authority for International Patent Application No. PCT/US2020/039942, dated Oct. 22, 2020, 17 pages.
International Search Report and Written Opinion of the International Searching Authority for International Patent Application No. PCT/US2020/039976, dated Oct. 23, 2020, 11 pages.
International Search Report and Written Opinion of the International Searching Authority for International Patent Application No. PCT/US2020/043630, dated Nov. 11, 2020, 10 pages.
International Search Report and Written Opinion of the International Searching Authority for International Patent Application No. PCT/US2020/043639, dated Nov. 13, 2020, 11 pages.
Agarwal R.C., et al., "Study of Electrical and Electrochemical Behaviour on Hot-press Synthesized Nano-Composite Polymer Electrolyte (NCPE) Membranes: [(70PEO: 30 KNO3) + x SiO2]," International Journal of Electrochemical Science, 2011, vol. 6, pp. 867-881.
Cherepy N.J., et al., "A Zinc/Air Fuel Cell for Electric Vehicles," IEEE publication, 1999, pp. 11-14.
Chinese Office Action dated Feb. 3, 2017 for Application No. 2012800344431, 7 pages.
Chinese Office Action dated Jul. 18, 2016 for Appln. No. 2012102393449.
Chinese Office Action dated May 4, 2016 for Application No. 2012800344431, 17 pages.
Cohen J.L., et al., "Fabrication and Preliminary Testing of a Planar Membraneless Microchannel Fuel Cell," Journal of Power Sources, 2005, vol. 139, pp. 96-105.
Communication under Rule 71(3) EPC, EP Application No. 14749407. 4, dated Sep. 29, 2017, 6 Pages.
Decision to Grant EP Application No. 14749407.4 dated Mar. 8, 2018, 2 Pages.
Dias F.B., et al., "Trends in Polymer Electrolytes for Secondary Lithium Batteries", Journal of Power Sources, 2000, vol. 88, pp. 169-191.
Examination Report for Australian Patent Application No. 2014214641 dated Jun. 26, 2017, 6 pages.
Extended European Search Report for European Application No. 12845720.7, dated Jul. 16, 2015, 7 Pages.
Extended European Search Report for European Application No. 14749407.4, dated Aug. 31, 2016, 6 Pages.
Extended European Search Report for European Application No. 19826880.7, dated Feb. 4, 2022, 8 Pages.

(56) References Cited

OTHER PUBLICATIONS

Extended European Search Report for European Application No. 19827057.1, dated Feb. 11, 2022, 8 Pages.
Extended European Search Report of EP Application No. 09751078.8, dated Jul. 27, 2012, 6 Pages.
Ferrigno R., et al., "Membraneless Vanadium Redox Fuel Cell Using Laminar Flow," Journal of American Chemical Society, 2002, vol. 124, pp. 12930-12931.
International Preliminary Report on Patentability (Chapter 1 of the Patent Cooperation Treaty) for International Application No. PCT/US2009/040658 dated Dec. 2, 2010, 5 Pages.
International Preliminary Report on Patentability for International Application No. PCT/US12/47395 dated Sep. 19, 2014, 27 pages.
International Preliminary Report on Patentability for International Application No. PCT/US12/62503 dated Nov. 27, 2013, 25 pages.
International Preliminary Report on Patentability for International Application No. PCT/US2011/049558 dated Jan. 11, 2013, 15 pages.
International Preliminary Report on Patentability for International Application No. PCT/US2012/062503, dated Oct. 19, 2013, 25 Pages.
International Preliminary Report on Patentability for International Application No. PCT/US2014/015613, dated Aug. 20, 2015, 19 Pages.
International Preliminary Report on Patentability for International Application No. PCT/US2016/023564, dated May 30, 2017, 16 Pages.
International Preliminary Report on Patentability for International Application No. PCT/US2016/036026 dated Oct. 13, 2017, 26 Pages.
International Preliminary Report on Patentability for International Application No. PCT/US2017/043489, dated Aug. 6, 2018, 20 Pages.
International Preliminary Report on Patentability for International Application No. PCT/US2017/043500, dated Jul. 23, 2018, 18 Pages.
International Preliminary Report on Patentability for International Application No. PCT/US2019/039844, dated Jan. 7, 2021, 11 Pages.
International Preliminary Report on Patentability for International Application No. PCT/US2019/039973, dated Jan. 7, 2021, 20 Pages.
International Preliminary Report on Patentability for International Application No. PCT/US2020/031760, dated Nov. 25, 2021, 07 Pages.
International Preliminary Report on Patentability for International Application No. PCT/US2020/039889, dated Jan. 6, 2022, 8 Pages.
International Preliminary Report on Patentability for International Application No. PCT/US2020/061081, dated Jun. 2, 2022, 07 Pages.
International Search Report and Written Opinion for International Application No. PCT/US2011/049558 dated Nov. 16, 2011, 11 pages.
International Search Report and Written Opinion for International Application No. PCT/US2012/047395 dated Sep. 28, 2012, 10 pages.
International Search Report and Written Opinion for International Application No. PCT/US2012/062503, dated Jan. 24, 2013, 09 Pages.
International Search Report and Written Opinion for International Application No. PCT/US2014/015613, dated Jul. 11, 2014, 23 Pages.
International Search Report and Written Opinion for International Application No. PCT/US2016/023564, dated Jun. 16, 2016, 12 Pages.
International Search Report and Written Opinion for International Application No. PCT/US2017/043489, dated Nov. 29, 2017, 12 Pages.
International Search Report and Written Opinion for International Application No. PCT/US2017/043500, dated Nov. 29, 2017, 12 Pages.
International Search Report and Written Opinion for International Application No. PCT/US2020/061081, dated Apr. 19, 2021, 10 Pages.
International Search Report and Written Opinion for International Application No. PCT/US2021/031184, dated Aug. 27, 2021, 07 Pages.
International Search Report and Written Opinion of the International Searching Authority dated Aug. 25, 2020, issued in corresponding International Application No. PCT/US2020/031760, 13 Pages.
International Search Report for International Application No. PCT/US2009/039460, dated May 26, 2009, 3 pages.
International Search Report for International Application No. PCT/US2009/040658, dated Aug. 24, 2009, 3 pages.
International Search Report for International Application No. PCT/US2016/036026, dated Sep. 29, 2016, 05 Pages.
International Search Report for International Application No. PCT/US2019/031118 dated Aug. 29, 2019, 3 pages.
Japanese Office Action dated Feb. 9, 2016 for Application No. 2014-540009, 14 pages.
Japanese Office Action dated Jan. 10, 2017 for Application No. 2014-540009, 17 pages.
Jayashree, et al., "Air-Breathing Laminar Flow-Based Microfluidic Fuel Cell," Journal of American Chemical Society, 2005, vol. 127, pp. 16758-16759.
Jorne J., et al., "Suppression of Dendrites and Roughness during Elecbodeposition by Impinging Flow," Journal of the Electrochemical Society, Jun. 1987, vol. 134, No. 6, pp. 1399-1402.
Li Q., et al., "All Solid Lithium Polymer Batteries With a Novel Composite Polymer Electrolyte," Solid State Ionics, 2003, vol. 159, pp. 97-109.
Non-Final Office Action dated Oct. 8, 2019 issued in corresponding Japanese Patent Application No. 2018-550404 with English translation, 4 pages.
Non-Final Office Action U.S. Appl. No. 14/505,234 dated Aug. 25, 2017, 15 Pages.
Notice of Allowance for U.S. Appl. No. 14/505,234 dated Jun. 29, 2018, 10 Pages.
Office Action dated Jun. 17, 2021, issued in corresponding Brazilian Application No. BR112019000713-0 with informal ranslation, 5 Pages.
Office Action dated Jun. 3, 2021, issued in corresponding Chinese Patent Application No. 201780045371.3 with English translation, 8 Pages.
Office Action dated Mar. 28, 2017 in Chinese Application 201480017311.7, 21 pages.
Office Action dated May 7, 2021, issued in corresponding Chinese Patent Application No. 201780034966.9, with English translation, 18 pages.
Office Action for Australian Patent Application No. 2012332825 dated Nov. 25, 2015, 3 pages.
Office Action for Canadian Patent Application 2853245 dated Jun. 15, 2017, 3 pages.
Office Action for Canadian Patent Application 2853245 dated Sep. 23, 2016, 3 pages.
Office Action for Indian Patent Application No. 201817034674 dated May 27, 2020, 7 pages.
Office Action issued in corresponding Japanese Patent Application No. 2017-093977 dated May 8, 2018 with English translation, 4 pages.
Park C.H., et al., "Electrochemical Stability and Conductivity Enhancement of Composite Polymer Electrolytes," Solid State Ionics, 2003, vol. 159, pp. 111-119.
Perkins N.R., et al., "Hydrogen Oxidation Electrodes and Electrochemical Cells Including the Same," U.S. Appl. No. 16/951,396, filed Nov. 18, 2020, 88 Pages.
Rejection Decision, Japanese Patent Application No. 2015-557176 dated Oct. 17, 2017 with English translation, 12 pages.

(56) References Cited

OTHER PUBLICATIONS

Ross P.N., et al., "Feasibility Study of a New Zinc-Air Battery Concept Using Flowing Alkaline Electrolyte," Intersociety Energy Conversion Engineering Conference, Aug. 25, 1986, vol. 2, pp. 1066-1072.
Salloum et al., "Sequential Flow Membraneless Microfluidic Fuel Cell with Porous Electrodes," Journal of Power Sources, 2008, vol. 180, pp. 243-252.
Smedley, et al., "A Regenerative Zinc-air Fuel Cell," Journal of Power Sources, 2007, vol. 165, pp. 897-904.
Thirsk H.R., "Electrochemistry," Thirsk, Ed., The Chemical Society Great Britain Oxford Alden Press, 1974, vol. 4, pp. 16.
Timofeeva E.V., "Rechargeable Nanofluid Electrodes for High Energy Density Flow Battery," NSTI-Nanotech, Jan. 1, 2013, vol. 2, pp. 679-682, XP055863711.
Written Opinion for International Application No. PCT/US2016/036026, dated Sep. 29, 2016, 14 Pages.
Written Opinion of the International Preliminary Examining Authority dated Feb. 24, 2017 for Application. No. PCT/US2016/023564.
Written Opinion of the International Preliminary Examining Authority PCT/US2016/036026 dated May 9, 2017, 13 Pages.
Written Opinion of the International Searching Authority PCT/US2019/031118 dated Aug. 29, 2019, 13 Pages.
Zheng J., et al., "Rotating Ring-Disk Electrode Method," Rotating Electrode Methods and Oxygen Reduction Electrocatalysts, NL, Elsevier, Apr. 25, 2014, pp. 199-229, DOI: 10.1016/B978-0-444-63278-4.00006-9, ISBN 9780444632784, XP009522170.
Chinese Office Action dated Dec. 28, 2015 for Appln. No. 2012102393449.*
Chinese Search Report dated Dec. 6, 2012 of Chinese Appl. No. 201220336003.9 filed Jul. 10, 2012 (1 page of Chinese Actionwith 3-page Engl. translation).*
Chinese Office Action dated Dec. 28, 2015 for Appln. 201512231567800.
Chinese Office Action dated Feb. 19, 2013 (with partial English Language translation) of Chinese Patent Appln. No. 201220585211.2 filed Nov. 16, 2012, 4 Pages.
Chinese Search Report dated Dec. 6, 2012 of Chinese Appl. No. 201220336003.9 filed Jul. 10, 2012 (1 page Chinese Actionwith 3-page Engl. translation).
International Preliminary Report on Patentability for International Application No. PCT/US2021/031184, mailed Nov. 17, 2022, 6 Pages.
"Nickel," Efunda: The Ultimate Online Reference for Engineers, eFunda, Inc., Web, Sep. 5, 2014.
Notice of Allowance Japanese Patent Application No. 2015-557176 dated Mar. 13, 2018 with English translation, 5 pages.
Office Action for Chinese Application No 201780034966.9, mailed Jan. 13, 2023, 19 pages.
Office Action for Chinese Application No 201780034966.9, mailed Jul. 3, 2023, 31 pages.
Office Action for Chinese Application No 201780034966.9, mailed Mar. 31, 2022, 7 pages.
Office Action issued in corresponding Mexico Application No. MX/a/2014/005136 dated Apr. 17, 2018.
"PTFE," Polymers: A Properties Database (Online), Taylor and Francis Group, LLC, Web, Sep. 5, 2014.
Second Office Action Chinese Patent Application No. 201480017311.7 dated Feb. 2, 2018 with English translation.
Song T., et al., "Solubility and Diffusivity of Oxygen in Ionic Liquids," Oct. 10, 2019, Journal of Chemical and Engineering Data, vol. 64, pp. 4956-4967.
Office Action dated Jan. 13, 2012 issued in corresponding Chinese Patent Application No. 201120307185.2 w/English translation, 9 Pages.
Yu, W. et al., "Toward a New Generation of Low Cost, Efficient, and Durable Metal-Air Flow Batteries," Journal of Materials Chemisty A, Roya Society of Chemistry, Dec. 3, 2019, vol. 7, No. 47, pp. 26744-26768.
The State Intellectual Property Office of People's Republic of China, "First Office Action", issued in related Chinese Application No. CN201980056771.3, dated Jan. 30, 2024, Including English Translation (5 pages).
The U.S. Patent and Trademark Office, "Final Office Action", issued in related U.S. Appl. No. 16/913,877, dated Mar. 12, 2024 (12 Pages).
Cao, Z. et al., "Planar all-solid-state rechargeable Zn-air batteries for compact wearable energy storage", Journal of Materials Chemistry A, 2019, vol. 7, pp. 17581-17593 (13 pages).
International Application Division Koren Intellecttual Property Office, "International Search Report and Written Opinion", issued in related PCT/US2023/076700, mailed on Jan. 22, 2024 (13 pages).
The U.S. Patent and Trademark Office, "Non-Final Action", issued in related U.S. Appl. No. 16/456,860, dated Apr. 17, 2024 (17 pages).
International Search Report and Written Opinion in PCT/US2023/030935, mailed Dec. 14, 2023, 9 pages.
Second Office Action in CN201980056771.3, mailed Jun. 13, 2024, 12 pages, with English language translation.
Office Action in U.S. Appl. No. 17/313,819, mailed May 31, 2024, 8 pages.
Office Action in CN201980056772.8, mailed Jul. 11, 2024, 12 pages, with English language translation.
Office Action in TW109144569, mailed Sep. 5, 2024, 15 pages.

\* cited by examiner

STACK OF ELECTRIC BATTERIES INCLUDING SERIES OF FLUIDLY CONNECTED UNIT CELLS

RELATED APPLICATIONS

This application claims the benefit of priority to U.S. Provisional Patent Application 62/692,375 entitled "Rolling Diaphragm Seal" filed Jun. 29, 2018, the entire contents of which are hereby incorporated by reference for all purposes. This application is related to U.S. Non-Provisional patent application Ser. No. 16/456,571 entitled "Aqueous Polysulfide-Based Electrochemical Cell" filed Jun. 28, 2019 and this application is related to U.S. Non-Provisional patent application Ser. No. 16/456,860 entitled "Metal Air Electrochemical Cell Architecture" filed Jun. 28, 2019. The entire contents of both related applications are hereby incorporated by reference for all purposes.

TECHNICAL FIELD

The invention relates generally to energy storage, and more specifically to electric batteries for long term energy storage.

BACKGROUND

Renewable power sources are becoming more prevalent and cost effective. However, many renewable power sources face an intermittency problem that is hindering renewable power source adoption. The impact of the intermittent tendencies of renewable power sources can be mitigated by pairing renewable power sources energy storage systems, such as energy storage systems leveraging rechargeable battery chemistries.

Energy storage technologies are playing an increasingly important role in electric power grids; at a most basic level, these energy storage assets provide smoothing to better match generation and demand on a grid. The services performed by energy storage devices are beneficial to electric power grids across multiple time scales, from milliseconds to years. Today, energy storage technologies exist that can support timescales from milliseconds to hours, but there is a need for long and ultra-long duration (collectively, at least $\geq 8$ h) energy storage systems.

In many rechargeable battery chemistries, the charge-storing materials undergo dimensional changes as a function of state-of-charge of the battery. Such volume changes can occur due to the precipitation of a discharge product from a soluble intermediate or due to the conversion of one solid phase of lower molar volume to another of greater molar volume ($cm^3/mol_{metal}$). For metal electrodes undergoing oxidation, this volume change is described by the Pilling-Bedworth ratio, which measures the ratio of the volume of the elementary crystallographic cell of a metal oxide to the volume of the elementary crystallographic cell of the corresponding metal. When undergoing reduction, the metal electrode is subject to volume change in the opposite direction. For metals with a Pilling-Bedworth ratio greater than unity (>1), the electrode expands in volume during oxidation and shrinks on reduction. For metals with a Pilling-Bedworth ratio less than unity (<1), the electrode contracts in volume during oxidation and shrinks on reduction. Depending on the configuration of the battery, reduction or oxidation of the metal electrode may correspond to either the charging or discharging operation of the battery. For example, if the metal electrode is the negative electrode (sometimes called the anode) of the battery, then the metal is oxidized during discharge and reduced during charge; if the metal electrode is the positive electrode (sometimes called the cathode) of the battery, then the metal is reduced during discharge and oxidized during charge. Such interior volume changes in batteries can occur over time and present challenges in sealing the internal components of batteries, such as liquid electrolytes, electrodes, etc., from the environment. Typical dynamic seals can wear with movement cycles and have a finite lifetime. This finite lifetime of typical dynamic seals presents a challenge in energy storage technologies, especially in supporting long and ultra-long duration (collectively, at least $\geq 8$ h) energy storage systems.

This Background section is intended to introduce various aspects of the art, which may be associated with embodiments of the present inventions. Thus, the foregoing discussion in this section provides a framework for better understanding the present inventions, and is not to be viewed as an admission of prior art.

SUMMARY

Various embodiments may provide a new and improved battery system for long term energy storage using a rolling diaphragm to enable battery components to expand or contract as the battery charges and discharges. Various embodiments may provide a modular containment structure for the bearing that can be made from molded plastic. Various embodiments may provide mating features in the top and bottom regions of the structure such that the batteries can be stacked upon each other with their mating features mechanically coupled. Various embodiments may provide electrical connections at the mating features such that when the batteries are stacked upon each other, the batteries' own weight presses the electrical contacts together to ensure good electrical contact.

Systems, materials, designs, and methods of the various embodiments may provide a battery with an outer containment structure and an internal rolling diaphragm (e.g., a cylindrical rolling diaphragm, a square rolling diaphragm, a hexagonal rolling diaphragm, an oval rolling diaphragm, or any other geometry rolling diaphragm) configured to move to accommodate an internal volume change of one or more energy storage components of the battery and an electrode assembly (e.g., an air electrode assembly, a non-air breathing electrode assembly, etc.). The rolling diaphragm forms a seal between an outer housing (e.g., a cylindrical housing, a square housing, a hexagonal housing, an oval housing, or any other geometry housing) of a battery and an inner volume (e.g., a cylindrical volume, a square volume, a hexagonal volume, an oval volume, or any other geometry volume) such that movement of the inner housing within the outer housing convolve the rolling diaphragm seal to change an extended length of the rolling diaphragm seal. The rolling diaphragm seal prevents battery electrolyte from passing between the outer housing and the inner housing to an air environment. The rolling diaphragm seal further prevents the electrolyte surface of the battery from being exposed to a static seal interface between a joint at which two portions of the outer housing meet. The rolling diaphragm seal may be formed of an elastomer, such as silicone and may be coupled to the outer housing by a band passing around a current collector within the outer housing. An electrode assembly including an air electrode may be supported on a buoyant porous or honeycomb platform in the middle of the rolling diaphragm such that the air electrode is above a surface of a volume of electrolyte when the buoyant platform is floating in the electrolyte. The electrode assembly may have any porous or perforated geometry such as a honeycomb, square mesh, diagonal mesh, or any geometry and may be monolithic or joined such as by weaving or welding or other non-weaving joining methods. An electrical feed through in the outer cylindrical housing enables an electrical lead from a current collector to pass through the outer cylindrical housing and connect to electrically conductive column structures connected to the containment structure and with mating mounting features on their upper and lower regions to provide electrical connections between the current collectors of two or more stacked batteries.

Systems and methods of the various embodiments may provide a battery including a rolling diaphragm configured to move to accommodate an internal volume change of one or more components of the battery. In various embodiments, a battery may include a rolling diaphragm configured to move to accommodate an internal volume change of one or more components of the battery and an air electrode assembly. In various embodiments, a battery may include a rolling diaphragm configured to move to accommodate an internal volume change of one or more components of the battery, an air electrode assembly, and a condensed phase (e.g., liquid or solid) second electrode. In various embodiments, the battery may be a metal-air battery. Various embodiments may provide a battery architecture including a rolling diaphragm seal disposed between an interior volume of the battery and an air electrode assembly within the battery. In various embodiments, a rolling diaphragm seal (e.g., a cylindrical rolling diaphragm seal, a square rolling diaphragm seal, an oval rolling diaphragm seal, a hexagonal rolling diaphragm seal, or any other geometry rolling diaphragm seal) may form a seal between an outer housing (e.g., a cylindrical outer housing, a square outer housing, a hexagonal outer housing, an oval outer housing, or any other geometry outer housing) of a battery and an inner housing (e.g., a cylindrical inner housing, a square inner housing, a hexagonal inner housing, an oval inner housing, or any other geometry inner housing) such that movement of the inner housing within the outer housing may convolve the rolling diaphragm seal to change an extended length of the rolling diaphragm seal. In various embodiments, the rolling diaphragm seal may prevent liquid electrolyte of the battery from passing between the outer housing and the inner housing to an air environment. In various embodiments, the rolling diaphragm seal may prevent a liquid surface of liquid electrolyte of the battery from being exposed to a static seal interface between a joint at which two portions of the outer housing meet. In various embodiments, the rolling diaphragm seal may be formed of an elastomer, such as silicone. In various embodiments, the rolling diaphragm may be coupled to the outer housing by a band passing around a current collector within the outer housing. In various embodiments, a honeycomb structure may be disposed within the inner housing. In various embodiments, an electrical feedthrough in the outer housing may enable an electrical lead from a current collector to pass through the outer housing. In various embodiments, the outer housing may be formed of a double wall construction. In various embodiments, a series of electrically conductive rods coupled to the outer housing surface may provide electrical connections between the current collectors of two or more stacked batteries. The series of rods may also act as structural reinforcements and may also include mating and/or mounting features on their upper and lower regions to provide electrical connections between the current collectors of two or more stacked batteries.

Various embodiments may provide an air electrode assembly including an air electrode supported on a buoyant platform such that the air electrode is above a surface of a volume of electrolyte when the buoyant platform is floating in the electrolyte. Various embodiments may provide a battery including a floating air electrode assembly.

Various embodiments may provide an electric battery, comprising a rolling diaphragm, wherein the rolling diaphragm moves to accommodate an internal volume change of one or more components of the battery. Various embodiments may provide a battery further comprising: an outer cylindrical housing configured to support a liquid electrolyte and electrode therein; and an inner cylinder movably supported within the outer cylindrical housing, wherein the rolling diaphragm is a cylindrical rolling diaphragm forming a seal between the outer cylindrical housing and the inner cylinder, and wherein movement of the inner cylinder within the outer cylindrical housing convolves the cylindrical rolling diaphragm seal to change an extended length of the cylindrical rolling diaphragm seal. In various embodiments, the cylindrical rolling diaphragm seal is coupled at a first end to the outer cylindrical housing and a second end to the inner cylinder. In various embodiments, the outer cylindrical housing is open at a first end; the inner cylinder is open at a first end to an air environment; and the seal formed between the outer cylindrical housing and the inner cylinder by the cylindrical rolling diaphragm seal prevents the liquid electrolyte from passing between the outer cylindrical housing and the inner cylinder to the air environment. In various embodiments, the inner cylinder is: open at second end opposite the first end; and configured to support an air electrode. In various embodiments, the rolling diaphragm is comprised of silicone. In various embodiments, the battery further comprises a honeycomb structure disposed within inner cylinder. In various other embodiments the battery further comprises a square mesh, diagonal mesh, or nonwoven porous structure in place of or in addition to the honeycomb structure. In various embodiments, the outer cylindrical housing further comprises an electrical feedthrough port, and the battery further comprises: a current collector within the outer cylindrical housing; and an electrical lead attached to the current collector and passing out of the outer cylindrical housing through the electrical feedthrough port. In various embodiments, the cylindrical rolling diaphragm seal is coupled to the outer cylindrical housing by a band passing around the current collector. In various embodiments, the outer cylindrical housing comprises a double layer wall. In various embodiments, the electrode supported in the outer cylindrical housing is a metal electrode. In various embodiments, the metal electrode comprises lithium (Li), sodium (Na), potassium (K), magnesium (Mg), calcium (Ca), silicon (Si), aluminum (Al), zinc (Zn), and/or iron (Fe) and/or alloys comprised of one or more of the foregoing metallic elements. In various embodiments, the electrode supported in the outer cylindrical housing is a liquid or solid phase electrode. In various embodiments, the battery further comprises the liquid electrolyte and the electrode, wherein the liquid electrolyte and electrode are disposed on a same side of the cylindrical rolling diaphragm seal.

Various embodiments may provide an electric battery, wherein an outer housing contains a plurality of conductors coupled to an outer surface of the battery, each of the series of rods comprising: an upper electrical contact plate at a first end; and a lower electrical contact plate at a second end. In various embodiments, the upper electrical contact plate is configured to contact a lower electrical contact plate of a second battery when the second battery is stacked on top of the battery; and the lower electrical contact plate is configured to contact an upper electrical contact plate of a third battery when the battery is stacked on top of the third battery. In various embodiments, the series of rods comprises three rods. In various embodiments, the battery further comprises an electrical lead connecting the upper electrical contact plate to the lower electrical contact plate, the electrical lead passing through the outer housing and connected to a current collector within the outer housing.

Various embodiments may provide an air electrode assembly, comprising: an air electrode having at least one hole formed therein passing from a top surface of the air electrode to a bottom surface of the air electrode; a buoyant platform supporting the bottom surface of the air electrode on a top surface of the buoyant platform, the buoyant platform having at least one hole formed therein passing from the top surface to a bottom surface of the buoyant platform, wherein the buoyant platform is configured to float in a volume of liquid electrolyte such that the top surface of the buoyant platform and the bottom surface of the air electrode are above a surface of the volume of liquid electrolyte.

Various embodiments may provide an air electrode assembly, comprising: a carbon material coated with a buoyant and/or hydrophobic organic coating material. In various embodiments, the coating material is polypropylene or polystyrene. In various embodiments, the coating material comprises a continuous surface layer or wherein the coating material comprises a collection of one or more disparate surface deposits.

Various embodiments may provide a stack of electric batteries, comprising: a series of unit cells arranged in stacked layers, wherein each unit cell comprises: a bed of metal pellets; and an air electrode, and wherein each stacked layer of unit cells is fluidly connected such that electrolyte from a highest of the stacked layers flows to a lowest of the stacked layers. In various embodiments, the air electrode of each unit is connected to load bearing bus bars. In various embodiments, the highest of the stacked layers includes less unit cells than the lowest of the stacked layers.

Various embodiments may provide an electric battery, comprising: a cathode configured to float in a volume of liquid electrolyte. In various embodiments, the cathode is a dual ORR/OER cathode. In various embodiments, the cathode is an air electrode. In various embodiments, the cathode is an ORR cathode. In various embodiments, the ORR cathode floats on top of the electrolyte and an OER cathode is submerged in the electrolyte. In various embodiments, the cathode is curved and the center of curvature resides outside the volume of liquid electrolyte. In various embodiments, the cathode is a planar cathode tilted at an angle greater than zero and less than 90 degrees with respect to the plane of the top of the electrolyte. In various embodiments, the cathode is further configured to submerge in the electrolyte during OER and float on the electrolyte during ORR.

Various embodiments may provide a bulk energy storage system, comprising: one or more batteries, wherein at least one of the one or more batteries comprises: a rolling diaphragm, wherein the rolling diaphragm moves to accommodate an internal volume change of one or more components of the battery. In various embodiments, the bulk energy storage system is a long duration energy storage (LODES) system.

Various embodiments may provide a bulk energy storage system, comprising: one or more batteries, wherein at least one of the one or more batteries comprises: an outer housing contains a plurality of conductors coupled to an outer surface of the battery, each of the series of rods comprising: an upper electrical contact plate at a first end; a lower electrical contact plate at a second end; and an electrical lead connecting the upper electrical contact plate to the lower electrical contact plate, the electrical lead passing through the outer housing and connected to a current collector within the outer housing. In various embodiments, the bulk energy storage system is a long duration energy storage (LODES) system.

Various embodiments may provide a bulk energy storage system, comprising: one or more batteries, wherein at least one of the one or more batteries comprises an air electrode assembly comprising: an air electrode having at least one hole formed therein passing from a top surface of the air electrode to a bottom surface of the air electrode; a buoyant platform supporting the bottom surface of the air electrode on a top surface of the buoyant platform, the buoyant platform having at least one hole formed therein passing from the top surface to a bottom surface of the buoyant platform, wherein the buoyant platform is configured to float in a volume of liquid electrolyte such that the top surface of the buoyant platform and the bottom surface of the air electrode are above a surface of the volume of liquid electrolyte. In various embodiments, the bulk energy storage system is a long duration energy storage (LODES) system.

Various embodiments may provide, a bulk energy storage system, comprising: one or more batteries, wherein at least one of the one or more batteries comprises an air electrode assembly comprising a carbon material coated with a buoyant and/or hydrophobic organic coating material. In various embodiments, the bulk energy storage system is a long duration energy storage (LODES) system.

Various embodiments may provide a bulk energy storage system, comprising: one or more batteries, wherein at least one of the one or more batteries comprises: a series of unit cells arranged in stacked layers, wherein each unit cell comprises: a bed of metal pellets; an OER electrode; and an ORR electrode, and wherein each stacked layer of unit cells is fluidly connected such that electrolyte from a highest of the stacked layers flows to a lowest of the stacked layers. In various embodiments, the bulk energy storage system is a long duration energy storage (LODES) system.

Various embodiments may provide a bulk energy storage system, comprising: one or more batteries, wherein at least one of the one or more batteries comprises a cathode configured to float in a volume of liquid electrolyte. In various embodiments, the cathode is a dual ORR/OER cathode. In various embodiments, the cathode is further configured to submerge in the electrolyte during OER and float on the electrolyte during ORR. In various embodiments, the bulk energy storage system is a long duration energy storage (LODES) system.

Various embodiments may provide an electric battery comprising: an outer housing, comprising: a first end and a second end; the outer housing defining a length between the first end and the second end, a width, and an internal volume; an active battery component in the volume and positioned adjacent to the second end of the outer containment structure; wherein the active battery comment comprises an electrolyte, an electrode, or both; an inner housing located within the internal volume of the outer housing; the inner housing defining an inner housing volume and comprising an electrode; a membrane having a thickness and a length; wherein the membrane is connected to the outer housing and connected to the inner housing; whereby the membrane divides the internal volume of the outer housing into a first volume; wherein the active battery component is positioned in the second volume; wherein the first volume is in fluid communication with the inner housing volume; and whereby the membrane prevents fluid communication between the first volume and the second volume; and the inner housing and the outer housing in slidable engagement, whereby the inner housing can move along at least a portion of the length of the outer housing. In various embodiments, during movement of the inner housing, the length of the membrane does not change. In various embodiments, during movement of the inner housing the thickness of the membrane does not change. In various embodiments, the first end of the outer housing is open to an environment selected from gaseous, air and the atmosphere. In various embodiments, the membrane has an inner surface and an outer surface, and during the movement of the inner housing a portion of the outer membrane surface faces itself. In various embodiments, the membrane has an inner surface and an outer surface, and during the movement of the inner housing a portion of the outer membrane surface contacts itself. In various embodiments, an inner surface of the outer housing is a distance of at least 2x the membrane thickness from an outer surface of the inner housing. In various embodiments, an inner surface of the outer housing is a distance of about 1.5x to 4x the membrane thickness from an outer surface of the inner housing. In various embodiments, the membrane is seamless. In various embodiments, there are no moving seal interfaces.

Various embodiments may provide an electric battery comprising: an outer housing, comprising: a first end and a second end; the outer housing defining a length between the first end and the second end, a width, and an internal volume; an active battery component in the volume and positioned adjacent the second end of the outer containment structure; wherein the active battery comment comprises an electrolyte, an electrode, or both; an inner housing located within the internal volume of the outer housing; the inner housing defining an inner housing volume and comprising an electrode; a membrane having a thickness and a length; wherein the membrane is connected to the outer housing and connected to the inner housing; whereby the membrane divides the internal volume of the outer housing into a first volume; wherein the active battery component is positioned in the second volume; wherein the first volume is in fluid communication with the inner housing volume; and whereby the membrane prevents fluid communication between the first volume and the second volume; and the inner housing and the outer housing in slidable engagement, whereby the inner housing can move along at least a portion of the length of the outer housing. In various embodiments, the inner housing can move a distance that is at least about 10% the length of the membrane. In various embodiments, the inner housing can move a distance that is at least about 10% length of the membrane. In various embodiments, the inner housing can move a distance that is at least about 80% the length of the membrane. In various embodiments, the inner housing can move a distance that is at least about 100% the length of the membrane. In various embodiments, the inner housing can move a distance that is from about 10% to about 200% the length of the membrane. In various embodiments, during movement of the inner housing the thickness of the membrane does not change. In various embodiments, the first end of the outer housing is open to an environment selected from gaseous, air and the atmosphere. In various embodiments, the membrane has an inner surface and an outer surface, and during the movement of the inner housing a portion of the outer membrane surface faces itself. In various embodiments, the membrane has an inner surface and an outer surface, and during the movement of the inner housing a portion of the outer membrane surface contacts itself. In various embodiments, an inner surface of the outer housing is a distance of at least 2x the membrane thickness from an outer surface of the inner housing. In various embodiments, an inner surface of the outer housing is a distance of about 1.5x to 4x the membrane thickness from an outer surface of the inner housing. In various embodiments, the membrane is seamless. In various embodiments, there are no moving seal interfaces. In various embodiments, the active battery component comprises a metal, and the inner housing can move a distance that is corresponds to the entire range of the Pilling-Bedworth ratio for the oxidation of the metal. In various embodiments, the active battery component comprises a liquid electrolyte and metal electrode. In various embodiments, the active battery component comprises an electrolyte and a metal electrode, wherein the metal electrode comprises a component selected from the group consisting of iron, a bulk solid; a collection of particles; a suspension; particles that are not buoyant in the electrolyte; a metal mesh electrode; an iron mesh electrode; a metal felt electrode, an iron felt electrode; sintered metals; sintered iron; porous sintered metals; a porous bed of pellets, a gelled metal electrode; and a composite metal electrode formed from two or more different materials. In various embodiments, the active battery component comprises an electrolyte and a metal electrode, wherein the metal electrode comprises a component selected from the group consisting of a bed of direct reduced iron (DRI) pellets, and a bed of sponge iron pellets; and a bed of pellets comprising iron. In various embodiments, the active battery component comprises an electrolyte and a metal electrode, wherein the metal electrode comprises a component selected from the group consisting of a metal, a metal alloy, lithium (Li), sodium (Na), potassium (K), magnesium (Mg), calcium (Ca), silicon (Si), aluminum (Al), zinc (Zn), and iron (Fe).

Various embodiments may provide an electric battery, comprising: a first section and a second section, the first section in movable engagement with the second section, whereby the first section can move a distance relative to the second section; a diaphragm connecting the first section to the second section, and sealing at least a portion of the first section from at least a portion of the second section; the diaphragm having a length and a thickness; and, wherein the distance is from about 10% to about 200% the length of the diaphragm; whereby the diaphragm accommodates an internal volume change of the first, or the second section.

Various embodiments may provide an electric battery, comprising: a first section and a second section, the first section in movable engagement with the second section, whereby the first section can move a distance relative to the second section; a membrane connecting the first section to the second section, and separating at least a portion of the first section from at least a portion of the second section; and, the membrane having a length and a thickness; wherein the membrane having an inner surface and an outer surface, and wherein during at least a portion of the movement the outer membrane surface faces itself; whereby the membrane accommodates an internal volume change of the first, or the second section.

Various embodiments may provide an electric battery, comprising: a first section and a second section, the first section in movable engagement with the second section, whereby the first section can move a distance relative to the second section; a membrane connecting the first section to the second section, and separating at least a portion of the first section from at least a portion of the second section; and, the membrane having a length and a thickness; wherein the membrane has an inner surface and an outer surface, and during at least a portion of the movement the outer membrane surface contacts itself; whereby the membranes accommodate an internal volume change of the first, or the second section. In various embodiments, the first section comprises a metal and the internal volume change corresponds to the entire range of the Pilling-Bedworth ratio for the oxidation of the metal.

Various embodiments may provide an electrical system configured to manage the intermittencies in non-hydrocarbon based electricity generation to provide predetermined distribution of electricity, the electrical system comprising: a means to generate electricity from non-hydrocarbon energy sources; a bulk energy storage system comprising plurality of batteries, wherein the batteries comprise: a first section and a second section, the first section in movable engagement with the second section, whereby the first section can move a distance relative to the second section; a membrane connecting the first section to the second section, and sealing at least a portion of the first section from at least a portion of the second section; the membrane having a length and a thickness; and, wherein the distance is from about 10% to about 200% the length of the diaphragm; electrical power transmission facilities; the means to generate electricity from non-hydrocarbon energy sources, the batteries and the electrical power transmission facilities, in electrical communication, whereby electricity can be transmitted therebetween; and, the electrical system configured for electrical connection to a power grid, an industrial customer or both. In various embodiments, the means to generate electricity from non-hydrocarbon energy sources is selected from the group consisting of a wind farm, a thermal power plant, and a solar power plant. In various embodiments, the system includes a hydrocarbon based electrical power plant, an atomic energy based electric power plant, or both.

Various embodiments may provide a method of operating an electrical system configured to manage the variations in non-hydrocarbon based electricity generation to provide predetermined uniform distribution of electricity; the method comprising transferring electricity into a bulk energy storage system, storing the electricity in the bulk energy storage system, transferring the electricity out of the bulk energy storage system; wherein the electrical system comprises: a means to generate electricity from non-hydrocarbon energy sources; electrical power transmission facilities; the bulk energy storage system comprising a plurality of batteries, wherein the batteries comprise: a first section and a second section, the first section in movable engagement with the second section, whereby the first section can move a distance relative to the second section; a membrane connecting the first section to the second section, and sealing at least a portion of the first section from at least a portion of the second section; and, the membrane having a length and a thickness; wherein the distance is from about 10% to about 200% the length of the diaphragm; the means to generate electricity from non-hydrocarbon energy sources, the LODES and the electrical power transmission facilities, in electrical communication, whereby electricity can be transmitted therebetween; and, the electrical system configured for electrical connection to a power grid, an industrial customer or both.

Various embodiments may provide a system including a bulk energy storage system that is a LODES having a duration of about 24 hours to about 500 hours, and a power rating of from about 10 MW to about 50 MW. Various embodiments may provide a system including a bulk energy storage system that is a LODES having a duration of about 8 hours to about 2000 hours, and a power rating of from about 0.5 MW to about 500 MW. Various embodiments may provide a system including a bulk energy storage system that is a LODES having a duration of about 8 hours to about 100 hours, and a power rating of from about 0.5 MW to about 500 MW. Various embodiments may provide a system including a bulk energy storage system that is a LODES having a duration of about 24 hours to about 500 hours, and a power rating of from about 10 MW to about 50 MW. Various embodiments may provide a system including a bulk energy storage system that is a LODES having a duration of about 8 hours to about 2000 hours, and a power rating of from about 0.01 MW to about 50,000 MW. Various embodiments may provide a system including a bulk energy storage system that is a LODES having a duration of about 8 hours to about 2000 hours, and a power rating of from about 0.5 MW to about 500 MW. Various embodiments may provide a system including a bulk energy storage system that is a LODES having a duration of about 50 hours to about 500 hours, and a power rating of from about 0.01 MW to about 50,000 MW. Various embodiments may provide a system including a bulk energy storage system that is a LODES having a duration of about 24 hours to about 500 hours, and a power rating of from about 0.5 MW to about 500 MW. Various embodiments may provide a system including a bulk energy storage system that is a LODES having a duration of about 50 hours to about 1000 hours, and a power rating of from about 0.5 MW to about 1000 MW.

BRIEF DESCRIPTION OF THE FIGURES

The accompanying drawings, which are incorporated herein and constitute part of this specification, illustrate example embodiments of the claims, and together with the general description given above and the detailed description given below, serve to explain the features of the claims.

DETAILED DESCRIPTION

Figure 1:
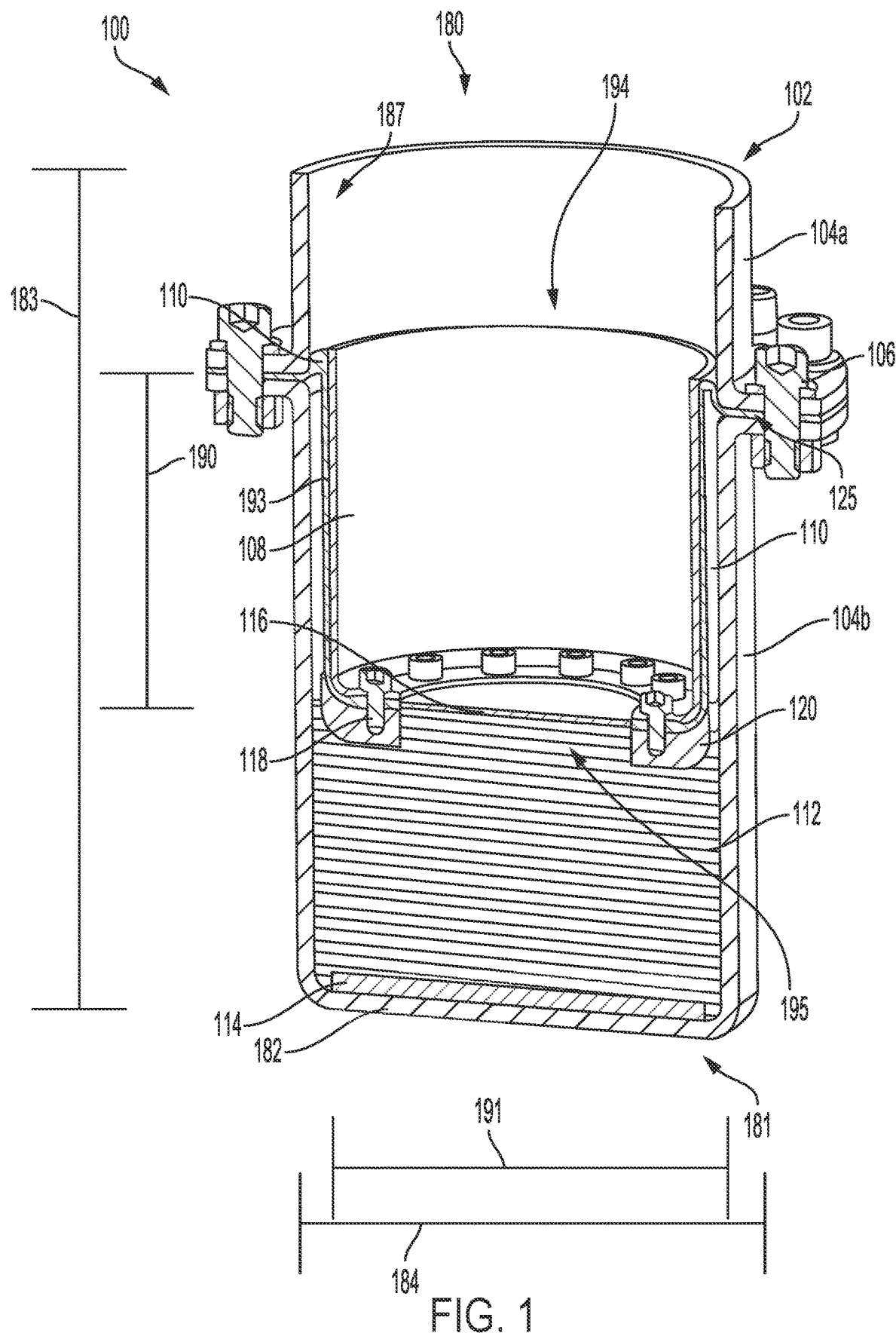
FIG. 1 is a sectional isometric view of a portion of an embodiment battery including a cylindrical rolling diaphragm seal.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims. The following description of the embodiments of the invention is not intended to limit the invention to these embodiments but rather to enable a person skilled in the art to make and use this invention. Unless otherwise noted, the accompanying drawings are not drawn to scale.

As used herein, unless stated otherwise, room temperature is 25° C. And, standard temperature and pressure is 25° C. and 1 atmosphere. Unless expressly stated otherwise all tests, test results, physical properties, and values that are temperature dependent, pressure dependent, or both, are provided at standard ambient temperature and pressure.

Generally, the term "about" as used herein unless specified otherwise is meant to encompass a variance or range of ±10%, the experimental or instrument error associated with obtaining the stated value, and preferably the larger of these.

As used herein unless specified otherwise, the recitation of ranges of values herein is merely intended to serve as a shorthand method of referring individually to each separate value falling within the range. Unless otherwise indicated herein, each individual value within a range is incorporated into the specification as if it were individually recited herein.

The following examples are provided to illustrate various embodiments of the present systems and methods of the present inventions. These examples are for illustrative purposes, may be prophetic, and should not be viewed as limiting, and do not otherwise limit the scope of the present inventions.

It is noted that there is no requirement to provide or address the theory underlying the novel and groundbreaking processes, materials, performance or other beneficial features and properties that are the subject of, or associated with, embodiments of the present inventions. Nevertheless, various theories are provided in this specification to further advance the art in this area. The theories put forth in this specification, and unless expressly stated otherwise, in no way limit, restrict or narrow the scope of protection to be afforded the claimed inventions. These theories many not be required or practiced to utilize the present inventions. It is further understood that the present inventions may lead to new, and heretofore unknown theories to explain the function-features of embodiments of the methods, articles, materials, devices and system of the present inventions; and such later developed theories shall not limit the scope of protection afforded the present inventions.

The various embodiments of systems, equipment, techniques, methods, activities and operations set forth in this specification may be used for various other activities and in other fields in addition to those set forth herein. Additionally, these embodiments, for example, may be used with: other equipment or activities that may be developed in the future; and, with existing equipment or activities which may be modified, in-part, based on the teachings of this specification. Further, the various embodiments and examples set forth in this specification may be used with each other, in whole or in part, and in different and various combinations. Thus, for example, the configurations provided in the various embodiments of this specification may be used with each other; and the scope of protection afforded the present inventions should not be limited to a particular embodiment, configuration or arrangement that is set forth in a particular embodiment, example, or in an embodiment in a particular figure.

Embodiments of the present invention include apparatus, systems, and methods for long-duration, and ultra-long-duration, low-cost, energy storage. Herein, "long duration" and/or "ultra-long duration" may refer to periods of energy storage of 8 hours or longer, such as periods of energy storage of 8 hours, periods of energy storage ranging from 8 hours to 20 hours, periods of energy storage of 20 hours, periods of energy storage ranging from 20 hours to 24 hours, periods of energy storage of 24 hours, periods of energy storage ranging from 24 hours to a week, periods of energy storage ranging from a week to a year (e.g., such as from several days to several weeks to several months), etc. In other words, "long duration" and/or "ultra-long duration" energy storage cells may refer to electrochemical cells that may be configured to store energy over time spans of days, weeks, or seasons. For example, the electrochemical cells may be configured to store energy generated by solar cells during the summer months, when sunshine is plentiful and solar power generation exceeds power grid requirements, and discharge the stored energy during the winter months, when sunshine may be insufficient to satisfy power grid requirements.

In many rechargeable battery chemistries, the charge-storing materials undergo dimensional changes as a function of state-of-charge of the battery. Such volume changes are known to occur, for example, in lithium storage compounds such as graphite, silicon, lithium cobalt oxide, lithium manganese oxide, lithium iron phosphate, and others, as well as in hydrogen storage electrodes used in nickel metal hydride batteries. Such volume changes may also occur due to the precipitation of a discharge product from a soluble intermediate, as occurs in lithium sulfur batteries, wherein solid sulfur is initially reduced to form soluble polysulfide intermediates, which after subsequent further reduction, form sodium sulfide precipitates. Additional examples include the precipitation of lithium oxide, lithium peroxide, or lithium hydroxide solid phases in lithium-air batteries. Further additional examples include the alkaline iron electrode, in which iron metal is oxidized to form iron hydroxide, iron oxyhydroxide, and/or iron oxide, all of which experience a large volume change. For metal electrodes, this volume change is described by the Pilling-Bedworth ratio, which measures the ratio of the volume of the elementary crystallographic cell of a metal oxide to the volume of the elementary crystallographic cell of the corresponding metal. Such interior volume changes in batteries may occur over time and present challenges in sealing the internal components of batteries, such as liquid electrolytes, electrodes, etc., from the environment. Typical dynamic seals may wear with movement cycles and have a finite lifetime Rolling diaphragm seals may provide a solution to sealing the interior of batteries. Rolling diaphragm seals may create a flexible seal with no moving seal interfaces and a seamless design.

Systems and methods of the various embodiments may provide a battery including a rolling diaphragm configured to move to accommodate an internal volume change of one or more components of the battery. In various embodiments, a battery may include a rolling diaphragm configured to move to accommodate an internal volume change of one or more components of the battery and an air electrode assembly. In various embodiments, a battery may include a rolling diaphragm configured to move to accommodate an internal volume change of one or more components of the battery, an air electrode assembly, and a condensed phase (e.g., liquid or solid) second electrode. In various embodiments, the battery may be a metal-air battery.

Systems and methods of the various embodiments may provide a battery architecture including a rolling diaphragm seal disposed between two electrodes in a battery. In certain embodiments, the rolling diaphragm seal may be disposed between the interior volume of the battery and an air electrode assembly within the battery. In various embodiments, a cylindrical rolling diaphragm seal may form a seal between an outer cylindrical housing of a battery and an inner cylinder such that movement of the inner cylinder within the outer cylindrical housing may convolve the rolling diaphragm seal to change an extended length of the rolling diaphragm seal. In various embodiments, the rolling diaphragm seal may prevent liquid electrolyte of the battery from passing between the outer cylindrical housing and the inner cylinder to an air environment. In various embodiments, the rolling diaphragm seal may prevent a liquid surface of liquid electrolyte of the battery from being exposed to a static seal interface between a joint at which two portions of the outer cylindrical housing meet.

FIG. 1 shows a portion of an embodiment battery, such as a metal air battery 100 including a cylindrical rolling diaphragm seal 110. The metal air battery may include an outer cylindrical housing 102. In various embodiments, the outer cylindrical housing 102 may be open at one end to an air environment and closed at an opposite end. In various embodiments, the outer cylindrical housing 102 may be a multi-part structure formed from two or more sections, such as an upper section 104a coupled to a lower section 104b. The upper section 104a may be coupled to the lower section 104b in any manner, such as by bolts 106 joining flanges of the upper section 104a and lower section 104b. The upper section 104a and the lower section 104b may also be joined by a heat seal or chemical weld. The point at which the upper section 104a is joined to the lower section 104b may be a static seal interface 125 of the outer cylindrical housing 102.

The outer, the inner housing and both, may be, a cylinder, have a circular cross section, have an oval cross section, have a square cross section, have a rectangular cross section, have a hexagonal cross section, or be any other volumetric shape or structure that has a length and a width and a volume with the housing. In an embodiment the outer and inner housing have the same shapes with the inner housing being slidably associated with the outer housing so that the inner housing is movable within at least part of the length of the outer housing. The length of the inner housing can be the same, longer or shorter than the length of the outer housing.

The housing 102 having a first end 180 and second end 181. In an embodiment the second end 181 is closed by bottom 182, and the first end 180 is open to a gaseous environment, which preferably can be air or the atmosphere. The housing 102 has a length, shown by bar 183, and width shown by bar 184, the width 184 is the inner distance, e.g., the diameter between the inner surfaces 187 of the outer housing 102.

The inner cylinder 108 or inner housing, has a length, shown by bar 190 and a width, shown by bar 191. The width 191 is based upon the outer surface 193 of the inner housing 108. The width 191 is smaller than the width 184, in this embodiment by a distance that is equal to or slightly greater than the thickness of the diaphragm seal 110. The inner housing 108 has a first end 194 and a second end 195. In an embodiment the second end 195 is closed by bottom, which can be an electrode, and the first end 194 is open to a gaseous environment, which preferably can be air or the atmosphere.

Figure 3:
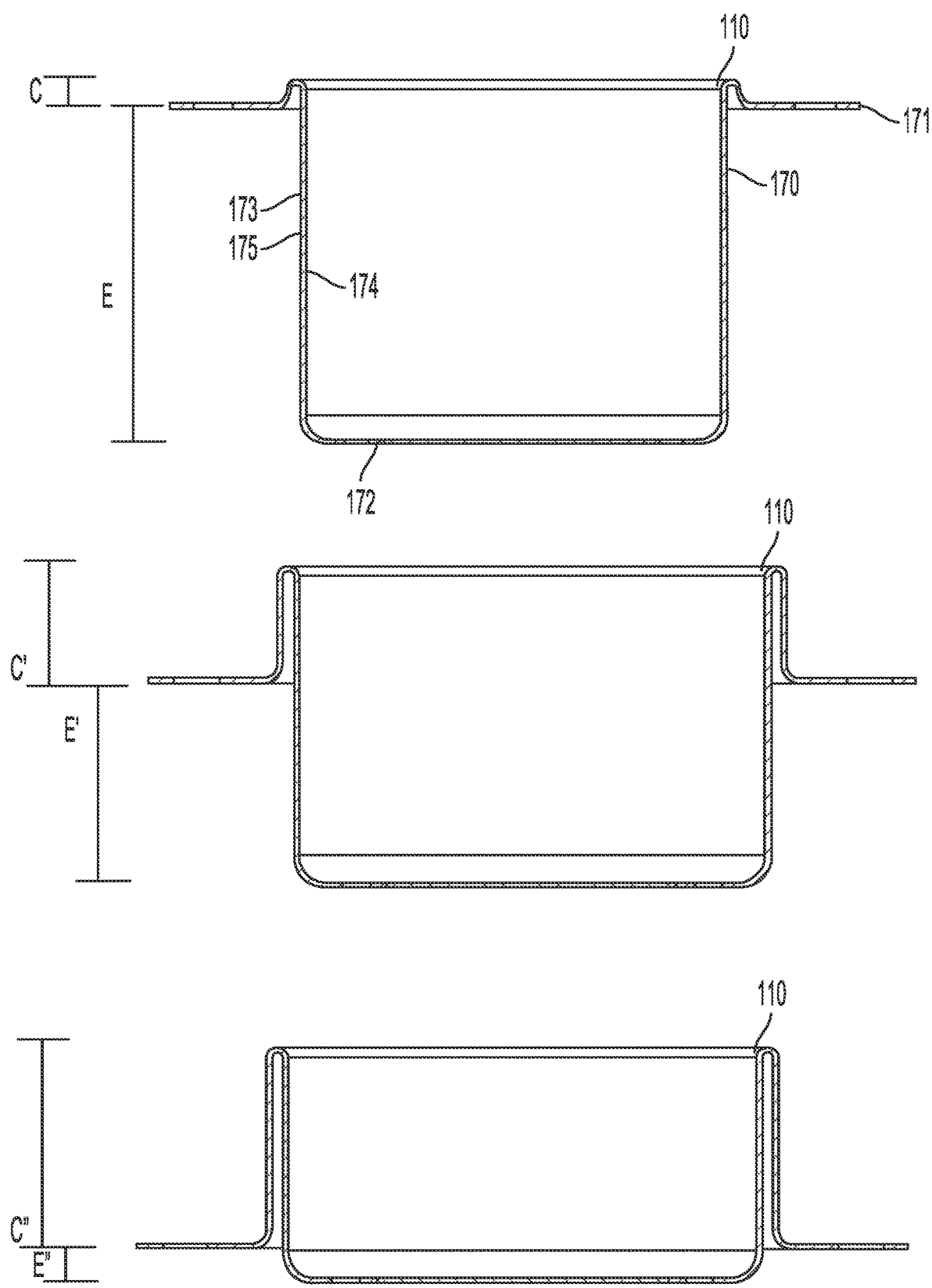
FIG. 3 shows cross sectional side views of the cylindrical rolling diaphragm of the embodiment battery of FIG. 1 at different states.

As shown in FIG. 3 the diaphragm 110 can be made from a membrane 170 having a first edge 171 and a second edge 172. The membrane 170 has a length defined by the distance between the first edge 171 and the second edge 172. The diaphragm membrane 170 has a thickness 173, between its inner surface 174 and its outer surface 175.

In this manner, the diaphragm 110 is positioned between the outer surface 193 of the inner housing 108 and the inner surface 187 of the outer housing 102, in a manner that permits the inner housing to move along, part or all of, the length of outer housing. The distance between the outer surface 193 and the inner surface 187, can be such that the inner surface 187, the outer surfaces 193, and both surfaces, remain in contact, either total or partial, with the diaphragm seal 110, during movement of the inner housing 108. In an embodiment, the distance between the outer surface 193 and the inner surface 187 is about 1.5×, about 2×, about 3× or greater, the thickness of the diaphragm membrane. In a preferred embodiment the distance the distance between the outer surface 193 and the inner surface 187 is about 2.0× to 4× the thickness of the diaphragm membrane.

In embodiments the housings and membrane are configured such that the inner housing can move a distance along the length of the outer housing that is from about 10% to about 190%, greater than 25%, greater than 70%, greater than 80%, greater than 90%, greater than 100%, greater than 160%, greater than 180% and from about 100% to about 160% of the length of the diaphragm membrane.

In various embodiments, the lower section 104b may be open at one end and closed at an opposite end and the upper section 104a may be open at both ends. The joining of the upper section 104a to the lower section 104b may form the outer cylindrical housing 102 open at one end to an air environment and closed at an opposite end.

In various embodiments, the outer cylindrical housing 102 may be configured to support active components 112 of the battery therein, such as in the lower section 104b of the outer cylindrical housing 102. Active components 112 may include various components of the battery 100, such as a liquid electrolyte and metal electrode. The metal electrode may be formed from a metal or metal alloy, such as lithium (Li), sodium (Na), potassium (K), magnesium (Mg), calcium (Ca), silicon (Si), aluminum (Al), zinc (Zn), or iron (Fe); or alloys substantially comprised of one or more of the foregoing metallic elements, such as an aluminum alloy or iron alloy. In various other embodiments the active components 112 may include non-metallic solid active materials such as sulfur (S), sodium sulfide (Na2S), lithium sulfide (Li2S), potassium sulfide (K2S), iron sulfide (FeS or FeS2), manganese dioxide (MnO2), etc. The metal electrode may be a solid, including a dense or porous solid, or a mesh or foam, or a particle or collection of particles, or may be a slurry, ink, suspension, or paste deposited within the outer cylindrical housing 102. In various embodiments, the metal electrode composition may be selected such that the metal electrode and the liquid electrolyte may not mix together. For example, the metal electrode may be a bulk solid. As another example, the metal electrode may be a collection of particles, small or bulky particles, within a suspension that are not buoyant enough to escape the suspension into the electrolyte. As another example, the metal electrode may be formed from particles that are not buoyant in the electrolyte. In various embodiments, a metal electrode may be a solid or slurry metal electrode. In various embodiments, a metal electrode may be a metal mesh electrode, such as an iron mesh electrode. In various embodiments, a metal electrode may be a metal felt electrode, such as an iron felt electrode. In various embodiments, a metal electrode may be an electrode formed from sintered metals, such as sintered iron. In various embodiments, a metal electrode may be an electrode formed from porous sintered metals. In various embodiments, a metal electrode may be gelled metal electrode, such as a gelled iron electrode. In various embodiments, a metal electrode may be a composite metal electrode formed from two or more different materials, such as two or more different metals, a metal and one or more different metal and/or no-metal materials, etc. In various embodiments, a metal electrode may be a porous bed of pellets, such as a porous bed of metal pellets (e.g., a bed of direct reduced iron (DRI) pellets, a bed of sponge iron pellets, etc.). In various embodiments, metal pellets may be produced from, or may be, iron ore pellets, such as taconite or magnetite or hematite. In various embodiments, the metal pellets may be produced by reducing iron ore pellets to form a more metallic (more reduced, less highly oxidized) material, such as iron metal ($Fe^0$), wustite (FeO), or a mixture thereof. In various non-limiting embodiments, the metal pellets may be reduced iron ore, direct reduced ("DR") iron ore, "DR Grade" iron ore pellets (which are not yet reduced), direct reduced iron ("DRI") pellets, or any combination thereof. In various non-limiting embodiments, the pellets may be disposed on one another (such as by dispersing or spreading, as in a bed of gravel), or may be mechanically attached or connected to one another by a process such as compaction or pressing. In other embodiments, the pellets may be physically connected by a process such as welding or brazing. In other embodiments, the pellets may be joined to one another by arc welding. In other embodiments, the pellets may be connected by a combination of such connecting processes. In other embodiments, the pellets may be attached and connected to one another by conductive wires strung through holes in the pellets. The holes in the pellets may introduce additional contact points throughout not only the thickness of the pellet bed that is the metal electrode, but also through the thickness of a single pellet. Once strung, the wires may be pulled tightly to enhance inter-pellet contact and then mechanically held in place by a mechanical stopper, which may be a conductive mechanical stopper, which in turn may be connected to a larger current collector plate. In some embodiments, pellets may be packed into a bed, optionally with the assistance of mechanical pressure applied by a high-temperature-resistant material, and then sintered in a non-oxidizing atmosphere. The result is a bed of pellets that are fused together with low inter-pellet contact resistance. In various embodiments, the metal electrode may be a bed of pellets with iron powder at the bottom of the bed of pellets. The placement of powder at the bottom of the bed increases the cross-sectional area of contact between the current collector plate and the pellet bed. While discussed and/or illustrated herein as generally round pellets, the pellets discussed herein may be any shape, such as smooth, jagged, oval, square, etc. In various embodiments, one or more current collectors may be included within outer cylindrical housing 102. In some embodiments, the current collectors may be two part collectors with a first part attached to a front face of the metal electrode and a second part attached to a back face of the metal electrode. The front face of an electrode may be the surface disposed generally toward the electrolyte and the back face of an electrode may be the surface disposed generally away from the electrolyte. In some embodiments, the first part may be attached to the front face may be a porous structure (e.g., a mesh) and the second part attached to the back face may be a solid. Having the current collector on the front face of the electrode and back face of the electrode may aid in applying a clamping force and may enable more uniform reaction rates throughout the entire electrode. The front and back portions of the current collectors may be short circuited together to impact reaction rate distributions. In some embodiments, the current collectors may clamp onto the metal electrode. In some embodiments, the current collectors may be rigid posts extending through the metal electrode.

In various embodiments, an inner cylinder 108 may be movably supported within the outer cylindrical housing 102.

The inner cylinder 108 may have an outer diameter that is less than the inner diameter of the outer cylindrical housing 102 such that the inner cylinder 108 may move longitudinally within the outer cylindrical housing 102. In various embodiments, the inner cylinder 108 may be formed as a tube open at both ends. In various embodiments, inner cylinder 108 may be supported in the outer cylindrical housing 102 such that one end of the inner cylinder 108 is open to the air environment and the opposite end of the inner cylinder 108 is open to the active components 112 supported within the outer cylindrical housing 102.

In various embodiments, the inner cylinder 108 may be configured to support an air electrode 116 at an end of the inner cylinder 108 open to the active components 112. The air electrode 116 may be a gas diffusion layer (GDL) including carbon configured to support the oxygen evolution reaction (OER) and/or oxygen reduction reaction (ORR) in different modes of operation. When the inner cylinder 108 is placed within the outer cylindrical housing 102, the air electrode 116 may contact the active components 112 supported within the outer cylindrical housing 102, such as the liquid electrolyte within the outer cylindrical housing 102. The liquid electrolyte may be disposed between the air electrode 116 and the metal electrode such that the air electrode 116 and the metal electrode are electrically isolated while remaining in ionic contact via the liquid electrolyte. In this manner the liquid electrolyte within the outer cylindrical housing 102 may act as an electrolyte layer separating the air electrode 116 and the metal electrode. In various embodiments, as the interior volume of the active components 112 changes, that volume change may cause the inner cylinder 108 to move up or down within the outer cylindrical housing 102.

Figure 26:
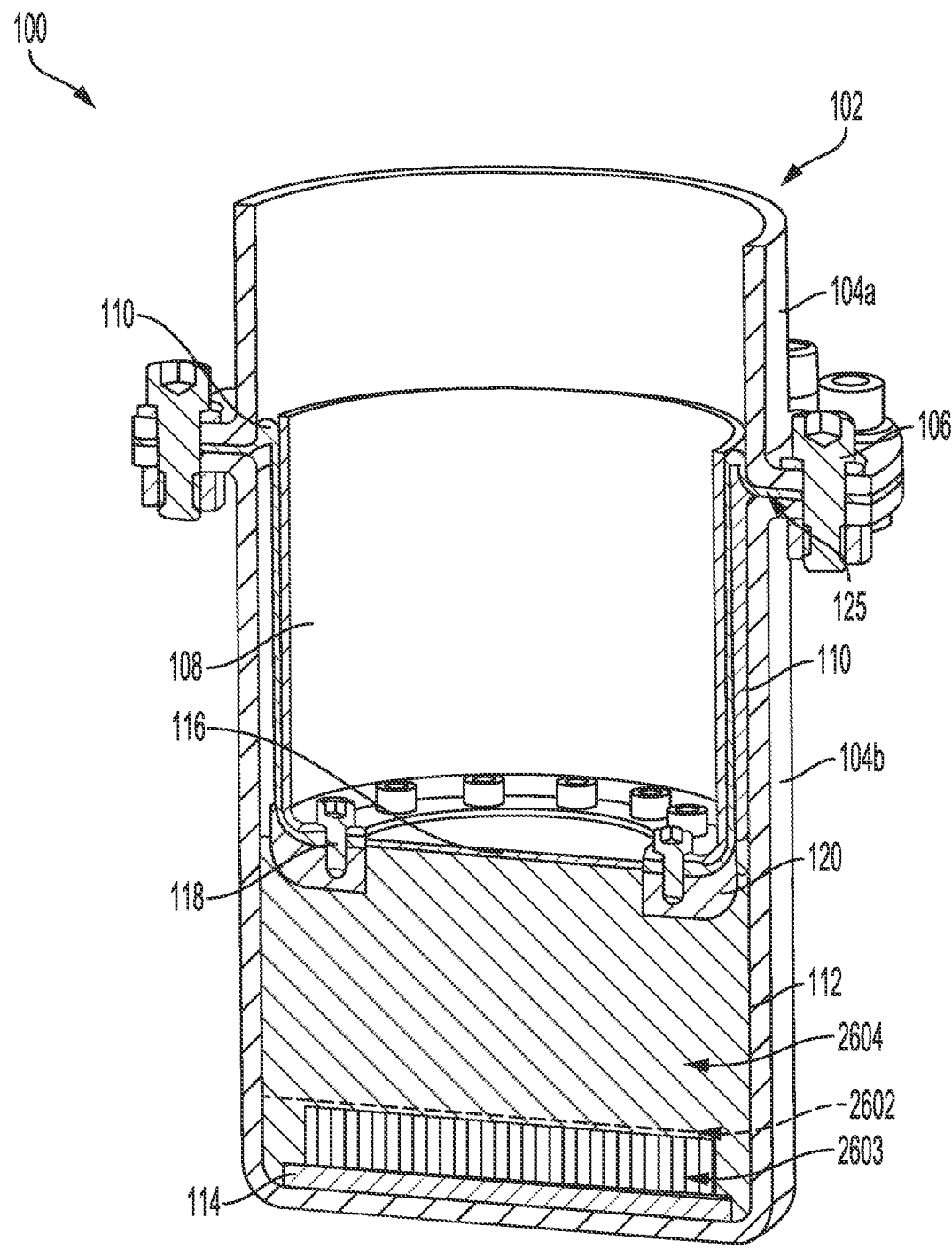
FIG. 26 is a sectional isometric view of a portion of an embodiment battery including a cylindrical rolling diaphragm seal.

In certain other embodiments, the metal air battery 100, a mechanical barrier, such as a membrane or porous separator is used to physically block oxygen bubbles from contacting the metal electrode. FIG. 26 illustrates one example of such a membrane 2602 in the battery 100. FIG. 26 illustrates the membrane 2602, electrolyte 2604, and metal electrode 2603 as example components of the active components 112. In various embodiments, this membrane 2602 may be a film or sheet of a polymer such as Polybenzimidazole (PBI), polyethylene (PE), polypropylene (PP), polyvinylidene fluoride (PVDF) polytetrafluoroethylene (PTFE), or other polymers, or may be a natural fiber such as cotton, rayon, or cellulose acetate. In various embodiments the membrane 2602 may be a separator may be a woven, non-woven, or felted. In various embodiment the membrane 2602 can have a porosity such as 50% by volume or greater, or 30% by volume or greater, or 15% by volume or greater.

In various embodiments, the metal air battery 100 may include a cylindrical rolling diaphragm seal 110 forming a seal between the outer cylindrical housing 102 and the inner cylinder 108 when the inner cylinder 108 is placed within the outer cylindrical housing 102. The cylindrical rolling diaphragm seal 110 may be open at both ends. For example, the cylindrical rolling diaphragm seal 110 may be formed as a tube or sleeve with an inner diameter sized to the outer diameter of the inner cylinder 108. The cylindrical rolling diaphragm seal 110 may be formed of an elastomer, such as silicone. The cylindrical rolling diaphragm seal 110 may be formed of a material compatible with the electrolyte, air electrode 116, and/or metal electrode. In various embodiments, the cylindrical rolling diaphragm seal 110 may be tolerant to all operating temperatures of the battery 100. In various embodiments, one end of the cylindrical rolling diaphragm seal 110 may be coupled to the outer cylindrical housing 102 and an opposite end of the cylindrical rolling diaphragm seal 110 may be coupled to the inner cylinder 108. For example, one end of the cylindrical rolling diaphragm seal 110 may be clamped between the flanges of the upper section 104a of the outer cylindrical housing 102 and the lower section 104b of the outer cylindrical housing 102 at the static seal interface 125. The opposite end of the cylindrical rolling diaphragm seal 110 may be clamped to the bottom of the inner cylinder 108 by a sealing ring 120 attached with bolts 118 to the inner cylinder 108. In this manner, the sealing ring 120 may clamp the end of the cylindrical rolling diaphragm seal 110 to the inner cylinder 108. In a similar manner, the sealing ring 120 may also support the air electrode 116 across the opening of the bottom of the inner cylinder 108. In various embodiments, the cylindrical rolling diaphragm seal 110 may prevent liquid electrolyte of the battery 100 from passing between the outer cylindrical housing 102 and the inner cylinder 108 to the air environment. In various embodiments, the cylindrical rolling diaphragm seal 110 may prevent a liquid surface of liquid electrolyte of the battery 100 from being exposed to the static seal interface 125 between the upper section 104a and the lower section 104b of the outer cylindrical housing 102.

In various embodiments, the cylindrical rolling diaphragm seal 110 may form a seal between an outer cylindrical housing 102 of the battery 100 and the inner cylinder 108 such that movement of the inner cylinder 108 within the outer cylindrical housing 102 may convolve the cylindrical rolling diaphragm seal 110 to change an extended length of the cylindrical rolling diaphragm seal 110. As the inner cylinder 108 moves up and down in the outer cylindrical housing 102, the cylindrical rolling diaphragm seal 110 may convolve (i.e., roll) on itself between the outer surface of the inner cylinder 108 and the inner surface of the outer cylindrical housing 102.

Figure 2A:
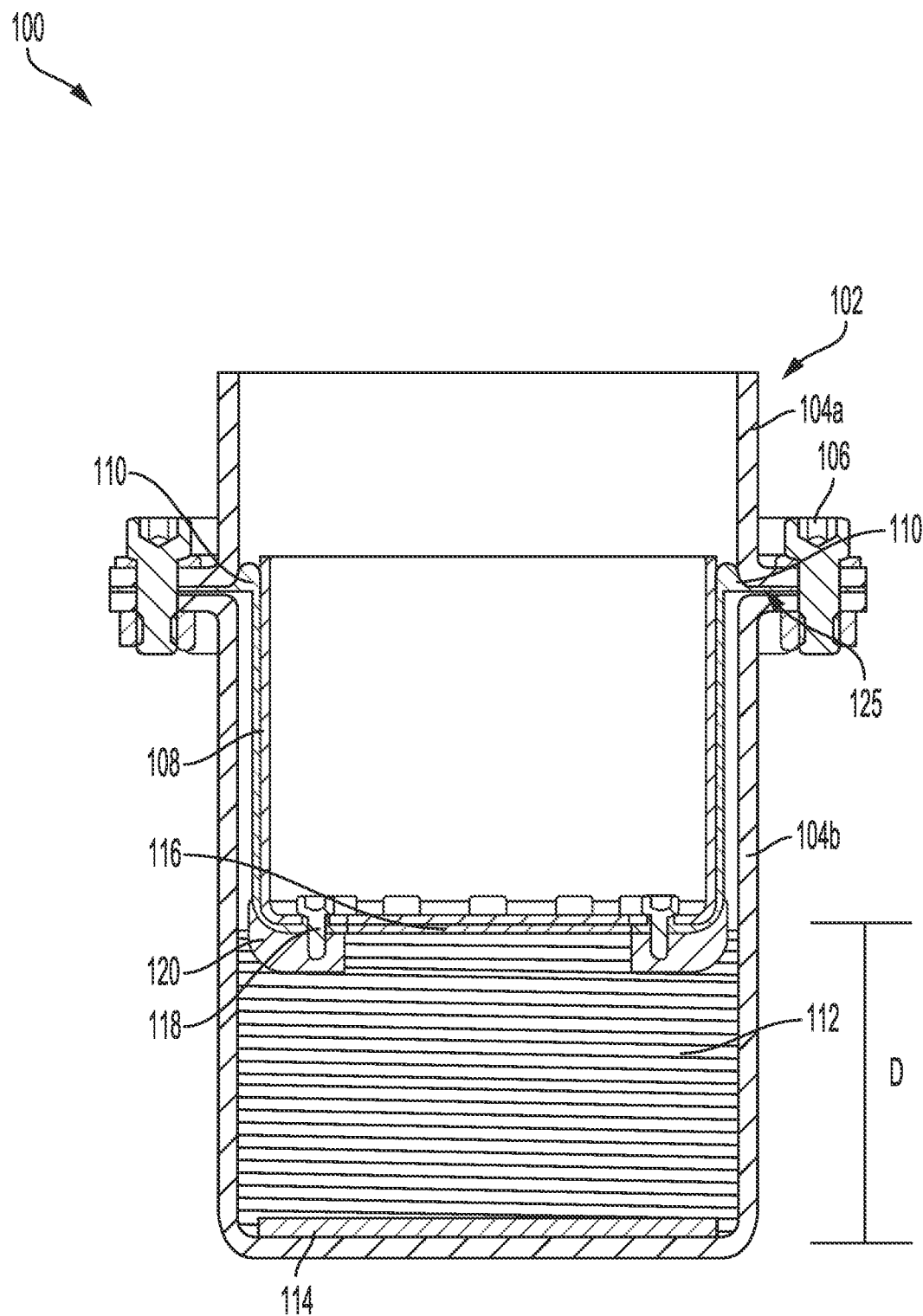
FIGS. 2A, 2B, and 2C are cross sectional side views showing the embodiment battery including a cylindrical rolling diaphragm seal of FIG. 1 with an inner cylinder at different states.
Figure 2B:
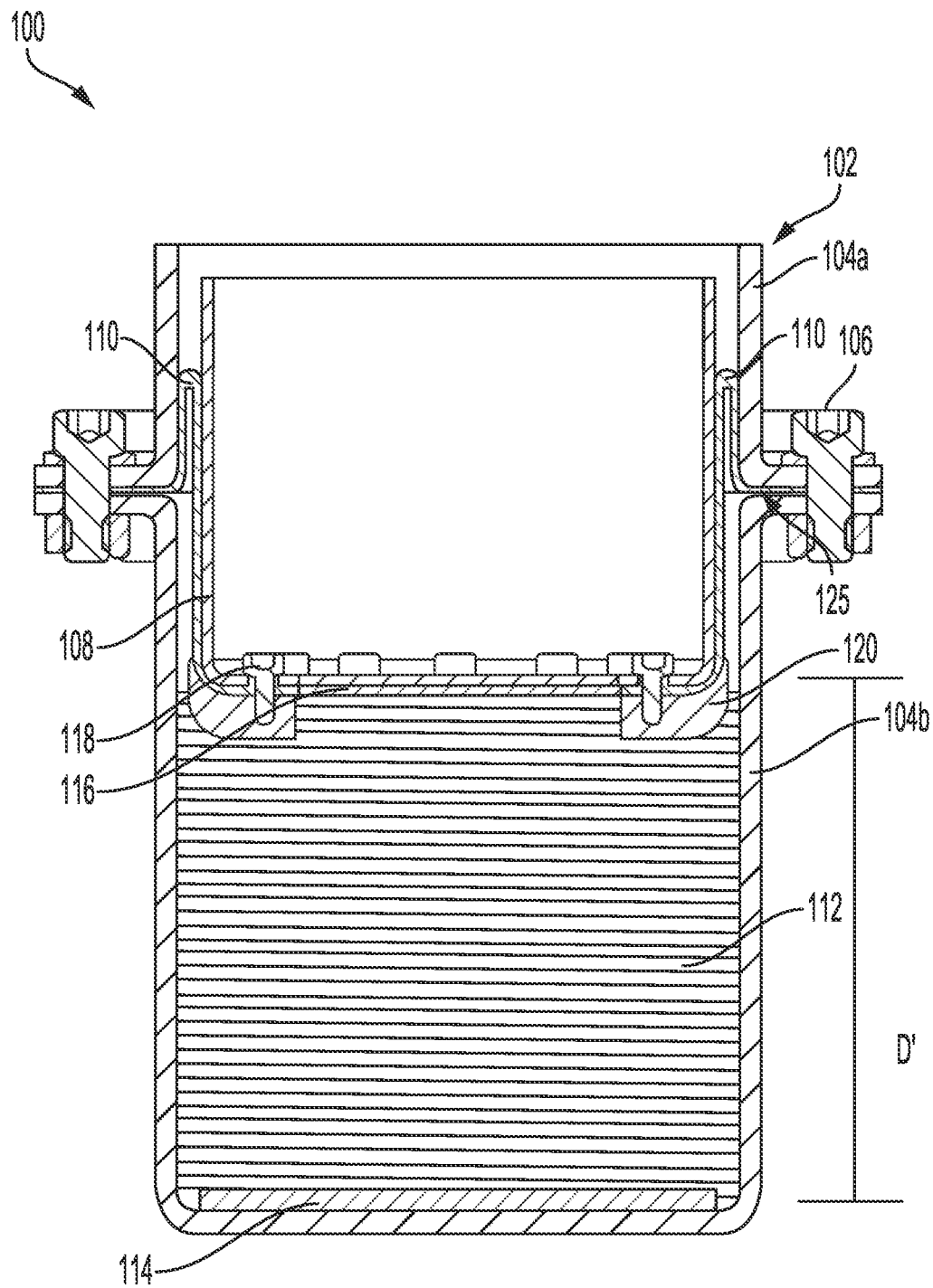
Figure 2C:
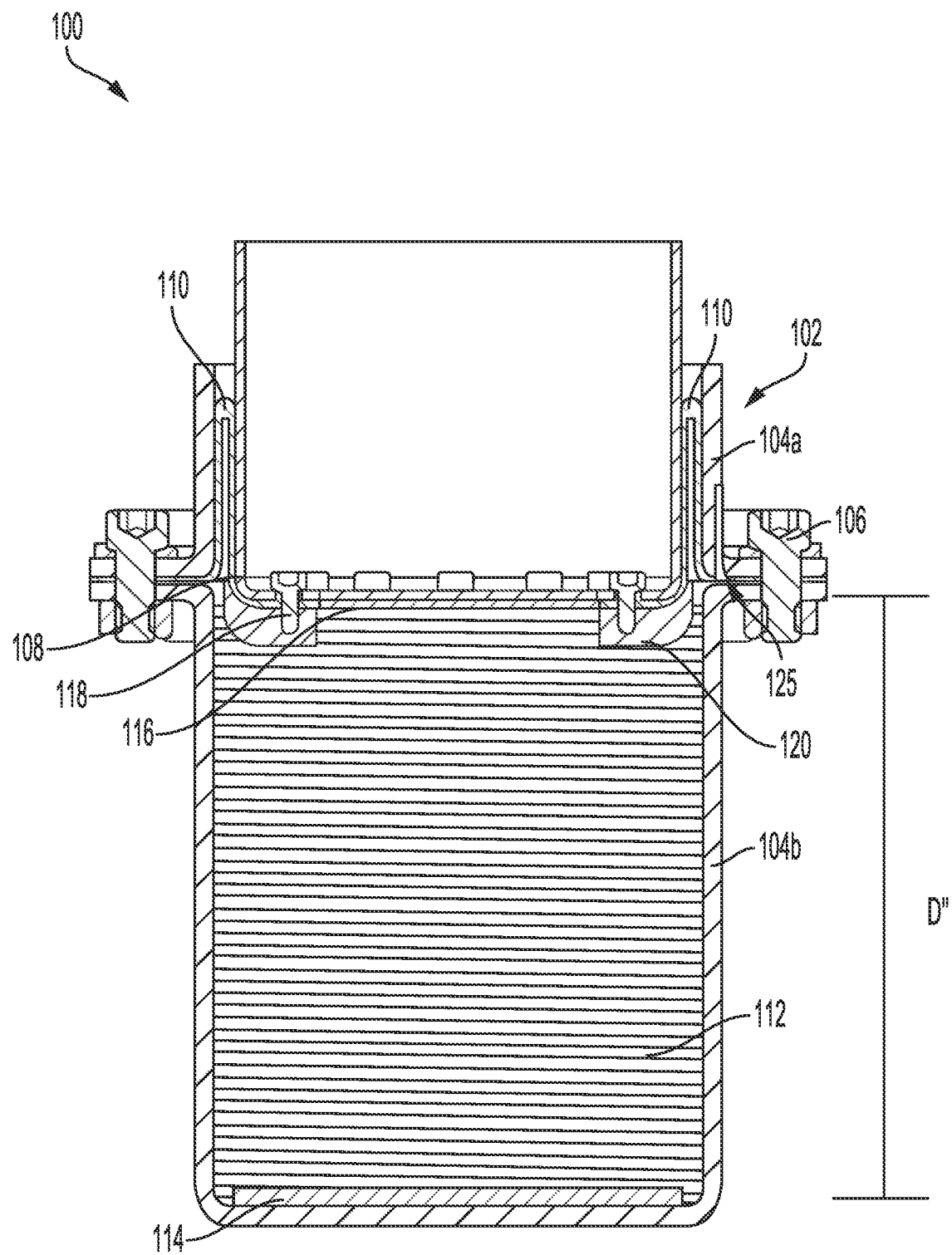

FIGS. 2A, 2B, and 2C show the embodiment metal air battery 100 including the cylindrical rolling diaphragm seal 110 with the inner cylinder 108 at different states. FIGS. 2A, 2B, and 2C illustrate the convolution of the cylindrical rolling diaphragm seal 110 as the volume of the active components 112 in the battery 100 changes. FIG. 2A shows the battery 100 in a first state where the volume of active components 112 such that the active components 112 have a depth "D". FIG. 2B shows the battery 100 in a second state where the volume of the active components 112 is greater such that the active components 112 have a depth "D'" greater than depth "D". Comparing FIG. 2A to FIG. 2B, as the volume of the active components 112 increases the inner cylinder 108 is pushed upward in the outer cylindrical housing 102 causing the cylindrical rolling diaphragm seal 110 to roll on itself (i.e., convolve) above the static seal interface 125 as the level of the active components 112 rises. FIG. 2C shows the battery 100 in a third state where the volume of the active components 112 is even greater such that the active components 112 have a depth "D''" greater than depth "D'" and depth "D". Comparing FIG. 2B to FIG. 2C, as the volume of the active components 112 increases the inner cylinder 108 is pushed upward in the outer cylindrical housing 102 causing the cylindrical rolling diaphragm seal 110 to further roll on itself (i.e., convolve) above the static seal interface 125 as the level of the active components 112 rises. As illustrated in FIG. 2C, even though the lower portion of the inner cylinder 108 has moved up to the level of the static seal interface 125, the cylindrical rolling diaphragm seal 110 ensures that the active components 112 never contact the upper section 104a of the outer cylindrical housing 102 or pass through to the air environment. In this manner, the cylindrical rolling diaphragm seal 110 may create a flexible seal with no moving seal interfaces.

FIG. 3 shows just the cylindrical rolling diaphragm seal 110 of the embodiment metal air battery 100 at the different states illustrated in FIGS. 2A, 2B, and 2C. With reference to FIGS. 2A-3, when the active components 112 are in the first state illustrated in FIG. 2A with the lowest depth "D" the cylindrical rolling diaphragm seal 110 may have an extended length "E" and a height of convolution "C". As the volume of the active components 112 increases driving the inner cylinder 108 upward within the outer cylindrical housing 102, for example increasing to a second state shown in FIG. 2B with a depth "D'", the cylindrical rolling diaphragm seal 110 may convolve such that the extended length changes to a smaller extended length "E'" and the height of convolution increases to a larger height of convolution "C'". As the volume of the active components 112 increases further driving the inner cylinder 108 upward within the outer cylindrical housing 102, for example increasing to a third state shown in FIG. 2C with a depth "D''", the cylindrical rolling diaphragm seal 110 may convolve such that the extended length changes to an even smaller extended length "E''" and the height of convolution increases to an even larger height of convolution "C''".

While FIGS. 2A, 2B, 2C, and 3 are described in terms of the volume of the active components 112 increasing, in a similar manner as the volume of the active components 112 decreases the cylindrical rolling diaphragm seal 110 may unroll decreasing the height of convolution and increasing the extended length.

In various embodiments, the cylindrical rolling diaphragm seal 110 may accommodate large volume expansions/contractions of the active components 112. In various embodiments, the cylindrical rolling diaphragm seal 110 may be configured to operate through repeated convolution cycles without wear.

Figure 4:
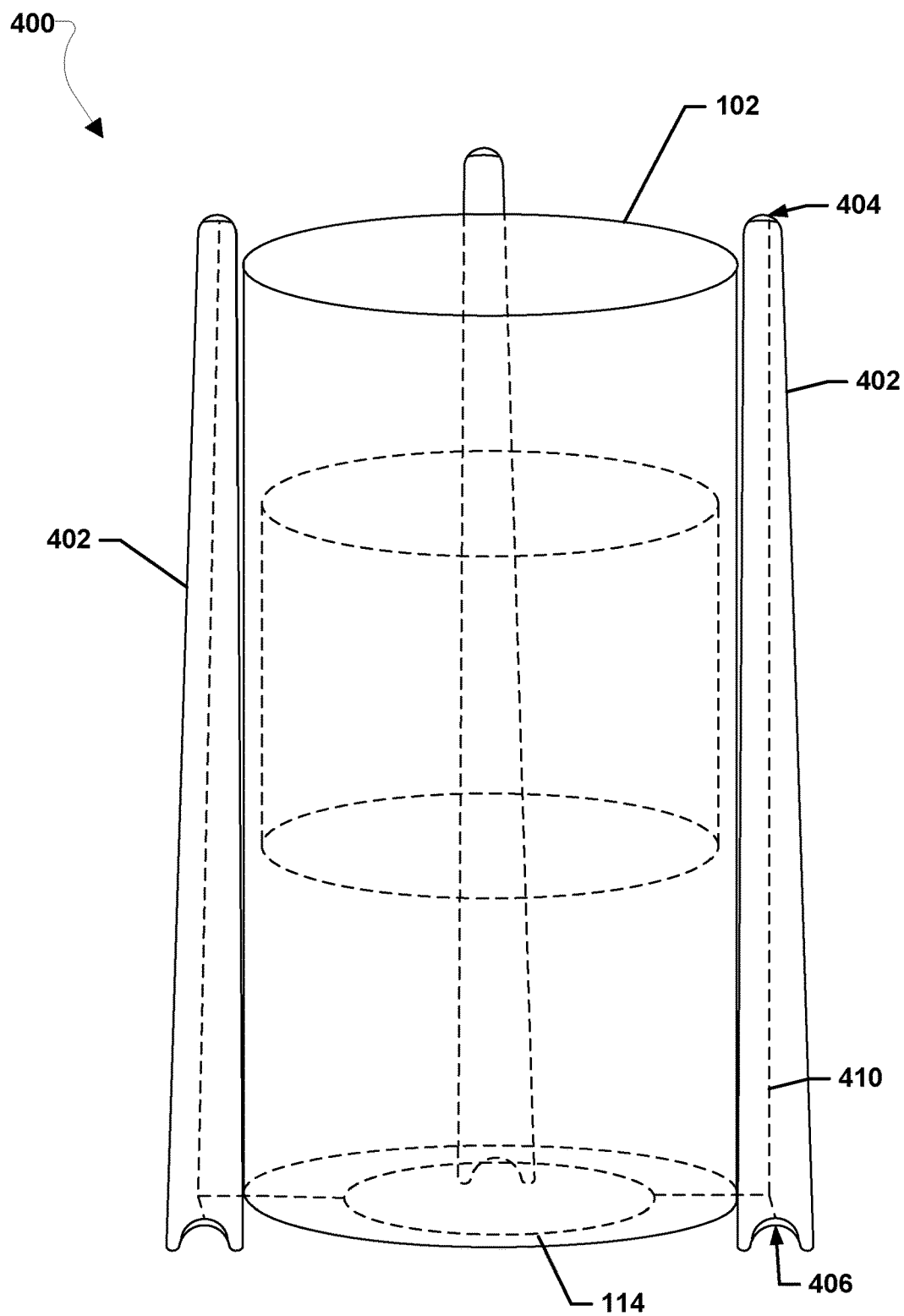
FIG. 4 is an isometric view of the overall structure of an embodiment battery.

FIG. 4 shows a portion of another embodiment battery 400. The battery 400 may be similar to battery 100 discussed above. The battery 400 may be a metal-air battery or any other type of battery. In an embodiment, the battery 400 may include a series of rods 402 coupled to the outer surface of the outer cylindrical housing 102. The series of rods 402 may include any number of rods 402, such as one rod 402, two rods 402, three rods 402, more than three rods 402, etc. In various embodiments, the rods 402 may be constructed of steel or any other electrically conductive material. In various embodiments, the rods 402 may provide high columnar strength, such that the rods 402 provide not only electrical connection but also increased strength needed for stacking the battery units 400.

If the rods 402 are formed integral with the structure (e.g., housing 102), such as if rotary molded from plastic, then, an electrical lead 410 may pass through the outer cylindrical housing 102 from the current collector 114. The electrical lead 410 may run the length of the rod 402 and connect an upper electrical contact plate 404 at an upper end of the rod 402 to a lower electrical contact plate 406 at a lower end of the rod 402. In various embodiments, the upper electrical contact plate 404 may be configured to fit within a lower electrical contact plate 406 of a rod 402 of another battery 400 when the batteries 400 are stacked on top of one another. For example, upper electrical contact plates 404 may be convex shapes, such as a cone, etc., sized to fit inside the concave shaped lower electrical contact plates 406, such as groove shaped lower electrical contact plates 406, etc. The rods may be solid or may be hollow, such as a cone. In certain embodiments, the rods may be hollow, with the lower concave shape comprising a curved back lip, creating a ring of contact between the two nested rods. The rods 402 may provide electrical contacts for series and/or parallel connections between batteries 400. In various embodiments, the weight of an upper battery 400 disposed above a lower battery 400 may maintain the connections between the upper electrical contact plates 404 and the lower electrical contact plates 406 of the respective batteries 400.

Figure 5A:
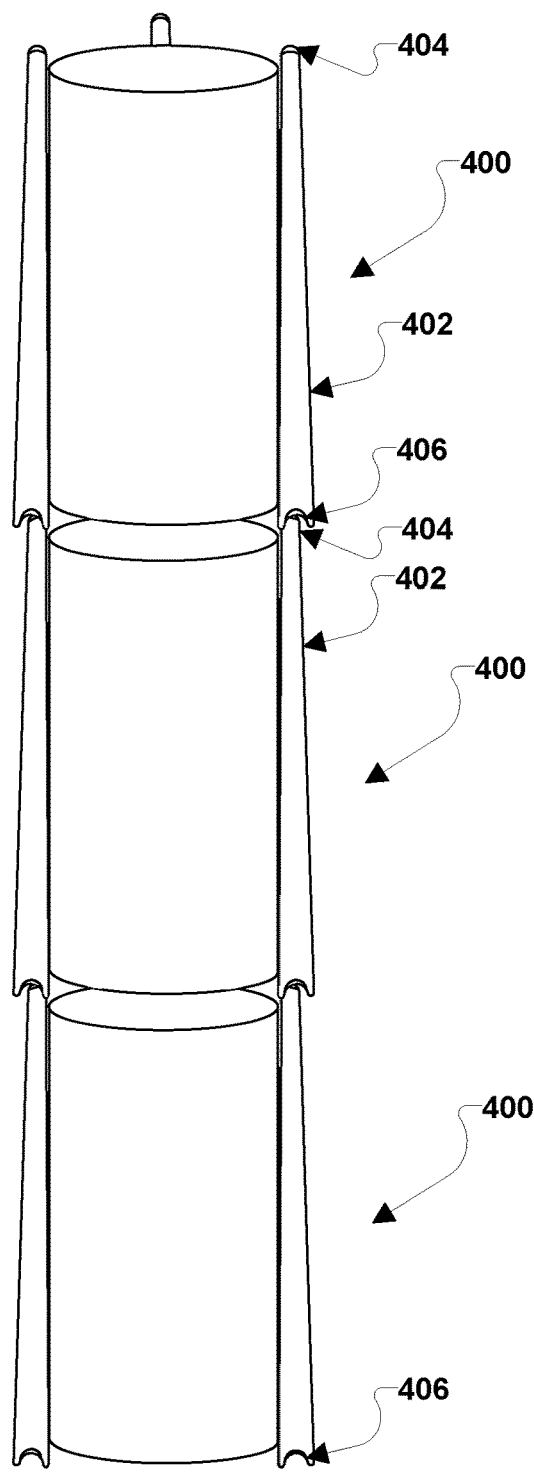
FIG. 5A is an isometric view of one example stacked configuration of multiple embodiment batteries.
Figure 5B:
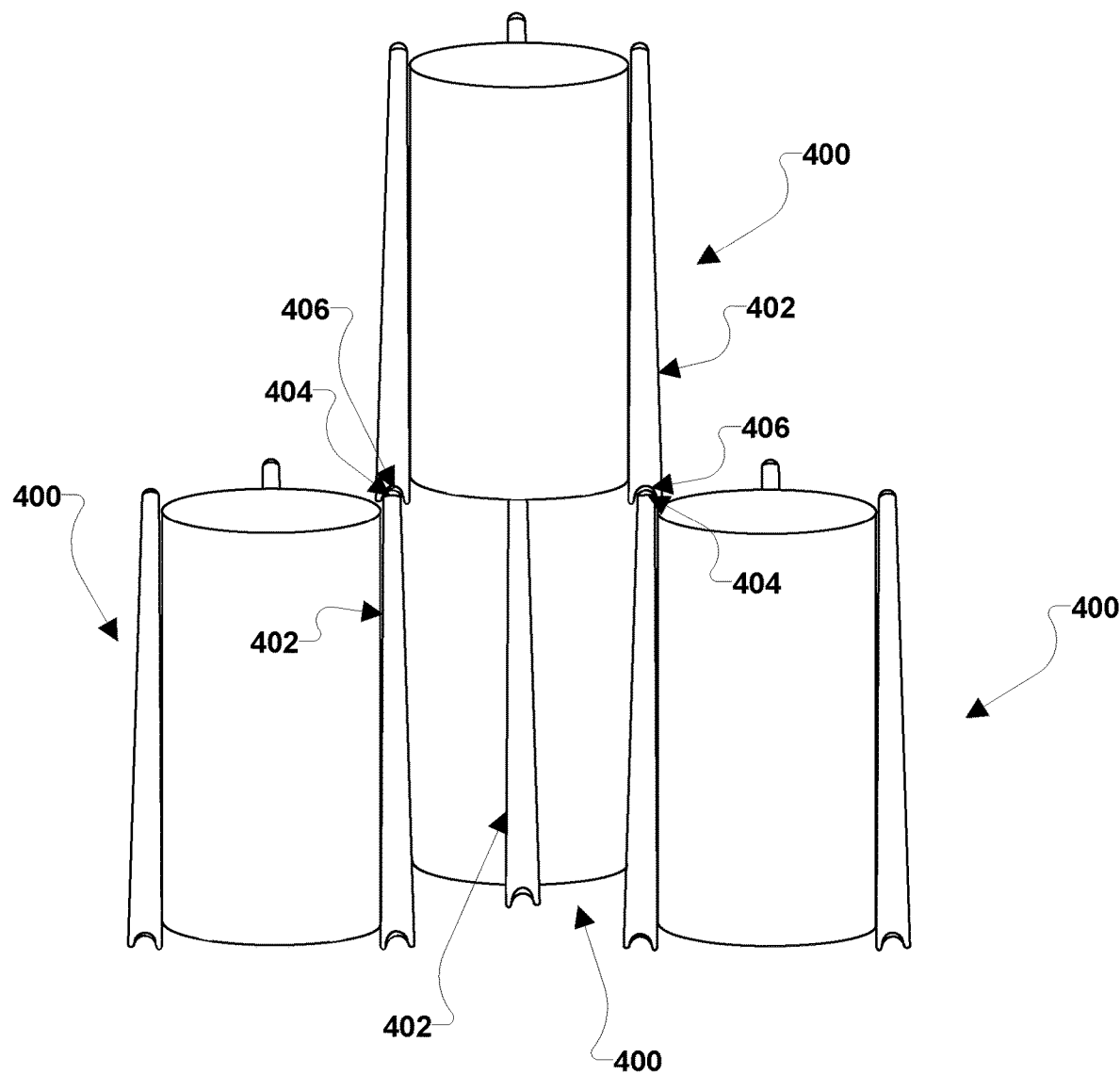
FIG. 5B is an isometric view of another example stacked configuration of multiple embodiment batteries.

FIG. 5A shows one example stacked configuration of multiple embodiment batteries 400. As shown in FIG. 5A, three batteries 400 may be stacked on top of one another such that the lower electrical contact plates 406 of an upper battery 400 contact the upper electrical contact plates 404 of a lower battery 400. FIG. 5B shows another example stacked configuration of multiple embodiment batteries 400. As shown in FIG. 5B, four batteries 400 may be stacked such that one rod 402 of each lower battery 400 contacts a respective rod 402 of the upper battery 400. While the batteries 400 shown in FIGS. 4, 5A, and 5B are shown as having cylindrical housings 102, cylindrical housings are merely an example of a housing shape and other shape housings, such as rectangular shaped housings, irregular shaped housings, etc., may be substituted for the cylindrical housings in the various embodiments.

Figure 6:
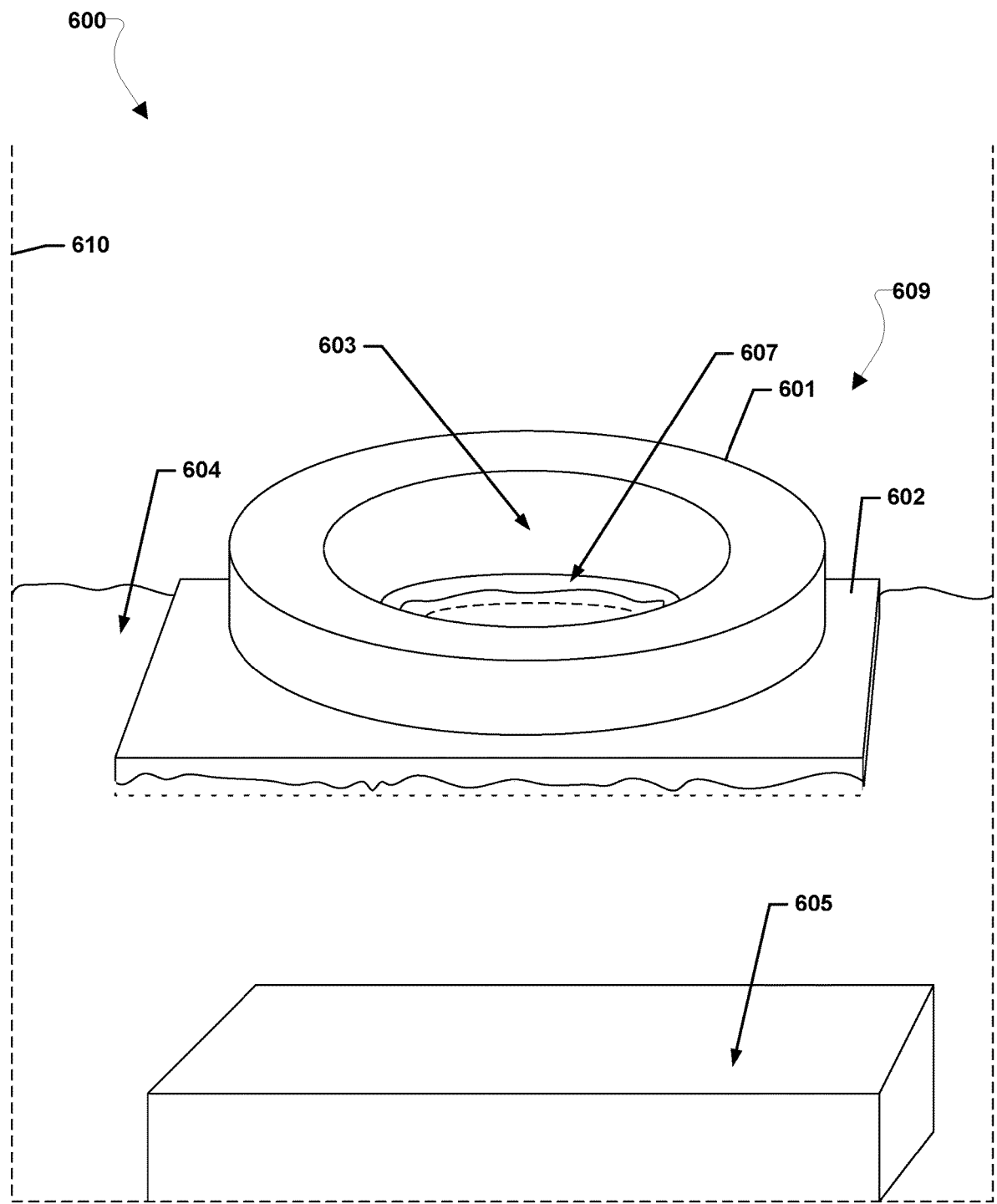
FIG. 6 is an isometric view of an embodiment battery including an embodiment floating air electrode assembly.

FIG. 6 shows an embodiment battery 600 including an embodiment floating air electrode assembly 609. The battery 600 may be any type battery, such as a metal-air battery, etc. The battery 600 may include a housing 610 configured to support a volume of liquid electrolyte 604 and metal electrode 605. The floating air electrode assembly 609 may be configured to be buoyant on the volume of liquid electrolyte 604 and may float on the surface of the volume of liquid electrolyte 604 within the housing 610. Floating air electrodes have several advantages, including passive-self correction to maintain good solid-liquid contact as the liquid level rises and falls, either due to water consumption and production as a part of the electrochemical cell reactions, due to density changes of the liquid electrolyte as its composition changes during operation or aging, or due to unwanted parasitic reactions that may consume water and/or other liquid solvent, or due to evaporation and/or condensation of water and/or other liquids into the cell. Floating may be induced by an integral component of the air electrode, such as by using certain buoyant and hydrophobic coatings, such as polypropylene and/or polystyrene. Such a coating or capping layer could be a continuous surface layer or dispersed deposits and/or inclusions in the air electrode. In various embodiments, the air electrode assembly 609 may include an air electrode 601 supported on a buoyant platform 602. The air electrode 601 may be supported on the buoyant platform 602 such that a bottom surface of the air electrode 601 contacts a top surface of the buoyant platform 602. The buoyant platform 602 may be configured to support the air electrode 601 and may be configured to allow ionic contact between the air electrode 601 and the volume of liquid electrolyte 604 and thereby the metal electrode 605. A bottom surface of the buoyant platform 602 may be in contact with the volume of liquid electrolyte 604 when the air electrode assembly 609 is floating in the volume of liquid electrolyte 604. In various embodiments, the buoyant platform 602 may be configured such that the top surface of the buoyant platform 602 and the bottom surface of the air electrode 601 are above a surface of the volume of liquid electrolyte 604 when the air electrode assembly 609 is floating in the volume of liquid electrolyte 604.

Figure 7:
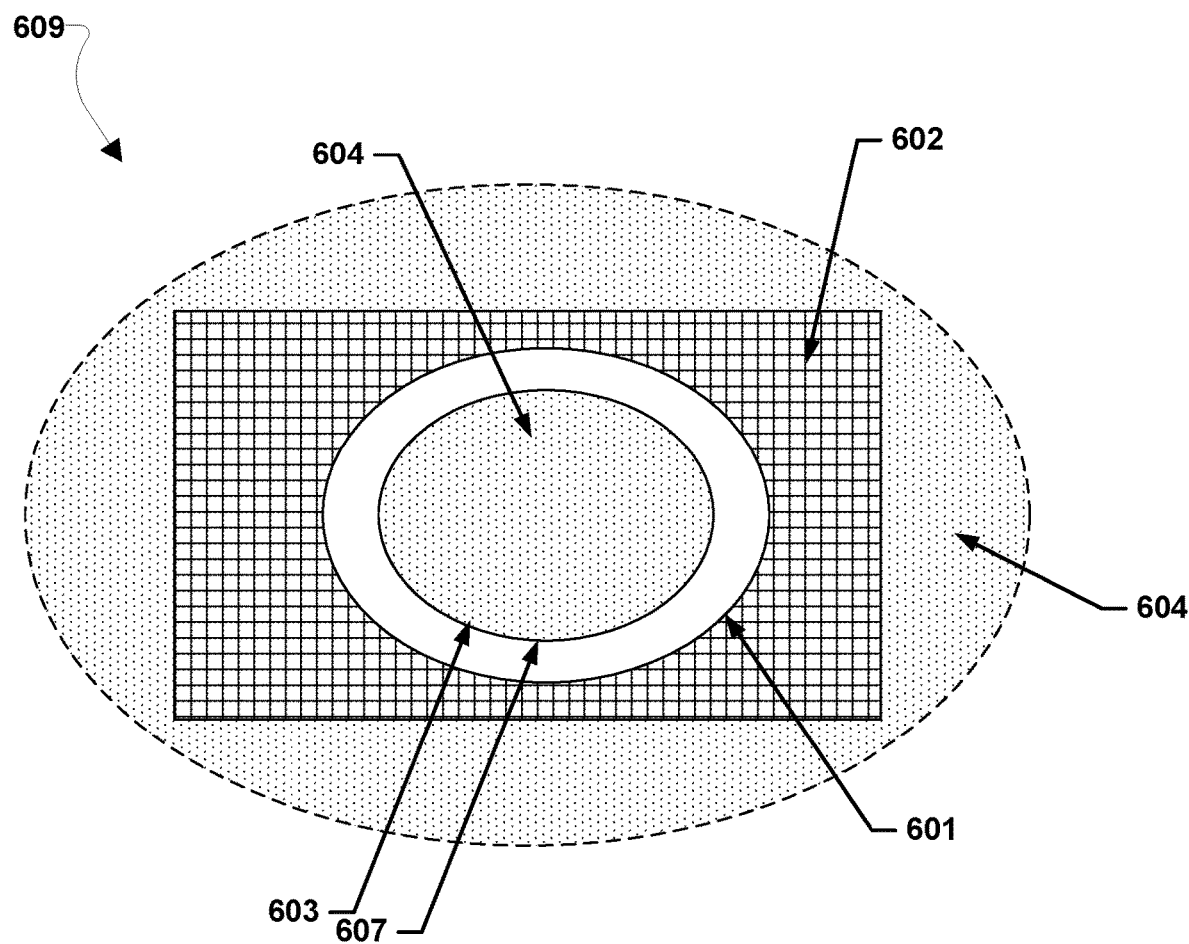
FIG. 7 is an isometric view of the embodiment floating air electrode assembly and a portion of the embodiment battery of FIG. 6.

In various embodiments, the air electrode 601 may be formed to have one or more holes 603 therein passing from a top surface of the air electrode 601 to its bottom surface. Additionally, the buoyant platform 602 may be formed to have one or more holes 607 passing from a top surface of the buoyant platform 602 to the bottom surface of the buoyant platform 602. FIG. 7 shows the embodiment floating air electrode assembly 609 of FIG. 6 from an overhead direction showing that the holes 603 and 607 pass through the air electrode 601 and buoyant platform 602, respectively. In various embodiments, as the air electrode 601 is supported above the surface of the volume of the liquid electrolyte 604, should any liquid electrolyte splash or otherwise wash onto the air electrode 601, gravity may cause the liquid electrolyte to run off the air electrode 601 and through the holes 603 and 607 back to the volume of the liquid electrolyte 604. In this manner, the air electrode assembly 609 may drain itself of liquid electrolyte and the housing 610 may not require a seal at or below the surface of the volume of liquid electrolyte 604.

Figure 8:
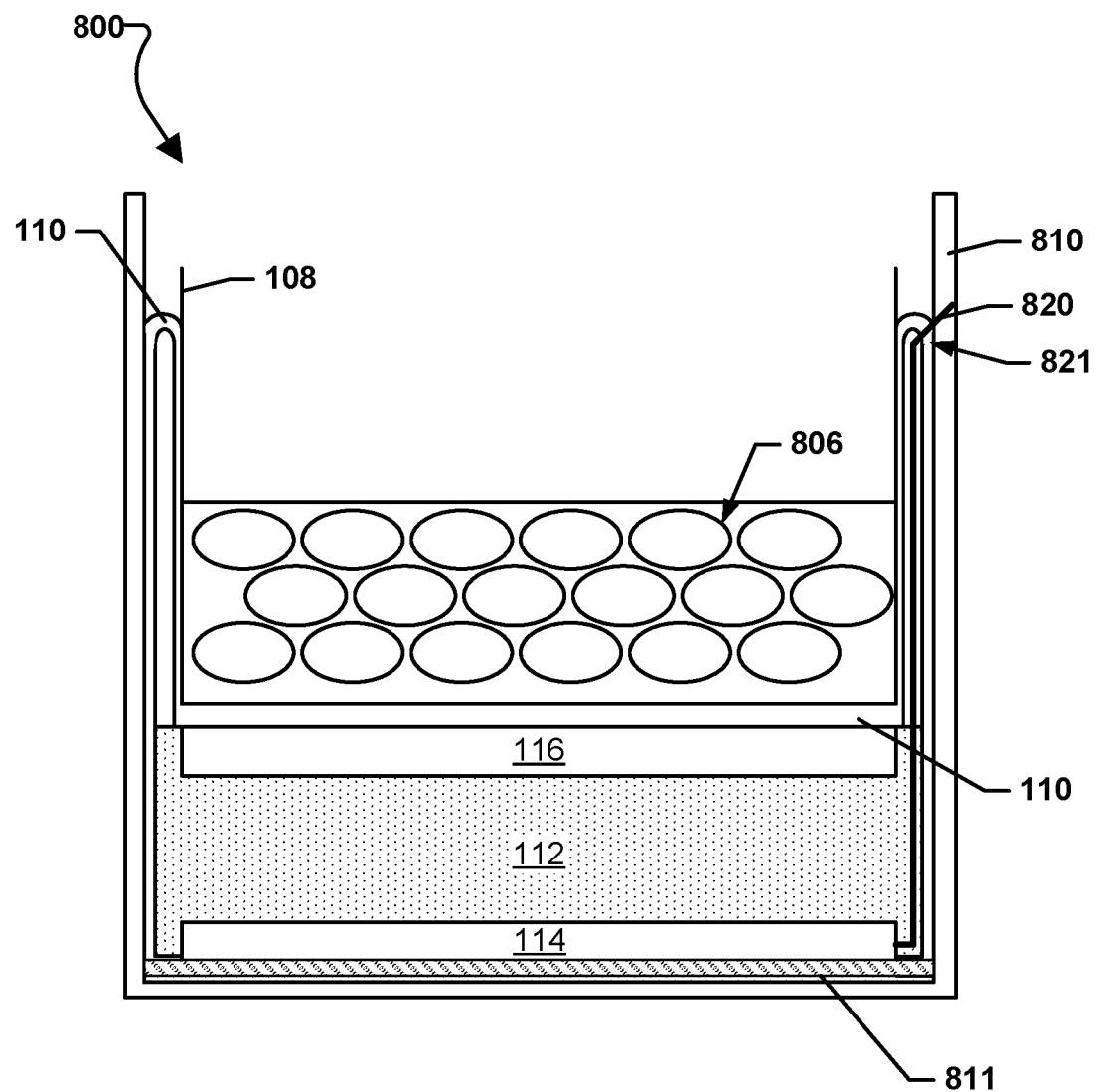
FIG. 8 is a cross section view of a portion of an embodiment battery including a cylindrical rolling diaphragm seal.

FIG. 8 shows a portion of an embodiment metal air battery 800 including a cylindrical rolling diaphragm seal 110. Battery 800 may be similar to battery 100 described above, except that the outer cylindrical housing 810 may be a double walled housing. Additionally, the cylindrical rolling diaphragm seal 110 may be coupled to the outer cylindrical housing 810 by a band 811 passing around the current collector 114. In this manner, the extra material of the cylindrical rolling diaphragm seal 110 down the interior side of the outer cylindrical housing 810 may provide an extra protection against leaks in the battery 800.

In various embodiments, the current collector 114 may be attached to an electrical lead 820 that may pass out of the outer cylindrical housing 810 through an electrical feedthrough port 821. In various embodiments the electrical lead 820 may pass through the cylindrical rolling diaphragm seal 110 into the electrical feedthrough port 821 and out of the outer cylindrical housing 810.

In various embodiments, a honeycomb structure 806 may be disposed in the inner cylinder 108. The honeycomb structure 806 may be permeable to air and may provide weight to the inner cylinder 108 to compress the active components 112. In various embodiments, the arrangement of the honeycomb material may be above the cylindrical rolling diaphragm seal 110 and the air electrode 116 may be below the cylindrical rolling diaphragm seal 110. In such embodiments, the cylindrical rolling diaphragm seal 110 may include holes therein to allow air to pass from the honeycomb structure 806, through the cylindrical rolling diaphragm seal 110, and to the air electrode 116.

Figure 9A:
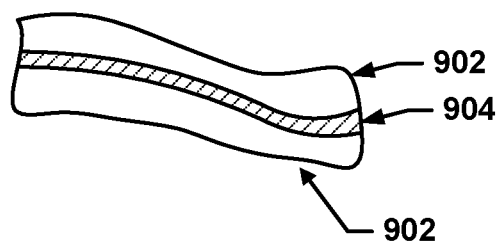
FIGS. 9A and 9B are schematic views illustrating embodiment coating morphologies for air electrodes.
Figure 9B:
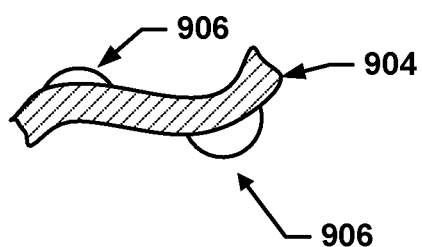

Open or closed metal-air cells may require a porous air cathode. Air cathodes for fuel cells may be typically comprised of a carbon sheet material, such as a carbon paper or carbon felt or carbon mesh, coated with a catalyst layer on one side, and a polytetrafluoroethylene (PTFE) coating on the other. PTFE coatings may be undesirable for low-cost energy storage device due to the high cost of PTFE. Hydrophobic electrode coatings made from lower-cost polymers may optimize electrode wetting and the desirable formation of triple phase boundaries between the gas phase, the liquid electrolyte phase and the solid electrically conductive phase, at an acceptable cost and performance for batteries, such as secondary batteries, with an air electrode. Additionally, buoyant polymers may allow air electrodes to "float" on top of electrolytes, enabling low-cost and passive cell architectures. Such buoyant and hydrophobic organic coating materials that may be used in various embodiments may include polypropylene, polystyrene, etc. FIGS. 9A and 9B illustrate two coating morphologies that may be used in the various embodiments. In the morphology of FIG. 9A, the coating 902, such as a coating of buoyant and/or hydrophobic organic materials (e.g., polypropylene, polystyrene, etc.), may be a continuous surface layer over carbon fiber 904. In the morphology of FIG. 9B, the coating 906, such as a coating of buoyant and/or hydrophobic organic materials (e.g., polypropylene, polystyrene, etc.), may be formed as disparate surface deposits.

Figure 10:
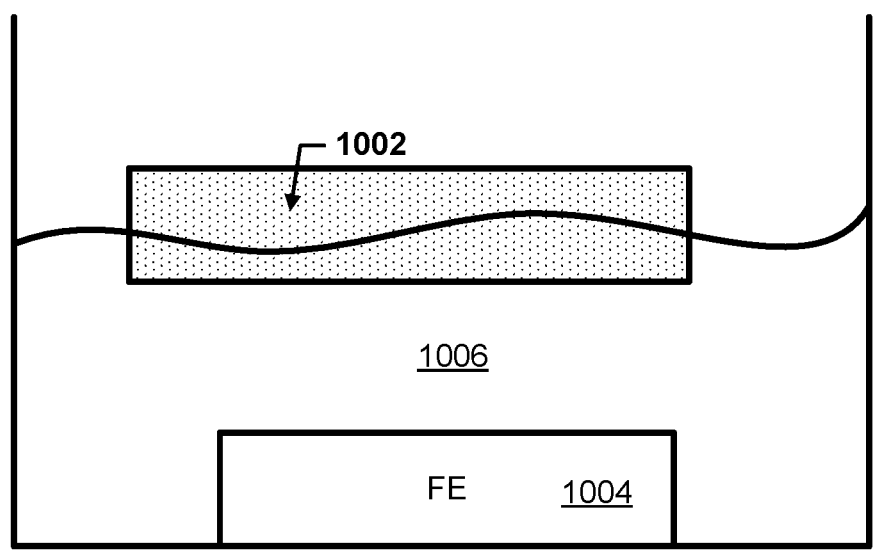
FIG. 10 is a schematic view illustrating an embodiment floating air electrode.

FIG. 10 illustrates an embodiment floating air electrode 1002 floating on electrolyte 1006 above an iron electrode 1004. In various embodiments, the floating air electrode 1002 may have either of the morphologies described above with reference to FIGS. 9A and 9B.

In another embodiment, the outer cylindrical housing could have four rods 402 around its perimeter, and a stack of batteries could be created where in a first row of batteries the batteries are placed next to each other, and the next row on top is displaced such that two of the cavities on the ends of two of columnar structures on one battery mate with the protrusions on the ends of two of the columnar structures of another battery, the stack thus forming an overlapping brick-like structure.

For any of the embodiments above, conductive rails on a floor can be placed with upward pointing electrical protrusions (or cavities) placed to receive downward facing cavities (or protrusions) of batteries, such that all the batteries in an assembly can be placed with a lift vehicle and no special wiring is needed to electrically connect them together: i.e., they are self-coupling and their weight acts to ensure good electrical contact by causing elastic deformations in the battery's structures to accommodate mechanical imperfections.

Various embodiments may provide a cathode that floats on top of the electrolyte in an iron-air battery. In various embodiments, the battery may include a dual ORR/OER cathode (that is, physically distinct and electrically isolated ORR and OER electrodes). The ORR cathode may float on top of the electrolyte, while the OER cathode may be submerged in the electrolyte and may be oriented perpendicular to the ORR cathode.

Figure 11A:
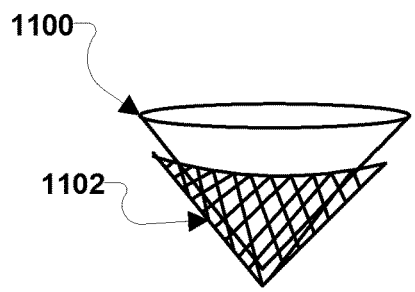
FIG. 11A is a schematic view illustrating an embodiment curved floating cathode.
Figure 11B:
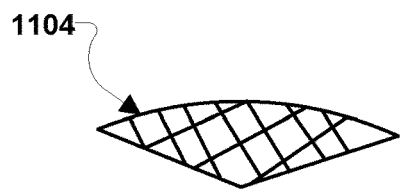
FIG. 11B is a schematic view illustrating an embodiment flat electrode configured to be wrapped to a cone shape.
Figure 11C:
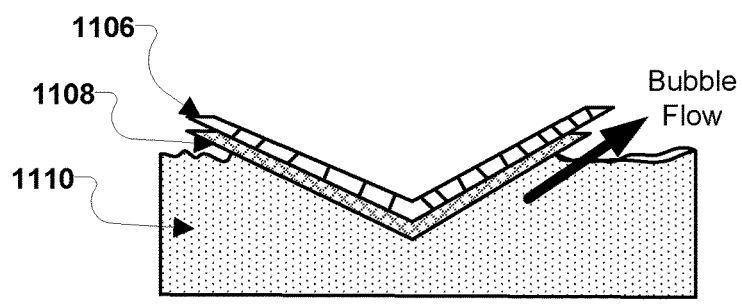
FIG. 11C is a cross-sectional view illustrating an embodiment curved floating cathode.
Figure 12:
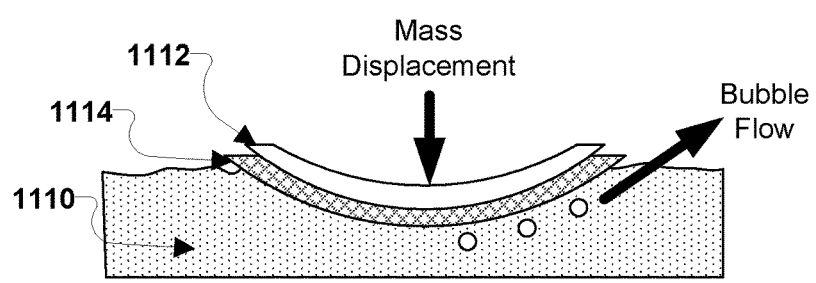
FIG. 12 is a cross-sectional view illustrating an embodiment curved floating cathode.

Various embodiments may provide a curved cathode, such as a curved floating cathode, curved cathode supported in the electrolyte, etc. The curved cathode may prevent gas bubbles from accumulating under a flat, plate shaped cathode. In various embodiments, the cathode (floating and/or non-floating), such as the ORR cathode, may have a curved or rounded bottom to permit gas bubbles to reach the electrolyte surface away from the active area of the cathode. FIGS. 11A-12 illustrate aspects of example curved floating cathodes. Specifically, FIG. 11A illustrates an embodiment conical cathode having a cone-shaped current collector structure 1100 and a wrapped GDL/air electrode material 1102 having a cone-shape. The current collector structure 1100 may be formed from various materials, such as mesh materials, holey materials, etc. The GDL/air electrode material 1102 having a cone-shape may provide for minimal waste of GDL material. FIG. 11B illustrates a flat electrode 1104 shape that may be wrapped to a cone. FIG. 11C illustrates a cross-sectional view of an embodiment curved floating cathode having a current collector structure 1106 and air electrode 1108. The current collector structure 1106 and air electrode 1108 may have a conical shape and may float in the electrolyte 1110. The conical shape of the curved floating cathode of FIG. 11C may cause the bubbles that flow up toward the cathode to flow away from the center of the cathode and out of the surface of the electrolyte 1110. FIG. 12 illustrates another cross-sectional view of an embodiment curved floating cathode having a current collector structure 1112 and air electrode 1114. The current collector structure 1112 and air electrode 1114 may have a bowl shape and may float in the electrolyte 1110. The bowl shape of the curved floating cathode of FIG. 12 may cause the bubbles that flow up toward the cathode to flow away from the center of the cathode and out of the surface of the electrolyte 1110. In various embodiments, the cathode may be curved and the center of curvature of the cathode may reside outside the volume of the liquid electrolyte.

Various embodiments may provide a tilted floating cathode to prevent gas bubbles from accumulating under a flat, plate shaped floating cathode. The floating cathode (e.g., ORR cathode) may be a planar electrode that is tilted at an angle greater than zero and less than 90 degrees with respect to the plane of the top of the electrolyte, such as about 5-10 degrees. In various embodiments, the tilting of the air cathode may be effected by an uneven distribution of mass across the floating cathode assembly so that one portion of the electrode assembly is less buoyant than other portions of the electrode assembly.

Figure 13A:
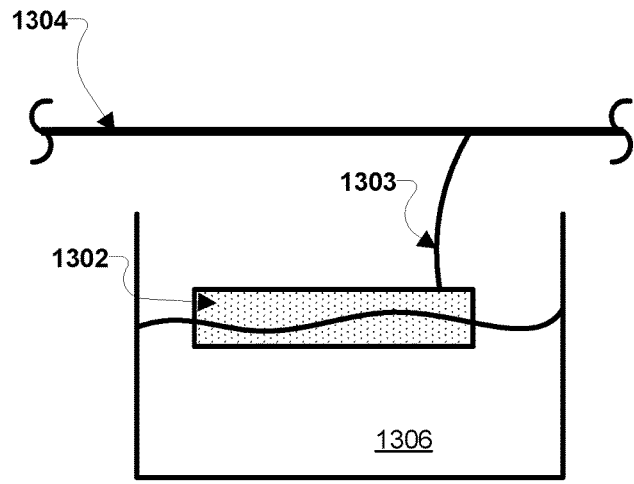
FIG. 13A is a schematic view illustrating an example flexible current collector connection between a floating cathode and an overhead line.
Figure 13B:
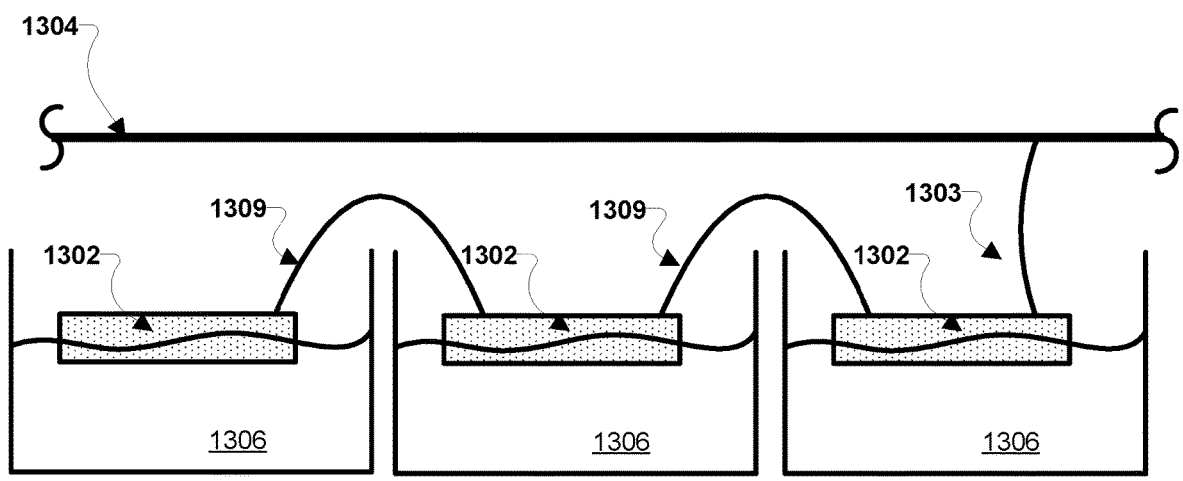
FIG. 13B is a schematic view illustrating example flexible current collector connection between a series of floating cathodes and an overhead line.
Figure 13C:
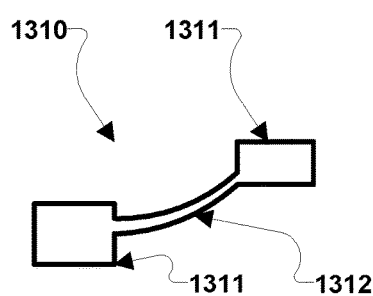
FIG. 13C illustrates an example flexible current collector.
Figure 13D:
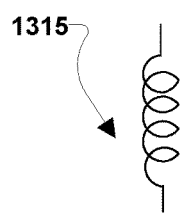
FIG. 13D illustrates an example flexible current collector.
Figure 13E:
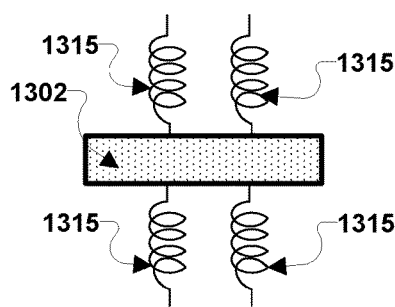
FIG. 13E illustrates an example flexible current collector.

In various embodiments, the metal air battery 100 requires a current collection method to the air electrode battery geometries, volumetric change and gas evolution can lead to designs that favor flexible or mobile components or unsealed geometries. While advantageous in some ways, these design elements can create challenges to making electrical connections to components. Specifically, suspended or floating air electrodes, which may need no other support, still must utilize current collectors and must have robust electrical connections. In various embodiments, flexible current collectors may provide such robust electrical connections for floating air electrodes. FIG. 13A is a schematic view illustrating an example flexible current collector 1303 connection between a floating cathode 1302 (e.g., an air electrode) floating on an electrolyte 1306 and an overhead line 1304. In various embodiments, each floating or suspended cathode 1302 (e.g., an air electrode) may utilize an individual connection 1303 to the overhead electrical line 1304 and thereby any number of cathodes 1302 may be connected in parallel. FIG. 13B is a schematic view illustrating example flexible current collector 1309 connections between a series of floating cathodes 1302 which are then connected by a single flexible current collector 1303 connection the overhead line 1304. In this manner, the various cathodes 1302 may be connected in series to the overhead line 1304. In some embodiments, the flexible current collectors 1303, 1309 may have compliant elements built into them and/or the receiving electrical line 1304 may have compliance built into it. The compliance of the flexible current collectors 1303, 1309 and/or the electrical line 1304 may allow for motion of the cathode(s) 1302 (e.g., air electrode(s)). Electrical lines and connections may be made in such a way as to eliminate the chance of electrical shorting between elements. FIG. 13C illustrates an example flexible current collector 1310 according to an embodiment. The flexible current collector 1310 may be a specific example of a flexible current collector suitable for use as flexible current collector 1303 and/or 1309. The flexible current collector 1310 may include thick end portions 1311 providing high conductivity and relatively thinner middle portion 1312 providing flexibility. FIG. 13D illustrates an example flexible current collector 1315 according to an embodiment. The flexible current collector 1315 may be a specific example of a flexible current collector suitable for use as flexible current collector 1303 and/or 1309. The flexible current collector 1315 may be a spring shaped current collector. FIG. 13E illustrates an example configuration of flexible current collectors 1315 according to an embodiment. The arrangement of flexible current collectors 1315 in FIG. 13E may be a specific example of a flexible current collector arrangement suitable for use as flexible current collector 1309. As illustrated in FIG. 13E opposing flexible current collectors 1315 may be spring shaped current collectors arranged in opposition on either side of the cathode 1302 (e.g., air electrode). The current collectors 1315 may oppose one another, thereby holding the cathode 1302 in place.

Vessel-based cell design, whether sealed or unsealed, will require in-vessel current collection. Current collection methods could take many forms. In one embodiment, conductive plates rest underneath electrode material, and the weight of the electrode provides sufficient electrical contact for low resistive losses.

In another embodiment, a second conductive plate sandwiches active material inside, and clamping forces between the current collector plates increase contact and reduce contact resistances sufficiently. One of these plates could be solid, making for high electrical conductivity and intimate electrical contact, and at least one of these plates could be porous, allowing for sufficient ionic conductivity of the electrode to the cell.

In another embodiment, metal meshes contain a volume of particle-based electrode material. The mesh has sufficient porosity to allow for high ionic conductivity, but small enough pore size to contain the active material within.

In any embodiment, current collection and wiring will need to be designed to exit the vessel with sufficiently low resistive losses. While high numbers of current collection attachment points make for complex and costly assemblies, increasing these point numbers decreases resistive losses and improves device performance.

Various battery types may involve large containers of electrode or electrolyte material. These systems require current collection unlike typical battery cells. Open and closed architectures may utilize chambers within which solid or liquid electrodes may reside, and optimal use of cell arrays may involve voltage and current manipulation by subdivision into smaller cells. Metallic or graphitic current collector sheets or plates can rest, be suspended, or otherwise be located within the battery volume such that they're in intimate electrical contact with solid or liquid electrodes. These sheets or plates can be sized to allow for minimal voltage losses across them. In parallel with appropriate subdivision of electrode area and electrolyte volume, current collectors can be sized for optimal current and voltage sizing of the system. As multiple current collectors are linked, they may be insulated to prevent shorting with other components or may be routed through regions away from shoring risks.

While many embodiments utilize low-cost, electrolyte-compatible plastic containment for active materials, this containment is almost necessarily insulating. Separating containment functionality from current collector functionality allows for full optimization of each component, but it drives up part count. One embodiment combines these elements into a single structural element that acts as a current collector. In this "can-negative" design, the outer vessel is a metallic current collector. This metal is sufficiently stiff to contain the entirety of the active materials within the cell, and is thick enough to conduct current with low resistive losses, but is kept thin enough to keep costs reasonable. Sufficient insulation may be needed on the outside of this cell for safety reasons, but externally-conductive surfaces may allow for electrical contact between cells.

Current will need to be moved from within a single cell into an integrated module system in as simple, low-cost, and efficient as possible. One method to collect current between stacked cells is through conductive posts. Stiff structural elements provide loading points for stacking of multiple cells. These elements could be conductive or have a conductive coating. The tops and bottoms, or other interfacial points, of these elements could be sufficiently conductive to transfer current from cell to cell without high resistances. Cells stacked upon each other would provide additional weight loading to the cell assembly and increase the contact loading of inter-cell connection points, decreasing contact resistances and resistive losses.

Some cell architectures naturally orient themselves normal to gravity. This can make for large footprints if they aren't stacked vertically. However, stacking heavy components can result in heavy infrastructure and high costs. Finally, regulating water in open systems can be challenging as well. One embodiment includes cell designs similar to vessels seen in indoor farming, where wet trays are stacked. A-frame and other support structures can carry large and heavy trays containing wet soil and plant matter, and these systems already accommodate hydration control. Pumps, supports, and inter-tray "watering" systems can be used in a similar manner, enabling low-cost plant designs.

Stacked cells can utilize shared electrolyte in a waterfall manner to minimize costs associated with those systems. Cells arranged in beds akin to raised garden beds can have their lengths set by current collection cost requirements. Each row can be separated by OER cathode segments. Bed widths are set by ohmic loss maximums. Stack architecture arranged in a pyramid format allows for shared bus-bars between cells and waterfall electrolyte sharing. These cells can even be layered such that the weight of overhead cells compresses the anode of lower cells, increasing electrical conductivity and minimizing ohmic losses. If the anodes are load-bearing, this could also reduce the load-bearing requirements of liquid containment. Finally, this liquid containment can have outlets of set heights, through which electrolyte continually flows, maintaining a constant electrolyte level, at which a fixed ORR electrode could be placed.

Figure 14A:
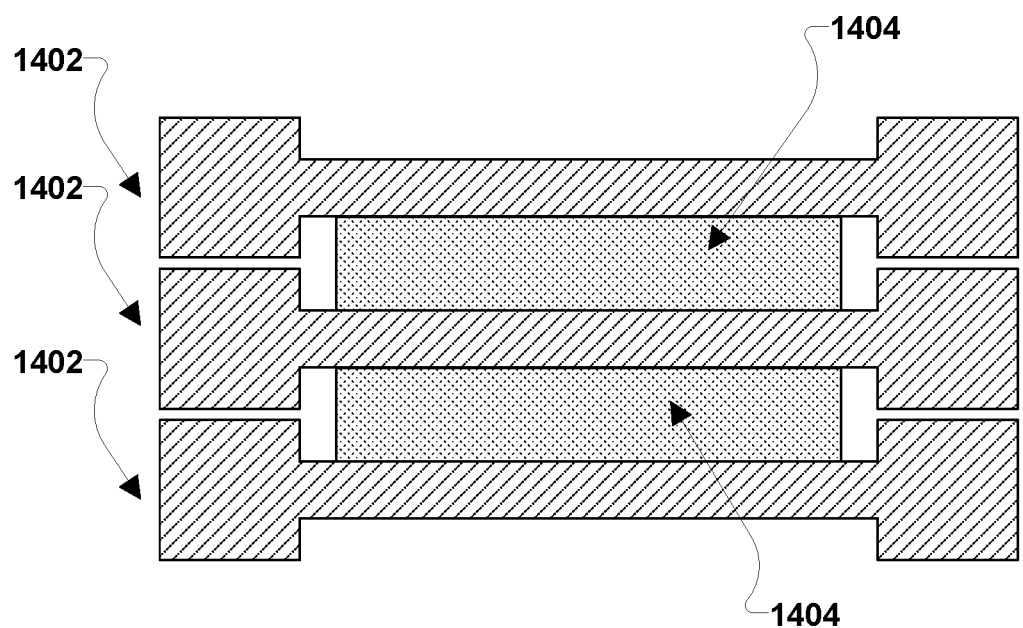
FIG. 14A illustrates an embodiment stacked electrochemical cell architecture.
Figure 14B:
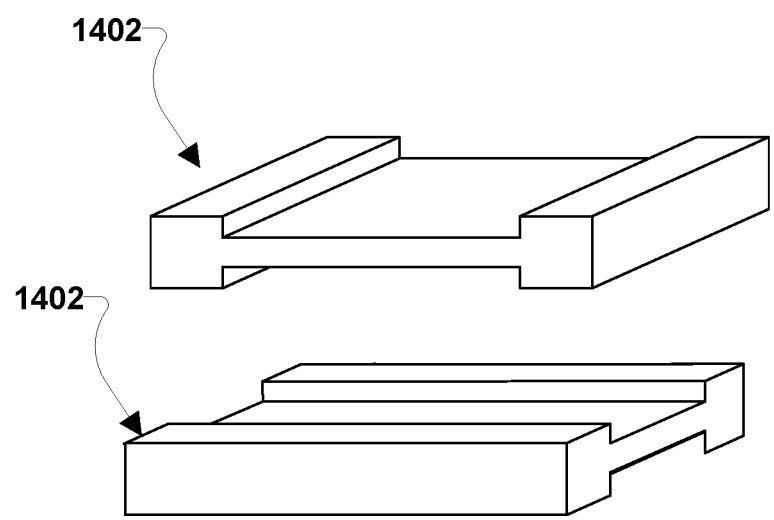
FIG. 14B illustrates an embodiment stacked electrochemical cell architecture.
Figure 14C:
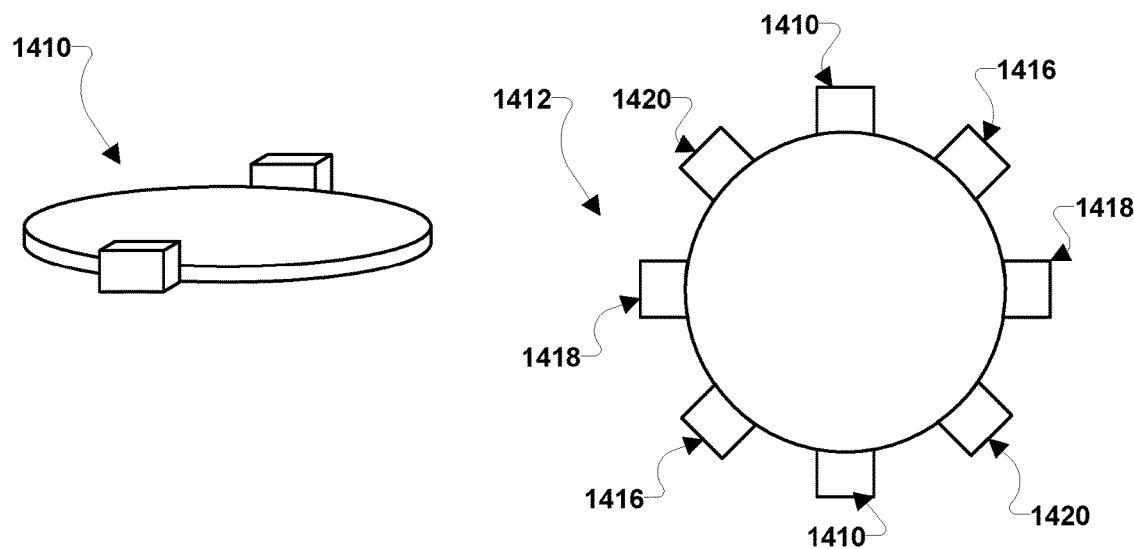
FIG. 14C illustrates an embodiment electrochemical cell and a clocked stacked cell architecture.
Figure 14D:
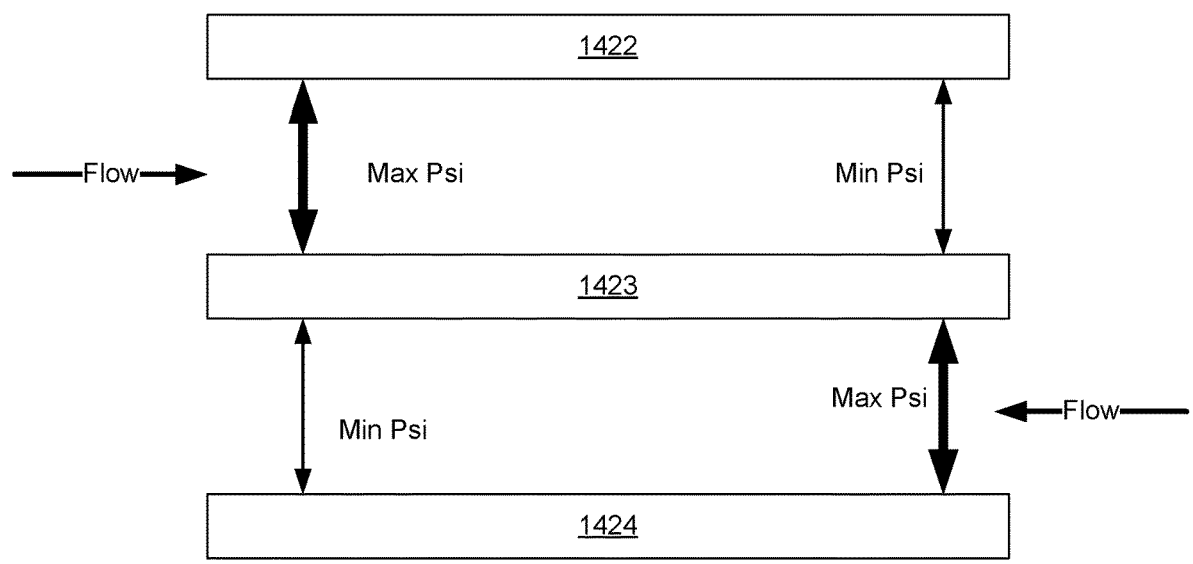
FIG. 14D illustrates pressure gradients in an embodiment stacked electrochemical cell architecture.

Various embodiments may provide stacked electrochemical cell architectures. Various embodiment stacked electrochemical cell architectures may minimize excess material and reduce the cost of the cells while allowing for liquid introduction into flow type electrochemical cells. Flow batteries require the introduction of a fluid media. Various embodiments provide an architecture where the electrochemical cell active areas and fluid introduction areas may be located in different regions. FIG. 14A illustrates an embodiment stacked electrochemical cell architecture in which cells 1402 have a thinner cell active area and a thicker fluid introduction area. The cells 1402 may be stacked on top of one another and electrolyte 1404 may flow between the cells 1402. The thinner and thicker relative portions of the cells 1402 may allow for mass allocation in the stack where required. FIG. 14A illustrates same direction aligned rectangular cells 1402 stacked on one another. FIG. 14B illustrates two orthogonally aligned rectangular cells 1402 arranged to be stacked together. FIG. 14C illustrates a round cell 1410 with a think cell active area and thicker fluid introduction area on opposite sides. Such a round cell 1410 may be stacked with other cells 1416, 1418, and 1420 to form a stack 1412 of varying radial positions (e.g., 45 degrees offset from one another, etc.) which may enable further compactness of the stack 1412. FIG. 14D illustrates pressure gradients across a stack of three cells 1422, 1423, 1424. The pressure is higher at the flow inlet and lower at the flow exit. The flow direction may be varied between successive cells 1422, 1423, 1424.

Various embodiments may provide a stacked architecture of batteries, such as a stacked architecture of iron-air batteries. Various embodiment iron-air battery stacks may reduce, e.g., minimize, the cost of iron-air battery stacks. Various embodiment battery stack architectures may be advantageous in that the various embodiments may provide lower vessel/container costs, lower current collector costs, automatic electrolyte replenishment and liquid level adjustment, and/or many degrees of freedom for optimization. Various embodiments may provide stacking architectures that have minimal spacing between cells to minimize electrolyte volume requirements.

Figure 15:
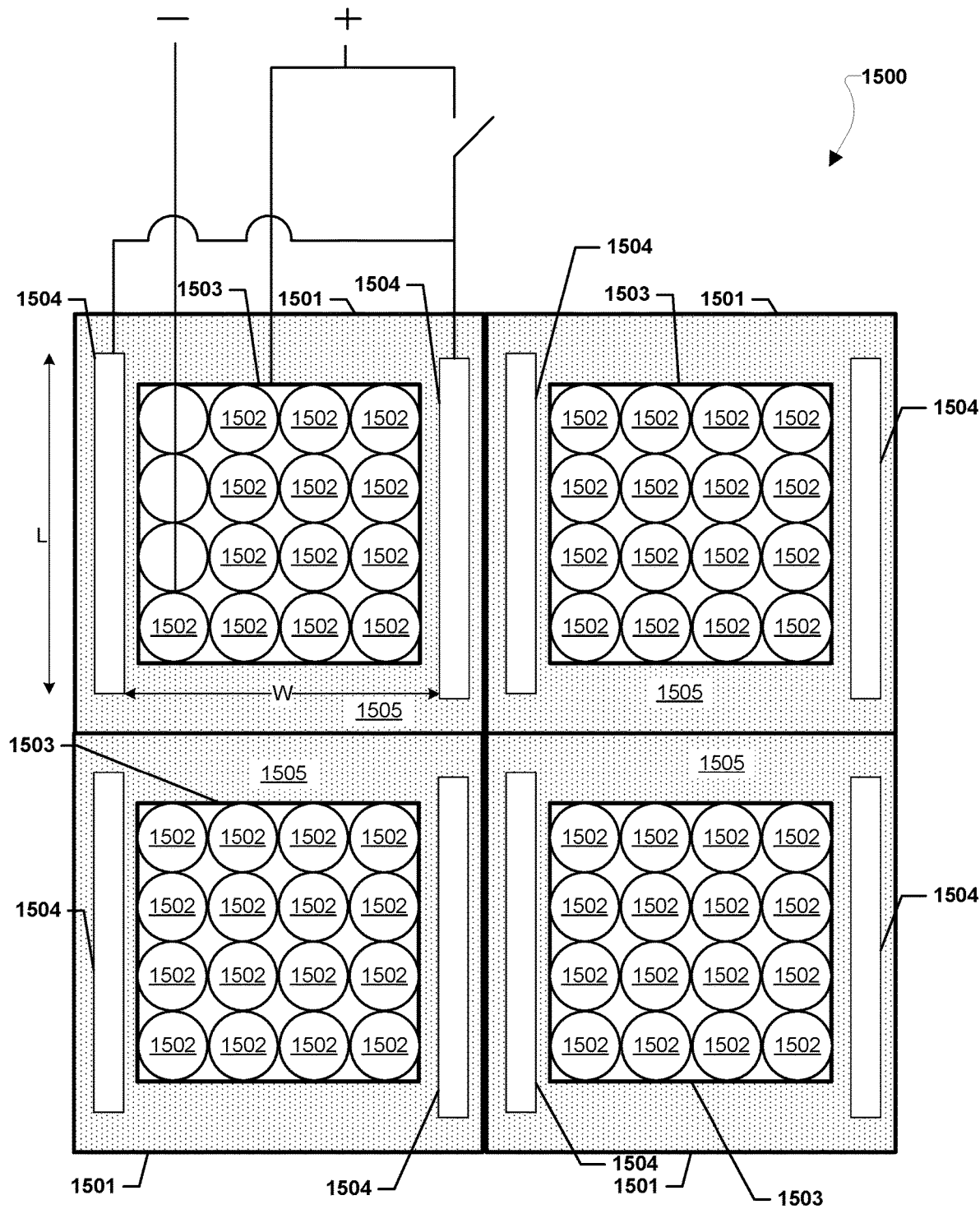
FIG. 15 illustrates an embodiment electrochemical cell stack architecture.

FIG. 15 illustrates an embodiment battery stack architecture 1500, such as an iron-air stack architecture. The stacked architecture 1500 may include a number of cells 1501 in rows and columns, such as a number 'M' columns and number 'N' rows where M and N may be any number. While FIG. 15 illustrates a two by two arrangement of cells 1501, any number of cells may be in each row and each column. In some embodiments, the number of rows and/or columns in any arrangement of rows and columns of cells 1501 may be determined based on a number of cells 1501 to be stacked above the rows and columns in a next tier of cells 1501. As an example, FIG. 18 discussed below shows a pyramidal stacked architecture in which cells are stacked above other cells in successively smaller tiers. Returning to FIG. 15, each cell 1501 may include a metal electrode that is a bed 1503 of pellets 1502, such as a porous bed of metal pellets (also referred to as marbles) (e.g., a bed of direct reduced iron (DRI) pellets, a bed of sponge iron pellets, etc.). In various embodiments, the pellets 1502 may be produced from, or may be, iron ore pellets, such as taconite or magnetite or hematite. In various embodiments, the pellets 1502 may be produced by reducing iron ore pellets to form a more metallic (more reduced, less highly oxidized) material, such as iron metal ($Fe^0$), wustite (FeO), or a mixture thereof. In various non-limiting embodiments, the pellets 1502 may be reduced iron ore, direct reduced ("DR") iron ore, "DR Grade" iron ore pellets (which are not yet reduced), direct reduced iron ("DRI") pellets, or any combination thereof. The bed 1503 may operate as the anode of the cell 1501. In some embodiments, the length 'L' of the bed 1503 may be set by the current collector costs. In some embodiments, the width 'W' of the bed 1503 may be set by the ionic conductivity/ohmic loss during charge. In various embodiments, each row of the stack 1500 may be separated by OER cathode 1504 curtains.

The OER cathode 1504 curtains may be sized in various embodiments depending on the charging current density requirement. Each cell 1501 may include a volume of electrolyte 1505, such as a KOH electrolyte.

Figure 16:
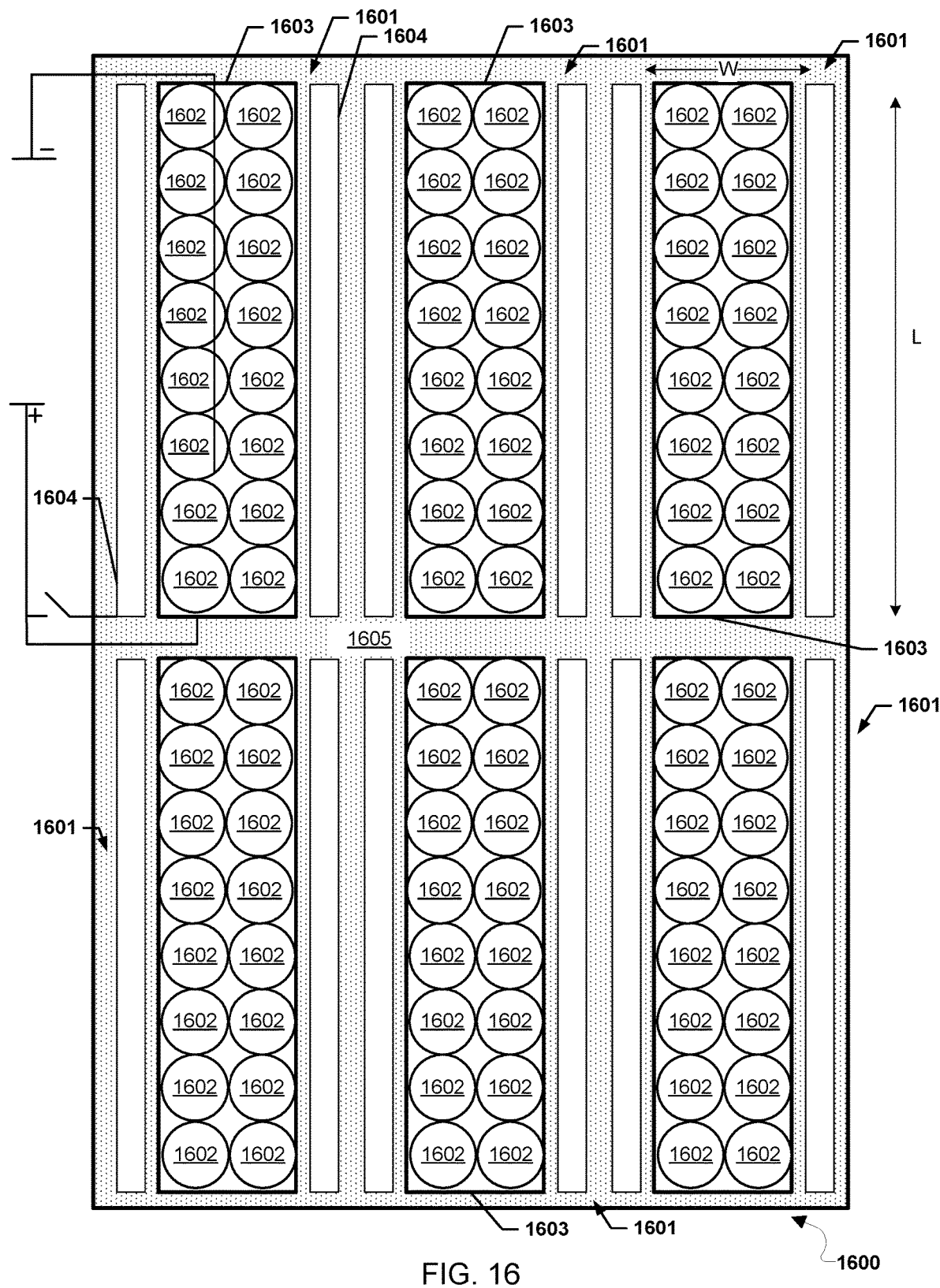
FIG. 16 illustrates an embodiment electrochemical cell stack architecture.

FIG. 16 illustrates another embodiment battery stack architecture 1600, such as an iron-air stack architecture. The architecture 1600 is similar to the architecture 1500, except that each cell 1601 in architecture 1600 may not be compartmentalized, while the cells 1501 in architecture 1500 are compartmentalized. In this manner, because each cell 1601 is not compartmentalized, the cells 1601 may share one common volume of electrolyte 1605, such as a KOH electrolyte. The stacked architecture 1600 may include a number of cells 1501 in rows and columns, such as a number 'M' columns and number 'N' rows where M and N may be any number. While FIG. 16 illustrates a two by three arrangement of cells 1601, any number of cells may be in each row and each column. In some embodiments, the number of rows and/or columns in any arrangement of rows and columns of cells 1601 may be determined based on a number of cells 1601 to be stacked above the rows and columns in a next tier of cells 1601. As an example, FIG. 18 discussed below shows a pyramidal stacked architecture in which cells are stacked above other cells in successively smaller tiers. Returning to FIG. 16, each cell 1601 may include a metal electrode that is a bed 1603 of pellets 1602, such as a porous bed of metal pellets (also referred to as marbles) (e.g., a bed of direct reduced iron (DRI) pellets, a bed of sponge iron pellets, etc.). The pellets 1602 may be similar to pellets 1502 described above. The bed 1603 may operate as the anode of the cell 1601. In some embodiments, the length 'L' of the bed 1603 may be set by the current collector costs. In some embodiments, the width 'W' of the bed 1603 may be set by the ionic conductivity/ohmic loss during charge. In various embodiments, each row of the stack 1600 may be separated by OER cathode 1604 curtains. The OER cathode 1604 curtains may be sized in various embodiments depending on the charging current density requirement.

Figure 17:
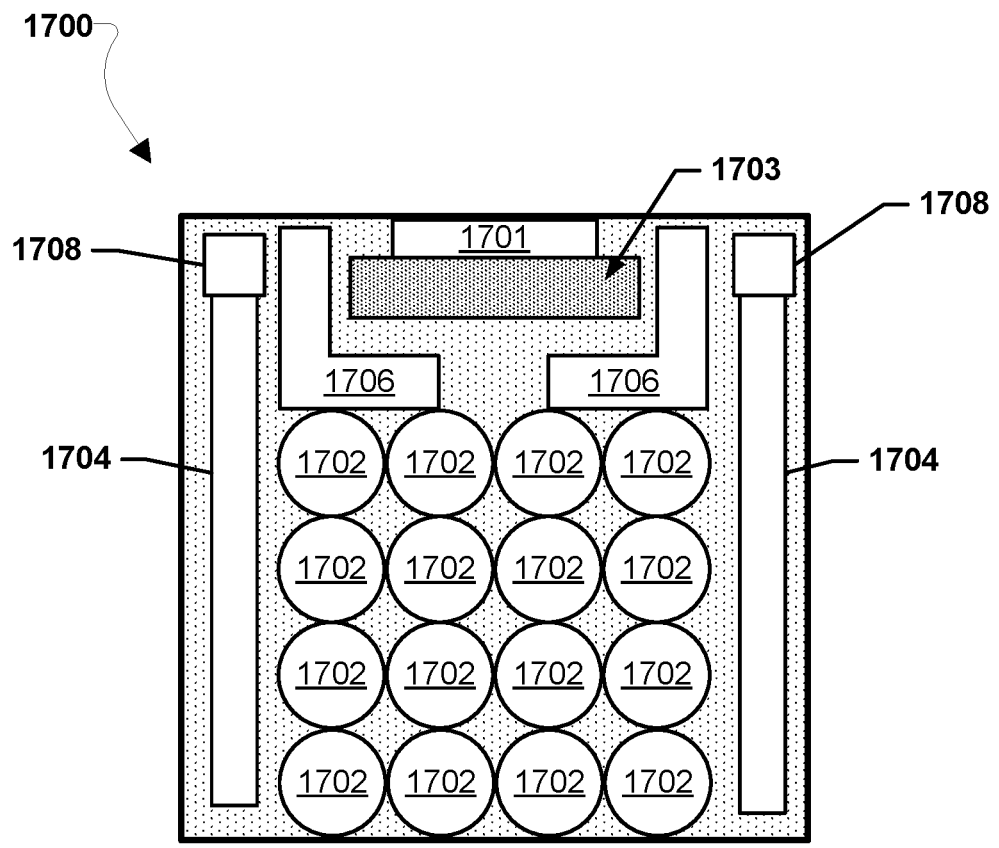
FIG. 17 illustrates an embodiment electrochemical cell suitable for use in a stacked architecture.

FIG. 17 illustrates a unit cell 1700 configuration configured to be stacked in a stacked electrochemical architecture, such as the arrangement illustrated in FIG. 18 discussed below. With reference to FIG. 17, the unit cell 1700 may include a load bearing current collector and bus bar 1701 that may fix the height of the air breathing ORR electrode 1703 relative to an electrolyte 1705 fill line (e.g., see electrolyte 1705 fill line shown in FIG. 19). In some embodiments, the air-breathing ORR electrode 1703 may be set at the liquid interface by the current collector and bus bar 1701 and may not be a floating electrode. The unit cell 1700 may include one or more anode current collectors 1706 that may transfer some load to pressurize the metal electrode that is a bed of pellets 1702, such as a porous bed of metal pellets (also referred to as marbles) (e.g., a bed of direct reduced iron (DRI) pellets, a bed of sponge iron pellets, etc.). The pellets 1702 may be similar to pellets 1502, 1602 described above. The anode current collectors 1706 may be a grid with holes therein for ionic conductivity and may transfer some of the load to the bed of pellets 1702 such that the bed of pellets 1702 is pressurized, thereby reducing resistance in the bed of pellets 1702. The unit cell 1700 may include one or more OER electrodes 1704 that may be formed as curtains with load bearing bus bars 1708 attached thereto. The bus bars 1701, 1708 may be metallic in various embodiments. The bus bars 1701, 1708 being load bearing may remove the load supporting requirements of the overall walls of the unit cell 1700 such that the container supporting the unit cell 1700 components may be constructed of cheaper materials than would be the case if the container of the unit cell 1700 itself was load bearing.

Figure 18:
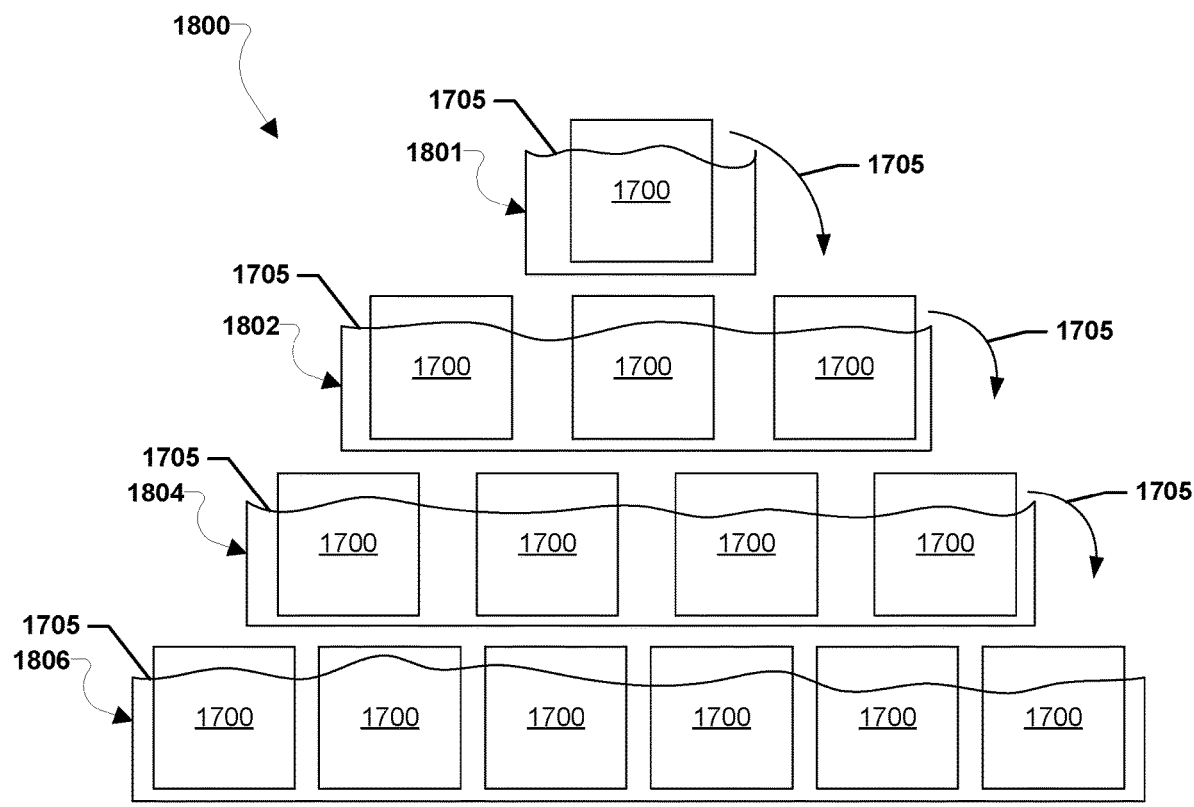
FIG. 18 illustrates an embodiment electrochemical cell stack architecture.

FIG. 18 illustrates a pyramidal stacked architecture 1800 in which cells 1700 are stacked above other cells 1700 in successively smaller tiers. The pyramid structure of the architecture 1800 enables electrolyte 1705 to flow from the top stack level 1801 down to each lower successive stack level 1802, 1804, 1806. In this manner, electrolyte 1705 may cascade similar to a waterfall down the stack levels 1801, 1802, 1804, 1806. In some embodiments, less unit cells 1700 may be disposed in each higher stack level 1806, 1804, 1802, 1801. For example, the lowest stack level 1806 may have the most number of unit cells 1700 therein, the next higher stack level 1804 may have less unit cells 1700 than the lowest stack level 1806, and so on such that the highest stack level 1801 has the lowest number of unit cells 1700 therein. The reduction of unit cells 1700 as stack levels 1806, 1804, 1802, and 1801 may result in each higher successive stack level 1804, 1802, 1801 having a comparable decreasing mechanical load on its respective next lower stack level 1806, 1804, 1802 than that lower stack level would have. Said another way, each successive stack level 1804, 1802, 1801 may weigh less than the lower stack level 1806, 1804, 1802 on which it rests as each successive stack level 1804, 1802, 1801 has less unit cells 1700.

Figure 19:
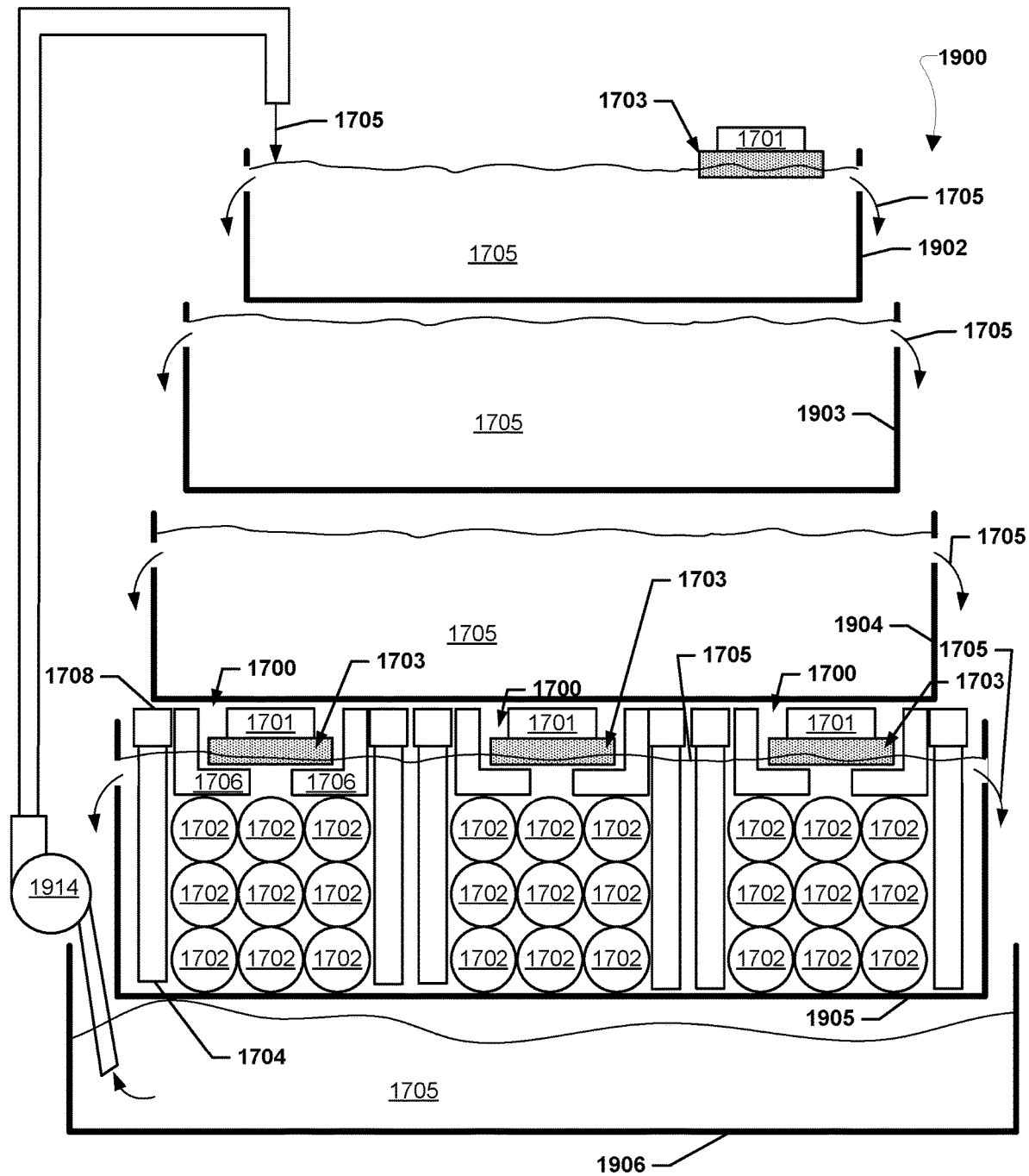
FIG. 19 illustrates an embodiment electrochemical cell stack architecture.

FIG. 19 illustrates portions of a pyramidal stacked architecture 1900 similar to architecture 1800. The containers of the stack levels 1905, 1904, 1903, and 1902 may each include unit cells 1700, though only unit cells 1700 for the lowest stack level 1905 are illustrated in FIG. 19 for ease of depiction. A portion of one unit cell 1700, specifically the bus bar 1701 and ORR electrode are also illustrated in the highest stack level 1902. The containers of the stack levels 1905, 1904, 1903, and 1902 may include through-holes in their respective side walls such that electrolyte 1705 may flow out of each container and maintain the height of the electrolyte 1705 in each respective container. The side walls of containers having through-holes may support the air-breathing ORR cathode 1703 and bus bar system 1701 being at a fixed height as the electrolyte level in each container may be maintained. Through-holes may also serve as outlets for electrolyte 1705 to flow out of container to next stack level 1903, 1904, 1905 below, therefore maintaining liquid level height always exactly at height of fixed (i.e., not floating) air-breathing electrodes. Below the lowest stack level 1905 may be disposed an electrolyte reservoir 1906. As electrolyte 1705 cascades down each successive lower stack level 1903, 1904, 1905, the electrolyte 1705 may flow down into the electrolyte reservoir 1906. The electrolyte reservoir 1906 may provide for easy replenishment of electrolyte 1705 and may always kept topped up to maintain a constant electrolyte concentration, such as 6M KOH concentration or 5M NaOH, or 1M LiOH+2M NaOH+3M KOH or any other electrolyte concentration ('M' means concentration in units of mol/liter of solution) A pump and pipe system 1914 may move electrolyte 1705 from the electrolyte reservoir 1906 back up to the top most stack level 1902. The flow of electrolyte 1906 to the top stack 1902 may counteract evaporation. The replenishment rate of the electrolyte 1705 to the reservoirs may be a rate selected to exceed a worst case evaporation to prevent cell 1700 dry out.

Air electrodes may require a triple-phase-point (a meeting of gaseous air and liquid electrolyte at a solid, conductive device element) that may present a challenge for system geometry. Positioning of an air electrode at the air-electrolyte interface is required, but keeping one side of a thin electrode wet and one side dry may be challenging. During oxygen evolution reaction (OER), oxygen bubbles can be trapped between the air electrode and the liquid electrolyte, drying the electrode and eliminating the triple-phase-point. Air electrodes with hydrophobic coatings may only be able to tolerate limited pressure differentials across them before "breakthrough pressure" causes leaks across the coating. To address such problems, various embodiments may provide a floating air electrode assembly with tune-able electrode height relative to the free liquid interface. In some embodiments, a floating air electrode assembly may include a variable angle with respect to gravity that may provide a consistent gas-liquid interface requiring only slight hydrophobicity and that may promote bubble flow off the electrode surface.

Figure 20:
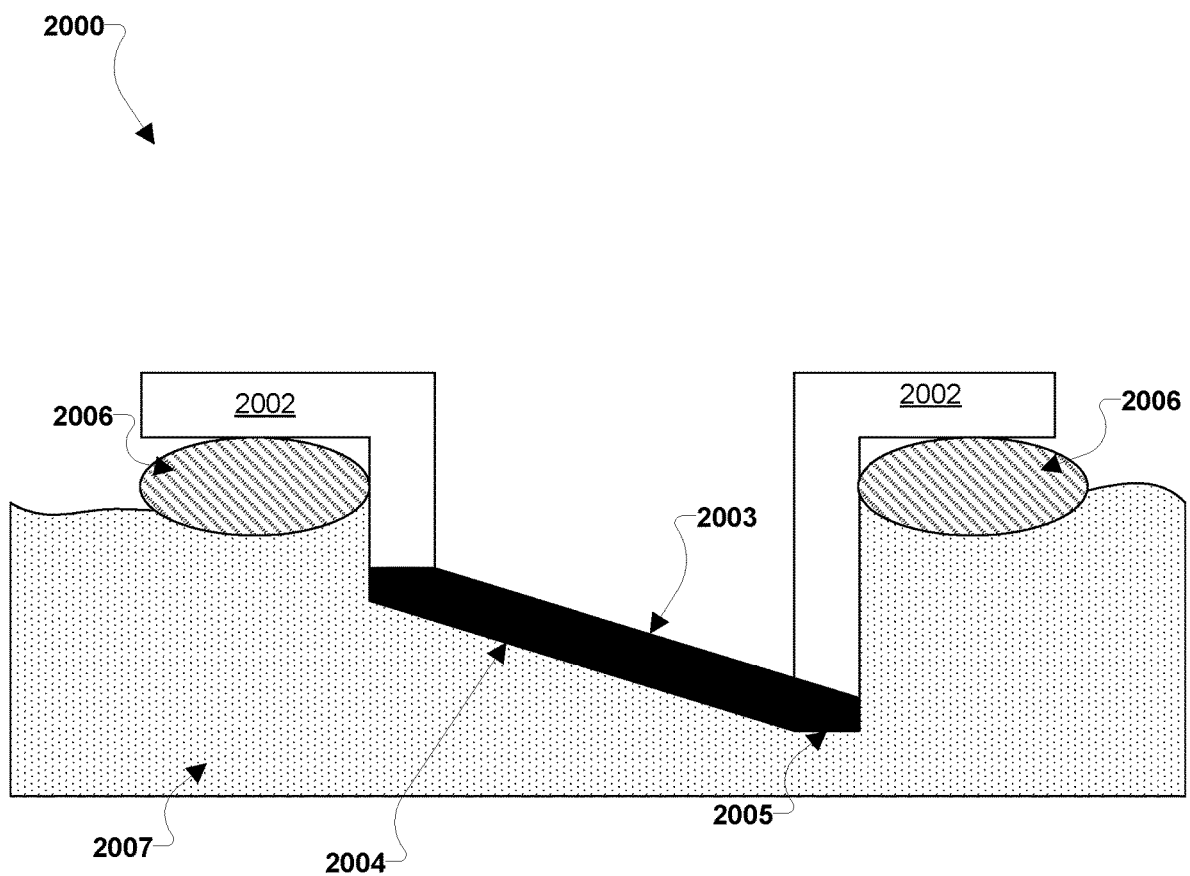
FIG. 20 illustrates an embodiment floating air electrode assembly.

FIG. 20 illustrates an embodiment floating air electrode assembly 2000. The floating air electrode assembly 2000 may include an air electrode 2003 in contact with a volume of electrolyte 2007. The floating air electrode assembly 2000 may be a portion of a battery, such as battery 100, 400, 600, 800, etc., described herein. The air electrode 2003 may be oriented at a downward angle relative to the surface of the electrolyte 2007 such that bubble hitting the surface 2004 of the air electrode 2003 may flow off the surface 2004. The surface 2004 may be a fully wetted surface and one side of the air electrode 2003 may extend further into the electrolyte 2007 such that the point 2005 of the air electrode 2003 deepest in the electrolyte 2007 is the point of max pressure. The air electrode 2003 may be supported by current collector portions 2002 which may exert downward force on the air electrode 2003. The current collector portions 2002 and the air electrode 2003 supported by the current collector portions 2002 may be floated on the electrolyte 2007 by floatation devices 2006, such as plastic gas filled sacs (e.g., low-density polyethylene (LDPE) bags filled with air, etc.), foam pieces (e.g., closed-cell extruded polystyrene foam, etc.), or any other type floatation structure. The floatation devices 2006 may impart a buoyant force on the air electrode 2003 and current collector portions 2002 such that the air electrode 2003 is positioned at the air-electrolyte interface. In some embodiments, the air electrode 2003 may include a hydrophobic coating, such as a hydrophobic coating on surface 2004.

Figure 21:
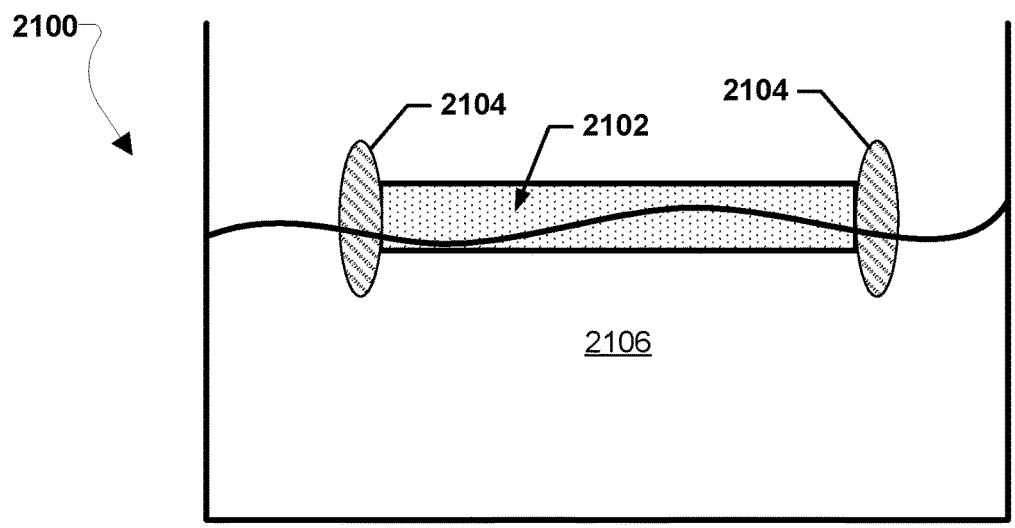
FIG. 21 illustrates an embodiment floating air electrode assembly.

FIG. 21 illustrates an embodiment floating air electrode assembly 2100. The floating air electrode assembly 2100 may include an air electrode 2102 in contact with a volume of electrolyte 2106. The floating air electrode assembly 2100 may be a portion of a battery, such as battery 100, 400, 600, 800, etc., described herein. The air electrode 2102 may be an ORR electrode. The air electrode 2102 may be supported by floats 2104. The floats 2104 may be formed from low density materials, such as plastic gas filled sacs (e.g., LDPE bags filled with air, etc.), foam pieces (e.g., closed-cell extruded polystyrene foam, etc.), or any other type low density materials capable of floating on the electrolyte 2106. The floats 2104 may impart a buoyant force on the air electrode 2102 such that the air electrode 2102 is positioned at the air-electrolyte interface to maintain triple phase boundary. In this manner, the air electrode 2102 may receive a sufficient supply of oxygen to meet volumetric energy density and cost targets.

Figure 22:
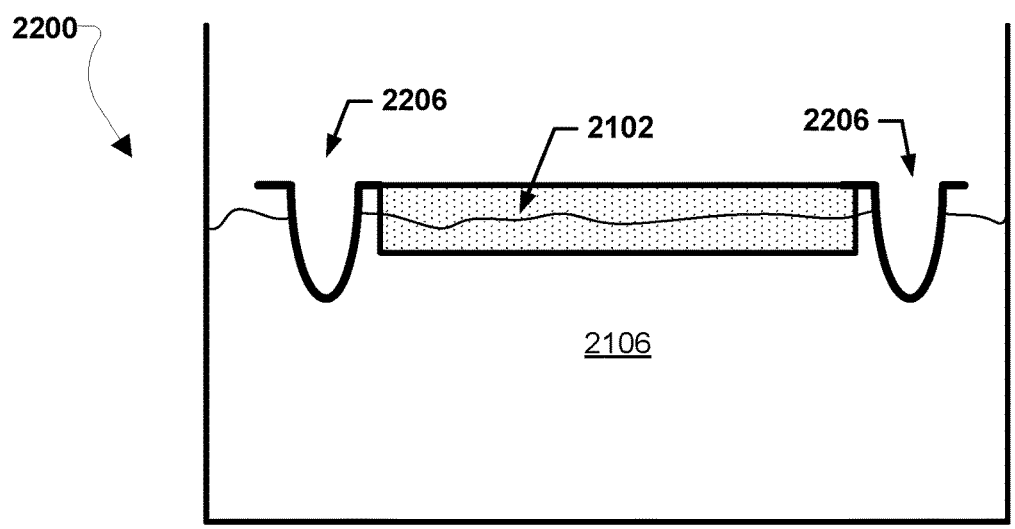
FIG. 22 illustrates an embodiment floating air electrode assembly.

FIG. 22 illustrates an embodiment floating air electrode assembly 2200 similar to assembly 2100, except that the floats 2104 are replaced with displacement shapes 2206. The floating air electrode assembly 2200 may be a portion of a battery, such as battery 100, 400, 600, 800, etc., described herein. The displacement shapes 2206 may be open forms similar to hulls of a boat that displace a volume of electrolyte 2106. The shapes of the displacement shapes 2206 may be configured such that the mass of the displaced electrolyte 2106 by the displacement shapes 2206 equals the mass of the assembly 2200, thereby enabling the air electrode 2102 to float on the electrolyte 2106.

In various embodiments, such as in secondary air-breathing batteries, it may be advantageous to have a single bi-functional air electrode that may be used in both charging and discharging. During oxygen reduction reaction (ORR), a triple-phase boundary (solid, liquid, gas) is needed for proper reduction of ambient oxygen by the bi-functional air electrode. During oxygen evolution reaction (OER), a triple-phase boundary is no longer needed by the bi-functional air electrode, but a hydrophobic layer may limit the flow of oxygen bubbles. These bubbles can lead to dead zones on the electrode surface. To address these issues, various embodiments may provide an air electrode that may vary position in the electrolyte to allow for optimal operation in each mode (ORR or OER). In various embodiments, during ORR, the air electrode is located at the electrolyte-air interface, either passively (floating, etc.) or actively positioned at the interface. Thanks to this positioning mechanism, the location need not be set by hydrophobicity. Rather, in some embodiments an accompanying floating apparatus may set the position of a completely porous air electrode. At this position, the triple-phase boundary is set for optimal ORR. The ability to set the position of the air electrode may eliminate the need for hydrophobicity of the electrode. During OER, the air electrode may be moved such that it is located fully submerged in the electrolyte. This may be set by a change in buoyancy, a tensioned cable, etc. Bubble management issues are thereby eliminated, as bubbles freely escape the electrode to make room for more OER. In addition, the submersion of the entire air electrode may allow for lower current densities than a partially-submerged electrode.

Figure 23A:
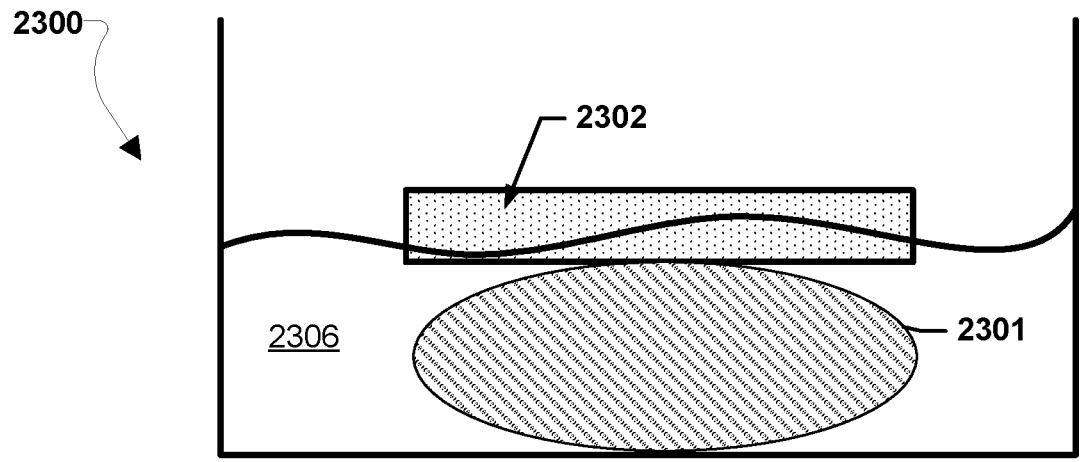
FIGS. 23A and 23B illustrate an embodiment variable position air electrode assembly in surface and submerged positions.
Figure 23B:
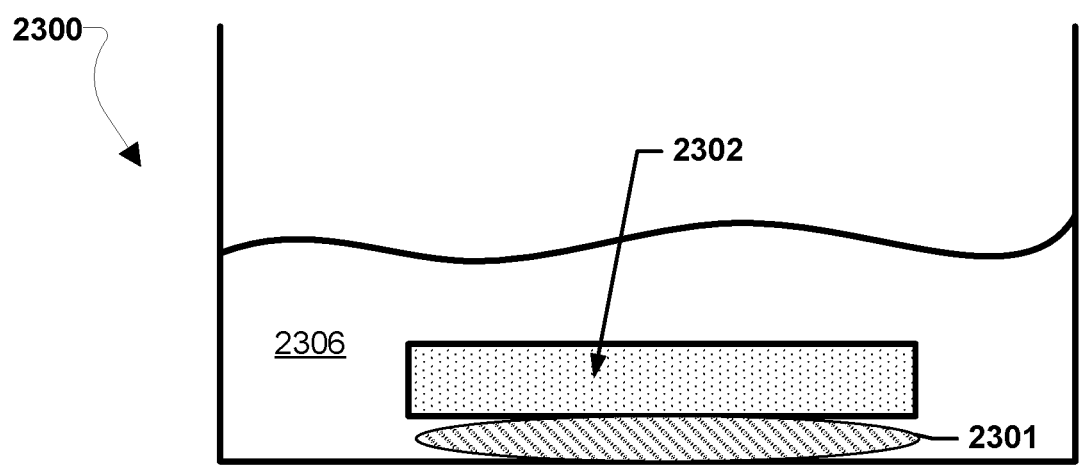

FIGS. 23A and 23B illustrate an embodiment variable position air electrode assembly 2300 in surface (FIG. 23A) and submerged (FIG. 23B) positions in a volume of electrolyte 2306. The assembly 2300 may be a portion of a battery, such as battery 100, 400, 600, 800, etc., described herein. The assembly 2300 may include a balloon 2301 (or bladder, sac, bag, etc.) that may support a bi-functional air electrode 2302 that may be used in both charging and discharging. During oxygen reduction reaction (ORR), a triple-phase boundary (solid, liquid, gas) is needed for proper reduction of ambient oxygen by the bi-functional air electrode 2302. During oxygen evolution reaction (OER), a triple-phase boundary is no longer needed by the bi-functional air electrode 2302. The balloon 2301 may be inflated when ORR is required to lift the bi-functional air electrode 2302 to the surface of the electrolyte 2306 such that the bi-functional air electrode 2302 is at the triple-phase boundary. The balloon 2301 may be deflated when OER is required to submerge the bi-functional air electrode 2302 in the electrolyte 2306. The inflating and/or deflating of the balloon 2301 may be controlled by a control system of the battery operating a pump to add and/or remove gas from the balloon 2301.

Figure 24A:
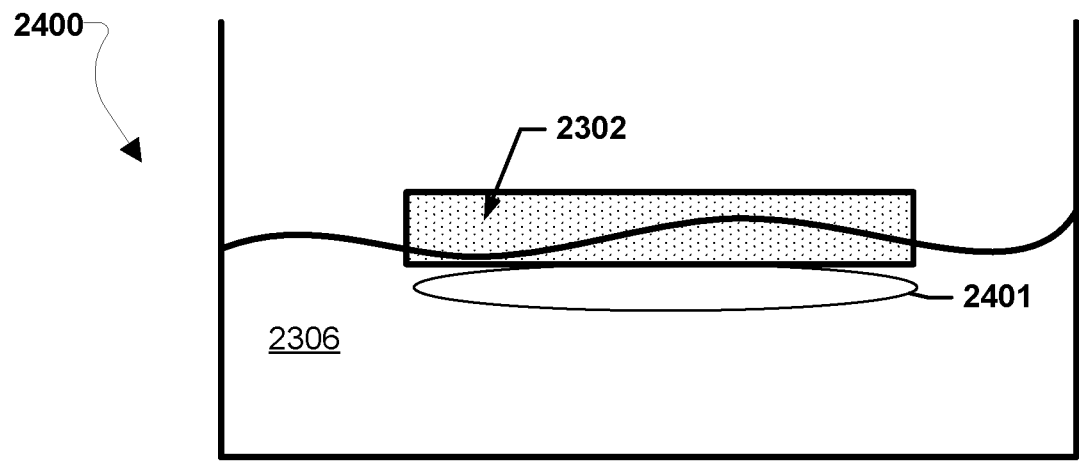
FIGS. 24A and 24B illustrate an embodiment variable position air electrode assembly in surface and submerged positions.
Figure 24B:
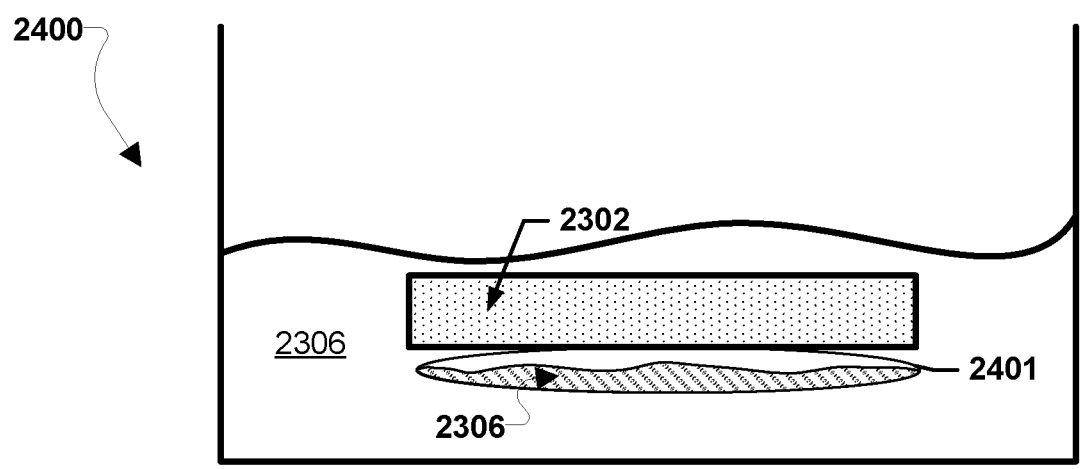

FIGS. 24A and 24B illustrate an embodiment variable position air electrode assembly 2300 in surface (FIG. 24A) and submerged (FIG. 24B) positions in the volume of electrolyte 2306. The assembly 2400 may be a portion of a battery, such as battery 100, 400, 600, 800, etc., described herein. The assembly 2400 may include a ballast tank 2401 (or bladder, sac, bag, etc.) that may support a bi-functional air electrode 2302 that may be used in both charging and discharging. The ballast tank 2401 may be configured to take in electrolyte 2306 and/or expel electrolyte 2306 to fill and/or void the ballast tank 2401 (e.g., via valved inlets/outlets and one or more pump). When the ballast tank 2401 takes in electrolyte 2306 the mass of the ballast tank 2401 and electrode 2302 in combination may increase. When the ballast tank 2401 expels electrolyte 2306 the mass of the ballast tank 2401 and electrode 2302 may decrease. During ORR the ballast tank 2401 may be emptied of electrolyte 2306 such that the combination of electrode 2302 and ballast tank 2401 may displace enough electrolyte 2306 to support the electrode 2302 at the surface of the electrolyte 2306 such that the bi-functional air electrode 2302 is at the triple-phase boundary. During OER the ballast tank 2401 may take on electrolyte 2306 such that the mass of the electrode 2302 and ballast tank 2401 increases to submerge the bi-functional air electrode 2302 in the electrolyte 2306. The filling and purging of the ballast tank 2401 may be controlled by a control system of the battery operating a pump to add and/or remove air and/or electrolyte 2306 from the ballast tank 2401.

Figure 25A:
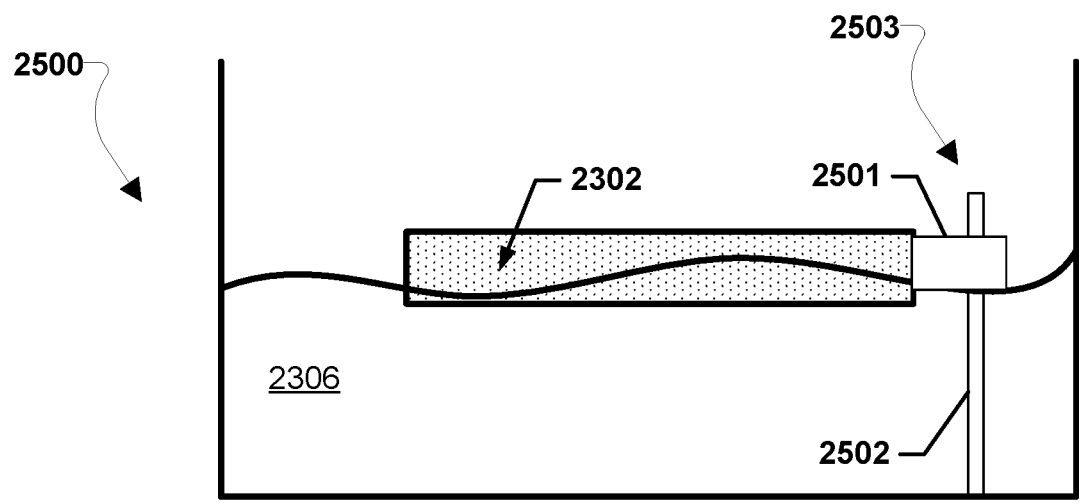
FIGS. 25A and 25B illustrate an embodiment variable position air electrode assembly in surface and submerged positions.
Figure 25B:
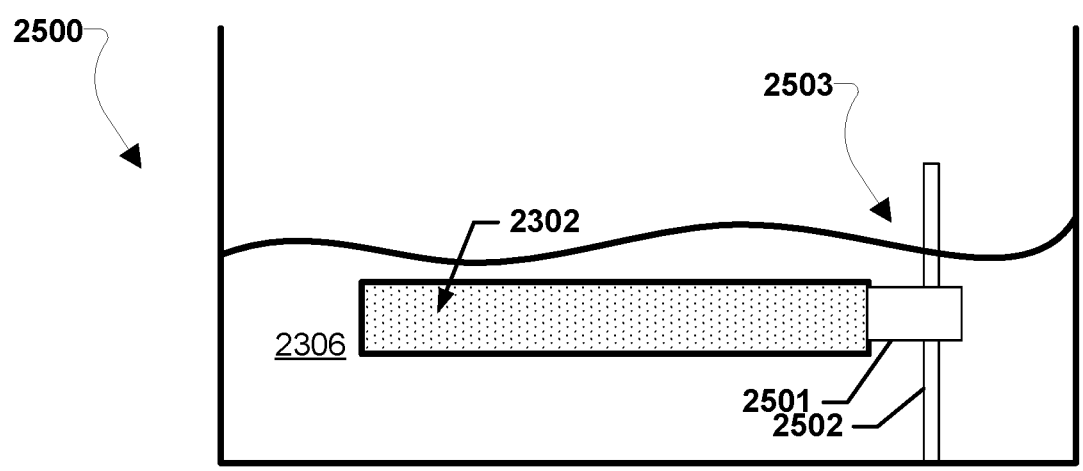

FIGS. 25A and 25B illustrate an embodiment variable position air electrode assembly in surface (FIG. 25A) and submerged (FIG. 25B) positions. The assembly 2500 may be a portion of a battery, such as battery 100, 400, 600, 800, etc., described herein. The assembly 2500 may include a lifting device 2503 that may support the bi-functional air electrode 2302 that may be used in both charging and discharging. The lifting device 2503 may be configured to actively change the position of the electrode 2302 in the electrolyte 2306. For example, the lifting device 2503 may include a drive assembly 2501 attached to the electrode 2302 and configured to move up and/or down a shaft 2502 (e.g., via interlocking teeth, screw drive, etc.). As the drive assembly 2501 is actuated to move up and/or down the shaft 2502, the electrode 2302 may be moved between the surface of the electrolyte 2306 and being submerged in the electrolyte 2306. During ORR, the drive assembly 2501 is actuated to move up the shaft 2502 such that the electrode 2302 is supported at the surface of the electrolyte 2306 at the triple-phase boundary. During OER the drive assembly 2501 is actuated to move down the shaft 2502 such that the electrode 2302 is supported submerged in the electrolyte 2306. The actuation of the lifting device 2503 may be controlled by a control system of the battery operating.

Various embodiments may provide devices and/or methods for use in bulk energy storage systems, such as long duration energy storage (LODES) systems, short duration energy storage (SDES) systems, etc. As an example, various embodiments may provide batteries, components of batteries, and/or stacks of batteries (e.g., any of batteries 100, 400, 600, 800, air electrodes discussed with reference to FIGS. 10-12 and 20-25B, current collectors discussed with reference to FIGS. 13A-E, stacks of batteries discussed with reference to FIGS. 5A, 5B, 14A-D, and 15-19, etc.) for bulk energy storage systems, such as batteries for LODES systems. Renewable power sources are becoming more prevalent and cost effective. However, many renewable power sources face an intermittency problem that is hindering renewable power source adoption. The impact of the intermittent tendencies of renewable power sources may be mitigated by pairing renewable power sources with bulk energy storage systems, such as LODES systems, SDES systems, etc. To support the adoption of combined power generation, transmission, and storage systems (e.g., a power plant having a renewable power generation source paired with a bulk energy storage system and transmission facilities at any of the power plant and/or the bulk energy storage system) devices and methods to support the design and operation of such combined power generation, transmission, and storage systems, such as the various embodiment devices and methods described herein, are needed.

A combined power generation, transmission, and storage system may be a power plant including one or more power generation sources (e.g., one or more renewable power generation sources, one or more non-renewable power generations sources, combinations of renewable and non-renewable power generation sources, etc.), one or more transmission facilities, and one or more bulk energy storage systems. Transmission facilities at any of the power plant and/or the bulk energy storage systems may be co-optimized with the power generation and storage system or may impose constraints on the power generation and storage system design and operation. The combined power generation, transmission, and storage systems may be configured to meet various output goals, under various design and operating constraints.

FIGS. 27-35 illustrate various example systems in which one or more aspects of the various embodiments may be used as part of bulk energy storage systems, such as LODES systems, SDES systems, etc. For example, various embodiment batteries, components of batteries, and/or stacks of batteries described herein (e.g., any of batteries 100, 400, 600, 800, air electrodes discussed with reference to FIGS. 10-12 and 20-25B, current collectors discussed with reference to FIGS. 13A-E, stacks of batteries discussed with reference to FIGS. 5A, 5B, 14A-D, and 15-19, etc.) may be used as batteries, components of batteries, and/or stack of batteries for bulk energy storage systems, such as LODES systems, SDES systems, etc. As used herein, the term "LODES system" may mean a bulk energy storage system configured to may have a rated duration (energy/power ratio) of 24 hours (h) or greater, such as a duration of 24 h, a duration of 24 h to 50 h, a duration of greater than 50 h, a duration of 24 h to 150 h, a duration of greater than 150 h, a duration of 24 h to 200 h, a duration greater than 200 h, a duration of 24 h to 500 h, a duration greater than 500 h, etc.

Figure 27:
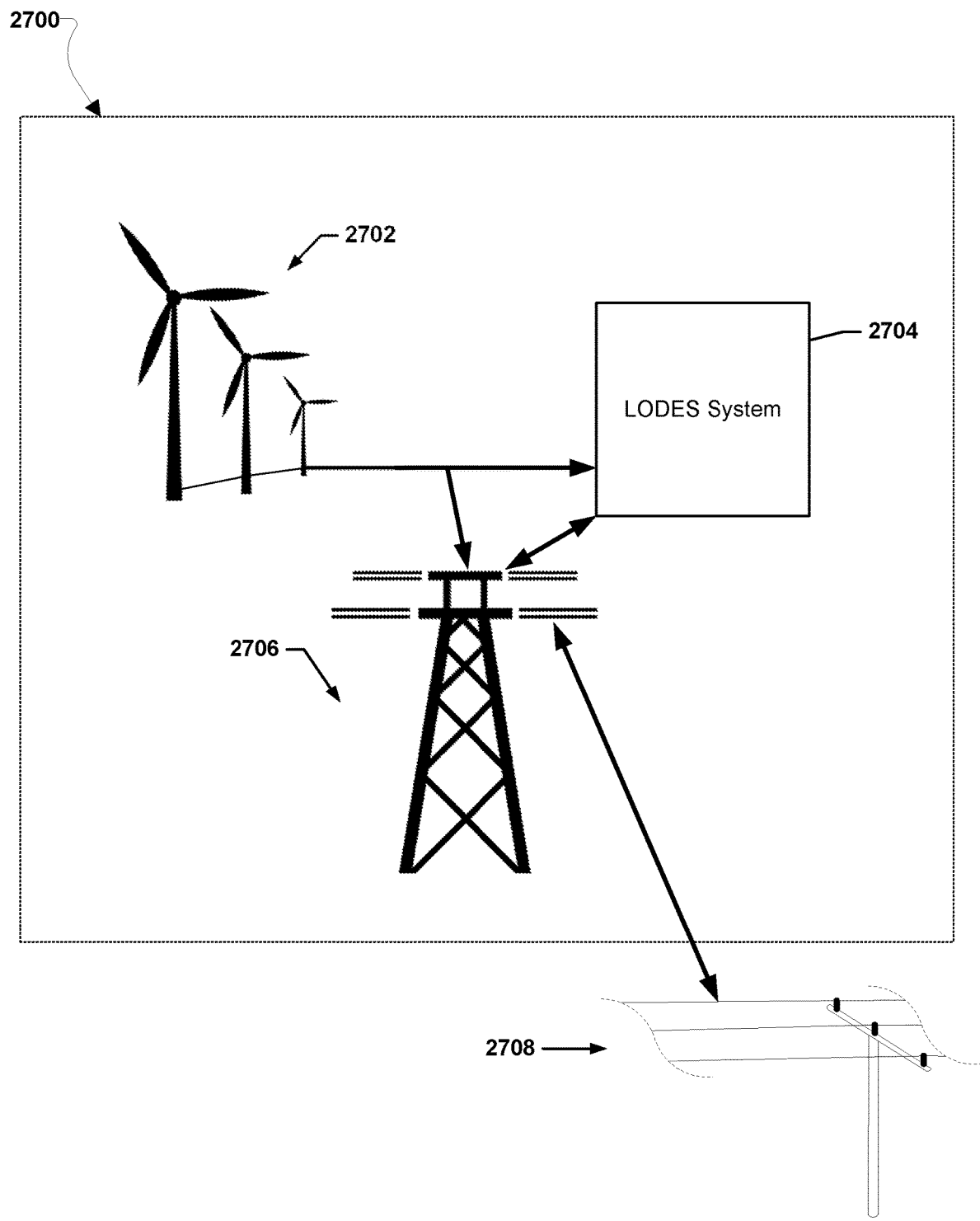
FIGS. 27-35 illustrate various example systems in which one or more aspects of the various embodiments may be used as part of bulk energy storage systems.

FIG. 27 illustrates an example system in which one or more aspects of the various embodiments may be used as part of bulk energy storage system. As a specific example, the bulk energy storage system incorporating one or more aspects of the various embodiments may be a LODES system 2704. As an example, the LODES system 2704 may include any of the various embodiment batteries, components of batteries, and/or stacks of batteries described herein (e.g., any of batteries 100, 400, 600, 800, air electrodes discussed with reference to FIGS. 10-12 and 20-25B, current collectors discussed with reference to FIGS. 13A-E, stacks of batteries discussed with reference to FIGS. 5A, 5B, 14A-D, and 15-19, etc.), singularly or in various combinations. The LODES system 2704 may be electrically connected to a wind farm 2702 and one or more transmission facilities 2706. The wind farm 2702 may be electrically connected to the transmission facilities 2706. The transmission facilities 2706 may be electrically connected to the grid 2708. The wind farm 2702 may generate power and the wind farm 2702 may output generated power to the LODES system 2704 and/or the transmission facilities 2706. The LODES system 2704 may store power received from the wind farm 2702 and/or the transmission facilities 2706. The LODES system 2704 may output stored power to the transmission facilities 2706. The transmission facilities 2706 may output power received from one or both of the wind farm 2702 and LODES system 2704 to the grid 2708 and/or may receive power from the grid 2708 and output that power to the LODES system 2704. Together the wind farm 2702, the LODES system 2704, and the transmission facilities 2706 may constitute a power plant 2700 that may be a combined power generation, transmission, and storage system. The power generated by the wind farm 2702 may be directly fed to the grid 2708 through the transmission facilities 2706, or may be first stored in the LODES system 2704. In certain cases the power supplied to the grid 2708 may come entirely from the wind farm 2702, entirely from the LODES system 2704, or from a combination of the wind farm 2702 and the LODES system 2704. The dispatch of power from the combined wind farm 2702 and LODES system 2704 power plant 2700 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 2700, the LODES system 2704 may be used to reshape and "firm" the power produced by the wind farm 2702. In one such example, the wind farm 2702 may have a peak generation output (capacity) of 260 megawatts (MW) and a capacity factor (CF) of 41%. The LODES system 2704 may have a power rating (capacity) of 106 MW, a rated duration (energy/power ratio) of 150 hours (h), and an energy rating of 15,900 megawatt hours (MWh). In another such example, the wind farm 2702 may have a peak generation output (capacity) of 300 MW and a capacity factor (CF) of 41%. The LODES system 2704 may have a power rating of 106 MW, a rated duration (energy/power ratio) of 200 h and an energy rating of 21,200 MWh. In another such example, the wind farm 2702 may have a peak generation output (capacity) of 176 MW and a capacity factor (CF) of 53%. The LODES system 2704 may have a power rating (capacity) of 88 MW, a rated duration (energy/power ratio) of 150 h and an energy rating of 13,200 MWh. In another such example, the wind farm 2702 may have a peak generation output (capacity) of 277 MW and a capacity factor (CF) of 41%. The LODES system 2704 may have a power rating (capacity) of 97 MW, a rated duration (energy/power ratio) of 50 h and an energy rating of 4,850 MWh. In another such example, the wind farm 2702 may have a peak generation output (capacity) of 315 MW and a capacity factor (CF) of 41%. The LODES system 2704 may have a power rating (capacity) of 110 MW, a rated duration (energy/power ratio) of 25 h and an energy rating of 2,750 MWh.

Figure 28:
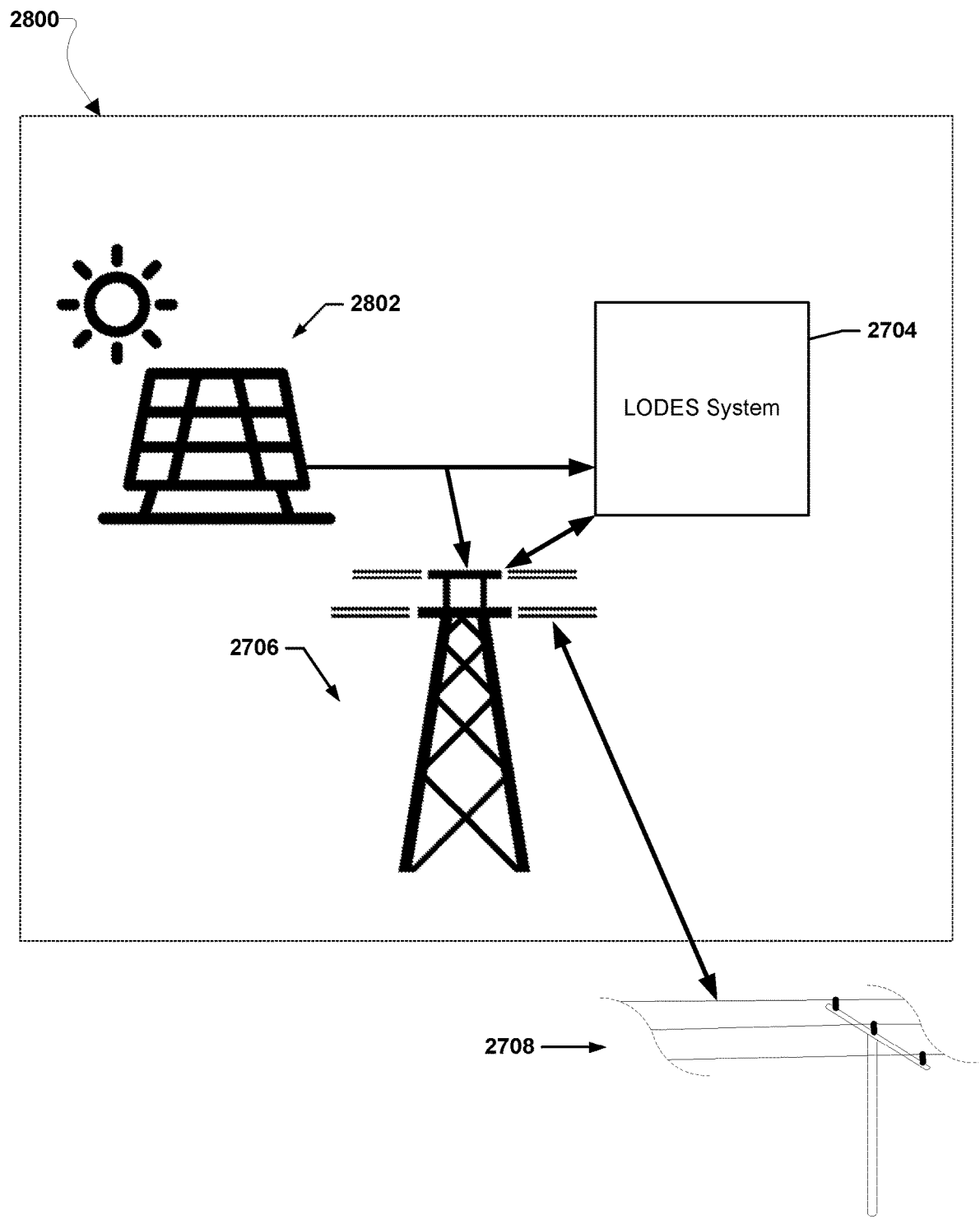

FIG. 28 illustrates an example system in which one or more aspects of the various embodiments may be used as part of bulk energy storage system. As a specific example, the bulk energy storage system incorporating one or more aspects of the various embodiments may be a LODES system 2704. As an example, the LODES system 2704 may include any of the various embodiment batteries, components of batteries, and/or stacks of batteries described herein (e.g., any of batteries 100, 400, 600, 800, air electrodes discussed with reference to FIGS. 10-12 and 20-25B, current collectors discussed with reference to FIGS. 13A-E, stacks of batteries discussed with reference to FIGS. 5A, 5B, 14A-D, and 15-19, etc.), singularly or in various combinations. The system of FIG. 28 may be similar to the system of FIG. 27, except a photovoltaic (PV) farm 2802 may be substituted for the wind farm 2702. The LODES system 2704 may be electrically connected to the PV farm 2802 and one or more transmission facilities 2706. The PV farm 2802 may be electrically connected to the transmission facilities 2706. The transmission facilities 2706 may be electrically connected to the grid 2708. The PV farm 2802 may generate power and the PV farm 2802 may output generated power to the LODES system 2704 and/or the transmission facilities 2706. The LODES system 2704 may store power received from the PV farm 2802 and/or the transmission facilities 2706. The LODES system 2704 may output stored power to the transmission facilities 2706. The transmission facilities 2706 may output power received from one or both of the PV farm 2802 and LODES system 2704 to the grid 2708 and/or may receive power from the grid 2708 and output that power to the LODES system 2704. Together the PV farm 2802, the LODES system 2704, and the transmission facilities 2706 may constitute a power plant 2800 that may be a combined power generation, transmission, and storage system. The power generated by the PV farm 2802 may be directly fed to the grid 2708 through the transmission facilities 2706, or may be first stored in the LODES system 2704. In certain cases the power supplied to the grid 2708 may come entirely from the PV farm 2802, entirely from the LODES system 2704, or from a combination of the PV farm 2802 and the LODES system 2704. The dispatch of power from the combined PV farm 2802 and LODES system 2704 power plant 2800 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 2800, the LODES system 2704 may be used to reshape and "firm" the power produced by the PV farm 2802. In one such example, the PV farm 2802 may have a peak generation output (capacity) of 490 MW and a capacity factor (CF) of 24%. The LODES system 2704 may have a power rating (capacity) of 340 MW, a rated duration (energy/power ratio) of 150 h and an energy rating of 51,000 MWh. In another such example, the PV farm 2802 may have a peak generation output (capacity) of 680 MW and a capacity factor (CF) of 24%. The LODES system 2704 may have a power rating (capacity) of 410 MW, a rated duration (energy/power ratio) of 200 h, and an energy rating of 82,000 MWh. In another such example, the PV farm 2802 may have a peak generation output (capacity) of 330 MW and a capacity factor (CF) of 31%. The LODES system 2704 may have a power rating (capacity) of 215 MW, a rated duration (energy/power ratio) of 150 h, and an energy rating of 32,250 MWh. In another such example, the PV farm 2802 may have a peak generation output (capacity) of 510 MW and a capacity factor (CF) of 24%. The LODES system 2704 may have a power rating (capacity) of 380 MW, a rated duration (energy/power ratio) of 50 h, and an energy rating of 19,000 MWh. In another such example, the PV farm 2802 may have a peak generation output (capacity) of 630 MW and a capacity factor (CF) of 24%. The LODES system 2704 may have a power rating (capacity) of 380 MW, a rated duration (energy/power ratio) of 25 h, and an energy rating of 9,500 MWh.

Figure 29:
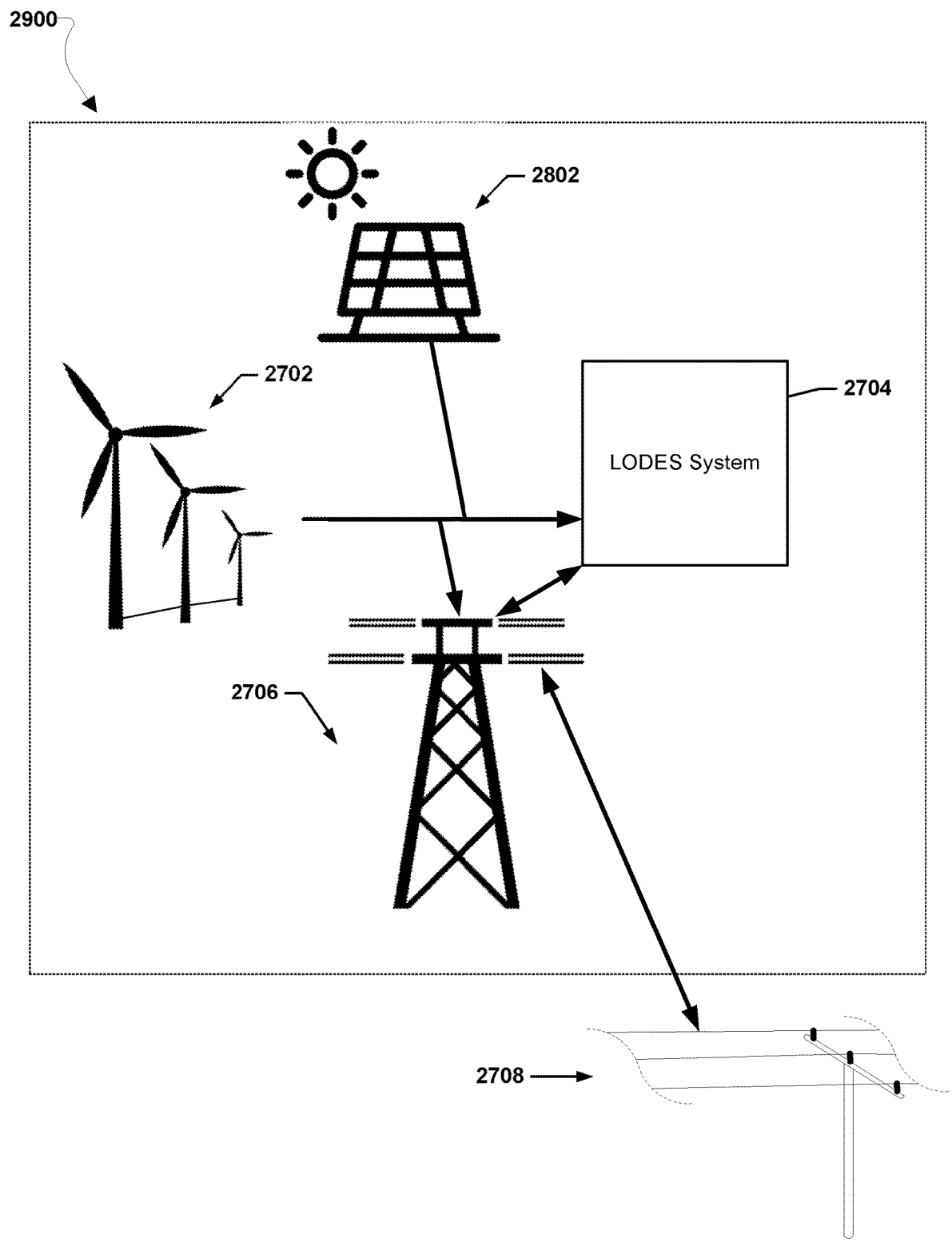

FIG. 29 illustrates an example system in which one or more aspects of the various embodiments may be used as part of bulk energy storage system. As a specific example, the bulk energy storage system incorporating one or more aspects of the various embodiments may be a LODES system 2704. As an example, the LODES system 2704 may include any of the various embodiment batteries, components of batteries, and/or stacks of batteries described herein (e.g., any of batteries 100, 400, 600, 800, air electrodes discussed with reference to FIGS. 10-12 and 20-25B, current collectors discussed with reference to FIGS. 13A-E, stacks of batteries discussed with reference to FIGS. 5A, 5B, 14A-D, and 15-19, etc.), singularly or in various combinations. The system of FIG. 29 may be similar to the systems of FIGS. 27 and 28, except the wind farm 2702 and the photovoltaic (PV) farm 2802 may both be power generators working together in the power plant 2900. Together the PV farm 2802, wind farm 2702, the LODES system 2704, and the transmission facilities 2706 may constitute the power plant 2900 that may be a combined power generation, transmission, and storage system. The power generated by the PV farm 2802 and/or the wind farm 2702 may be directly fed to the grid 2708 through the transmission facilities 2706, or may be first stored in the LODES system 2704. In certain cases the power supplied to the grid 2708 may come entirely from the PV farm 2802, entirely from the wind farm 2702, entirely from the LODES system 2704, or from a combination of the PV farm 2802, the wind farm 2702, and the LODES system 2704. The dispatch of power from the combined wind farm 2702, PV farm 2802, and LODES system 2704 power plant 2900 may be controlled according to a determined long-range (multi-day or even multi-year) schedule, or may be controlled according to a day-ahead (24 hour advance notice) market, or may be controlled according to an hour-ahead market, or may be controlled in response to real time pricing signals.

As one example of operation of the power plant 2900, the LODES system 2704 may be used to reshape and "firm" the power produced by the wind farm 2702 and the PV farm 2802. In one such example, the wind farm 2702 may have a peak generation output (capacity) of 126 MW and a capacity factor (CF) of 41% and the PV farm 2802 may have a peak generation output (capacity) of 126 MW and a capacity factor (CF) of 24%. The LODES system 2704 may have a power rating (capacity) of 63 MW, a rated duration (energy/power ratio) of 150 h, and an energy rating of 9,450 MWh. In another such example, the wind farm 2702 may have a peak generation output (capacity) of 170 MW and a capacity factor (CF) of 41% and the PV farm 2802 may have a peak generation output (capacity) of 110 MW and a capacity factor (CF) of 24%. The LODES system 2704 may have a power rating (capacity) of 57 MW, a rated duration (energy/power ratio) of 200 h, and an energy rating of 11,400 MWh. In another such example, the wind farm 2702 may have a peak generation output (capacity) of 105 MW and a capacity factor (CF) of 51% and the PV farm 2802 may have a peak generation output (capacity) of 70 MW and a capacity factor (CF) of 31 The LODES system 2704 may have a power rating (capacity) of 61 MW, a rated duration (energy/power ratio) of 150 h, and an energy rating of 9,150 MWh. In another such example, the wind farm 2702 may have a peak generation output (capacity) of 135 MW and a capacity factor (CF) of 41% and the PV farm 2802 may have a peak generation output (capacity) of 90 MW and a capacity factor (CF) of 24%. The LODES system 2704 may have a power rating (capacity) of 68 MW, a rated duration (energy/power ratio) of 50 h, and an energy rating of 3,400 MWh. In another such example, the wind farm 2702 may have a peak generation output (capacity) of 144 MW and a capacity factor (CF) of 41% and the PV farm 2802 may have a peak generation output (capacity) of 96 MW and a capacity factor (CF) of 24%. The LODES system 2704 may have a power rating (capacity) of 72 MW, a rated duration (energy/power ratio) of 25 h, and an energy rating of 1,800 MWh.

Figure 30:
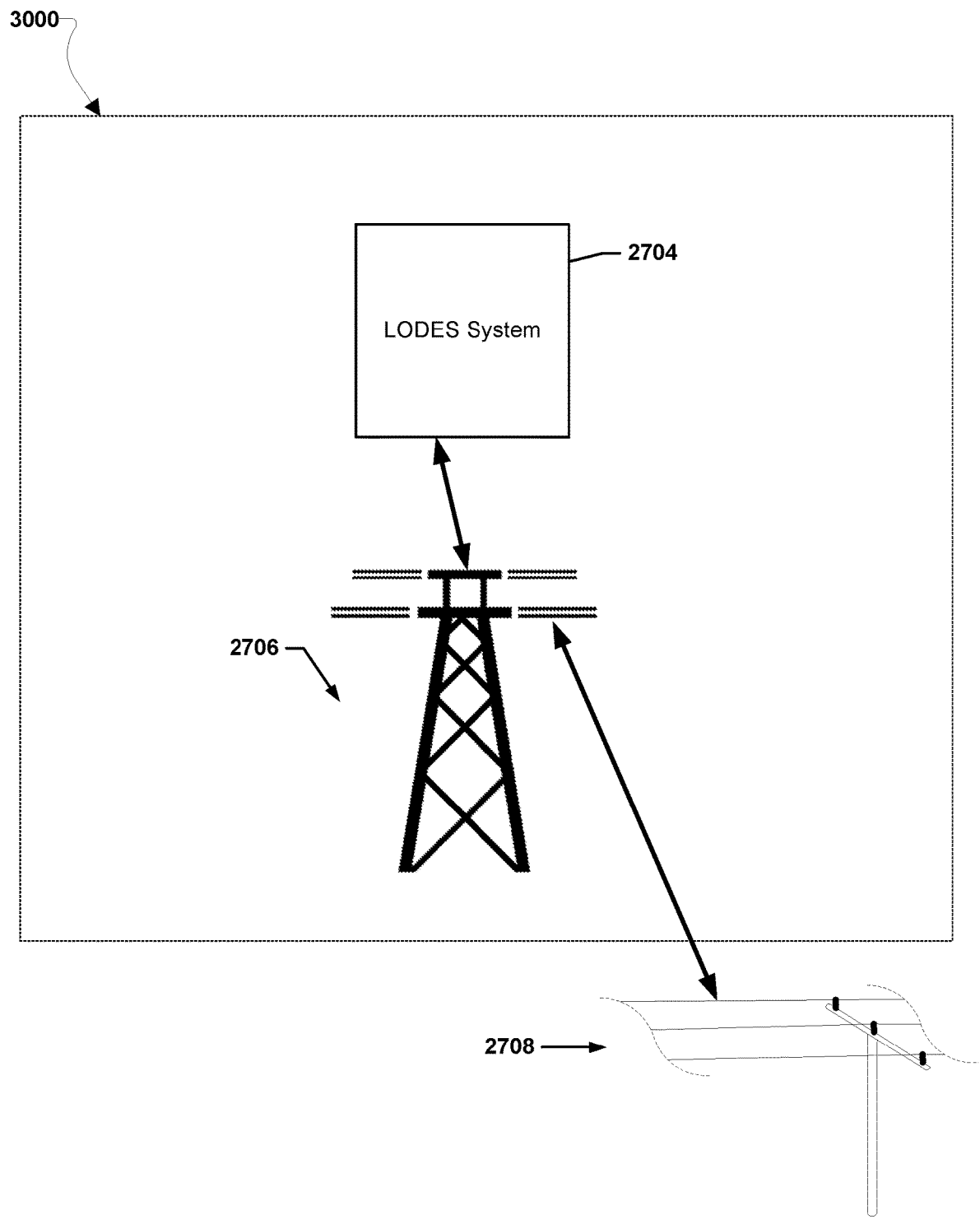

FIG. 30 illustrates an example system in which one or more aspects of the various embodiments may be used as part of bulk energy storage system. As a specific example, the bulk energy storage system incorporating one or more aspects of the various embodiments may be a LODES system 2704. As an example, the LODES system 2704 may include any of the various embodiment batteries, components of batteries, and/or stacks of batteries described herein (e.g., any of batteries 100, 400, 600, 800, air electrodes discussed with reference to FIGS. 10-12 and 20-25B, current collectors discussed with reference to FIGS. 13A-E, stacks of batteries discussed with reference to FIGS. 5A, 5B, 14A-D, and 15-19, etc.), singularly or in various combinations. The LODES system 2704 may be electrically connected to one or more transmission facilities 2706. In this manner, the LODES system 2704 may operate in a "standalone" manner to arbiter energy around market prices and/or to avoid transmission constraints. The LODES system 2704 may be electrically connected to one or more transmission facilities 2706. The transmission facilities 2706 may be electrically connected to the grid 2708. The LODES system 2704 may store power received from the transmission facilities 2706. The LODES system 2704 may output stored power to the transmission facilities 2706. The transmission facilities 2706 may output power received from the LODES system 2704 to the grid 2708 and/or may receive power from the grid 2708 and output that power to the LODES system 2704.

Together the LODES system 2704 and the transmission facilities 2706 may constitute a power plant 3000. As an example, the power plant 3000 may be situated downstream of a transmission constraint, close to electrical consumption. In such an example downstream situated power plant 3000, the LODES system 2704 may have a duration of 24 h to 500 h and may undergo one or more full discharges a year to support peak electrical consumptions at times when the transmission capacity is not sufficient to serve customers. Additionally, in such an example downstream situated power plant 3000, the LODES system 2704 may undergo several shallow discharges (daily or at higher frequency) to arbiter the difference between nighttime and daytime electricity prices and reduce the overall cost of electrical service to customer. As a further example, the power plant 3000 may be situated upstream of a transmission constraint, close to electrical generation. In such an example upstream situated power plant 3000, the LODES system 2704 may have a duration of 24 h to 500 h and may undergo one or more full charges a years to absorb excess generation at times when the transmission capacity is not sufficient to distribute the electricity to customers. Additionally, in such an example upstream situated power plant 3000, the LODES system 2704 may undergo several shallow charges and discharges (daily or at higher frequency) to arbiter the difference between nighttime and daytime electricity prices and maximize the value of the output of the generation facilities.

Figure 31:
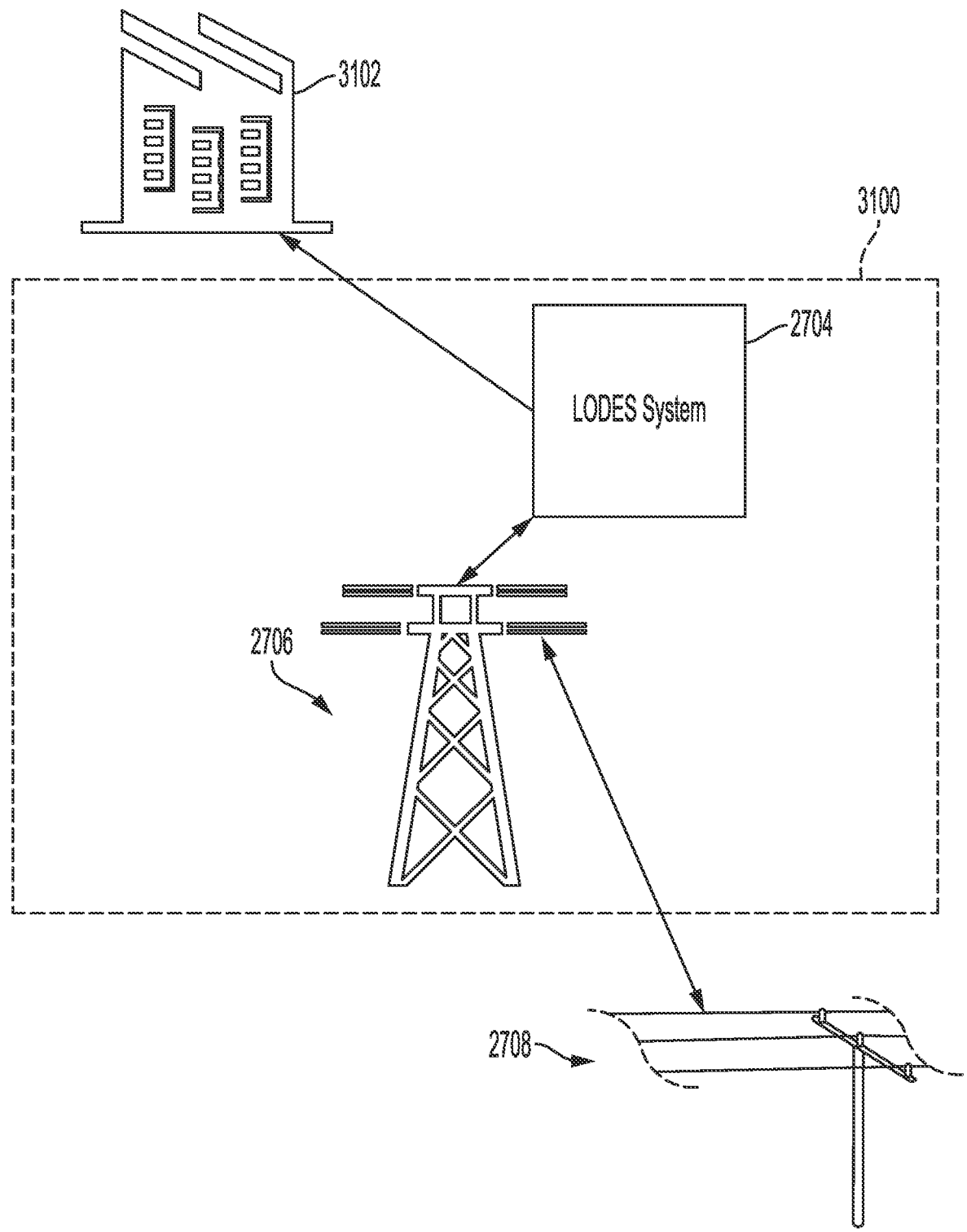

FIG. 31 illustrates an example system in which one or more aspects of the various embodiments may be used as part of bulk energy storage system. As a specific example, the bulk energy storage system incorporating one or more aspects of the various embodiments may be a LODES system 2704. As an example, the LODES system 2704 may include any of the various embodiment batteries, components of batteries, and/or stacks of batteries described herein (e.g., any of batteries 100, 400, 600, 800, air electrodes discussed with reference to FIGS. 10-12 and 20-25B, current collectors discussed with reference to FIGS. 13A-E, stacks of batteries discussed with reference to FIGS. 5A, 5B, 14A-D, and 15-19, etc.), singularly or in various combinations. The LODES system 2704 may be electrically connected to a commercial and industrial (C&I) customer 3102, such as a data center, factory, etc. The LODES system 2704 may be electrically connected to one or more transmission facilities 2706. The transmission facilities 2706 may be electrically connected to the grid 2708. The transmission facilities 2706 may receive power from the grid 2708 and output that power to the LODES system 2704. The LODES system 2704 may store power received from the transmission facilities 2706. The LODES system 2704 may output stored power to the C&I customer 3102. In this manner, the LODES system 2704 may operate to reshape electricity purchased from the grid 2708 to match the consumption pattern of the C&I customer 3102.

Together, the LODES system 2704 and transmission facilities 2706 may constitute a power plant 3100. As an example, the power plant 3100 may be situated close to electrical consumption, i.e., close to the C&I customer 3102, such as between the grid 2708 and the C&I customer 3102. In such an example, the LODES system 2704 may have a duration of 24 h to 500 h and may buy electricity from the markets and thereby charge the LODES system 2704 at times when the electricity is cheaper. The LODES system 2704 may then discharge to provide the C&I customer 3102 with electricity at times when the market price is expensive, therefore offsetting the market purchases of the C&I customer 3102. As an alternative configuration, rather than being situated between the grid 2708 and the C&I customer 3102, the power plant 3100 may be situated between a renewable source, such as a PV farm, wind farm, etc., and the transmission facilities 2706 may connect to the renewable source. In such an alternative example, the LODES system 2704 may have a duration of 24 h to 500 h, and the LODES system 2704 may charge at times when renewable output may be available. The LODES system 2704 may then discharge to provide the C&I customer 3102 with renewable generated electricity so as to cover a portion, or the entirety, of the C&I customer 3102 electricity needs.

Figure 32:
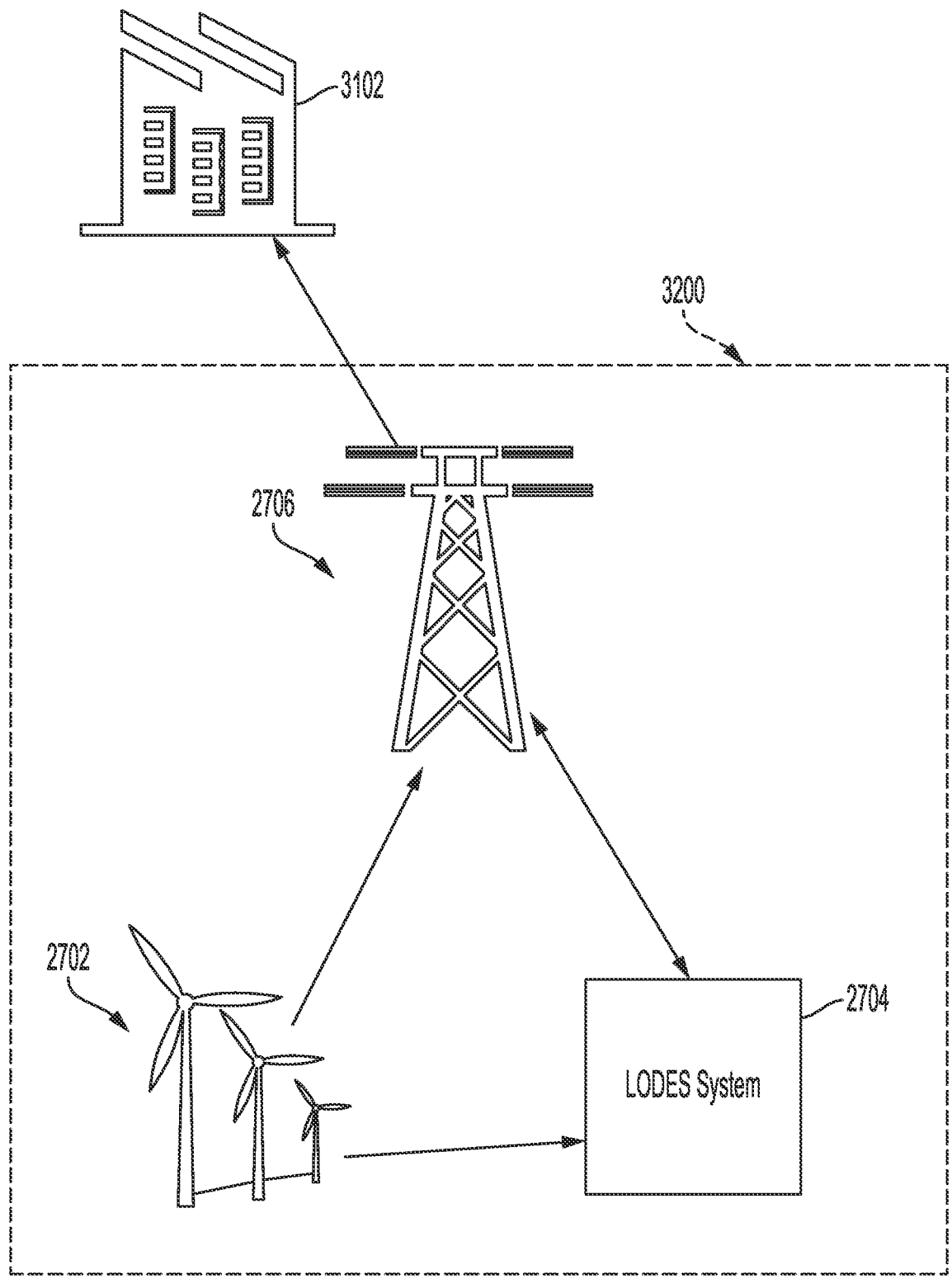

FIG. 32 illustrates an example system in which one or more aspects of the various embodiments may be used as part of bulk energy storage system. As a specific example, the bulk energy storage system incorporating one or more aspects of the various embodiments may be a LODES system 2704. As an example, the LODES system 2704 may include any of the various embodiment batteries, components of batteries, and/or stacks of batteries described herein (e.g., any of batteries 100, 400, 600, 800, air electrodes discussed with reference to FIGS. 10-12 and 20-25B, current collectors discussed with reference to FIGS. 13A-E, stacks of batteries discussed with reference to FIGS. 5A, 5B, 14A-D, and 15-19, etc.), singularly or in various combinations. The LODES system 2704 may be electrically connected to a wind farm 2702 and one or more transmission facilities 2706. The wind farm 2702 may be electrically connected to the transmission facilities 2706. The transmission facilities 2706 may be electrically connected to a C&I customer 3102. The wind farm 2702 may generate power and the wind farm 2702 may output generated power to the LODES system 2704 and/or the transmission facilities 2706. The LODES system 2704 may store power received from the wind farm 2702. The LODES system 2704 may output stored power to the transmission facilities 2706. The transmission facilities 2706 may output power received from one or both of the wind farm 2702 and LODES system 2704 to the C&I customer 3102. Together the wind farm 2702, the LODES system 2704, and the transmission facilities 2706 may constitute a power plant 3200 that may be a combined power generation, transmission, and storage system. The power generated by the wind farm 2702 may be directly fed to the C&I customer 3102 through the transmission facilities 2706, or may be first stored in the LODES system 2704. In certain cases the power supplied to the C&I customer 3102 may come entirely from the wind farm 2702, entirely from the LODES system 2704, or from a combination of the wind farm 2702 and the LODES system 2704. The LODES system 2704 may be used to reshape the electricity generated by the wind farm 2702 to match the consumption pattern of the C&I customer 3102. In one such example, the LODES system 2704 may have a duration of 24 h to 500 h and may charge when renewable generation by the wind farm 2702 exceeds the C&I customer 3102 load. The LODES system 2704 may then discharge when renewable generation by the wind farm 2702 falls short of C&I customer 3102 load so as to provide the C&I customer 3102 with a firm renewable profile that offsets a fraction, or all of, the C&I customer 3102 electrical consumption.

Figure 33:
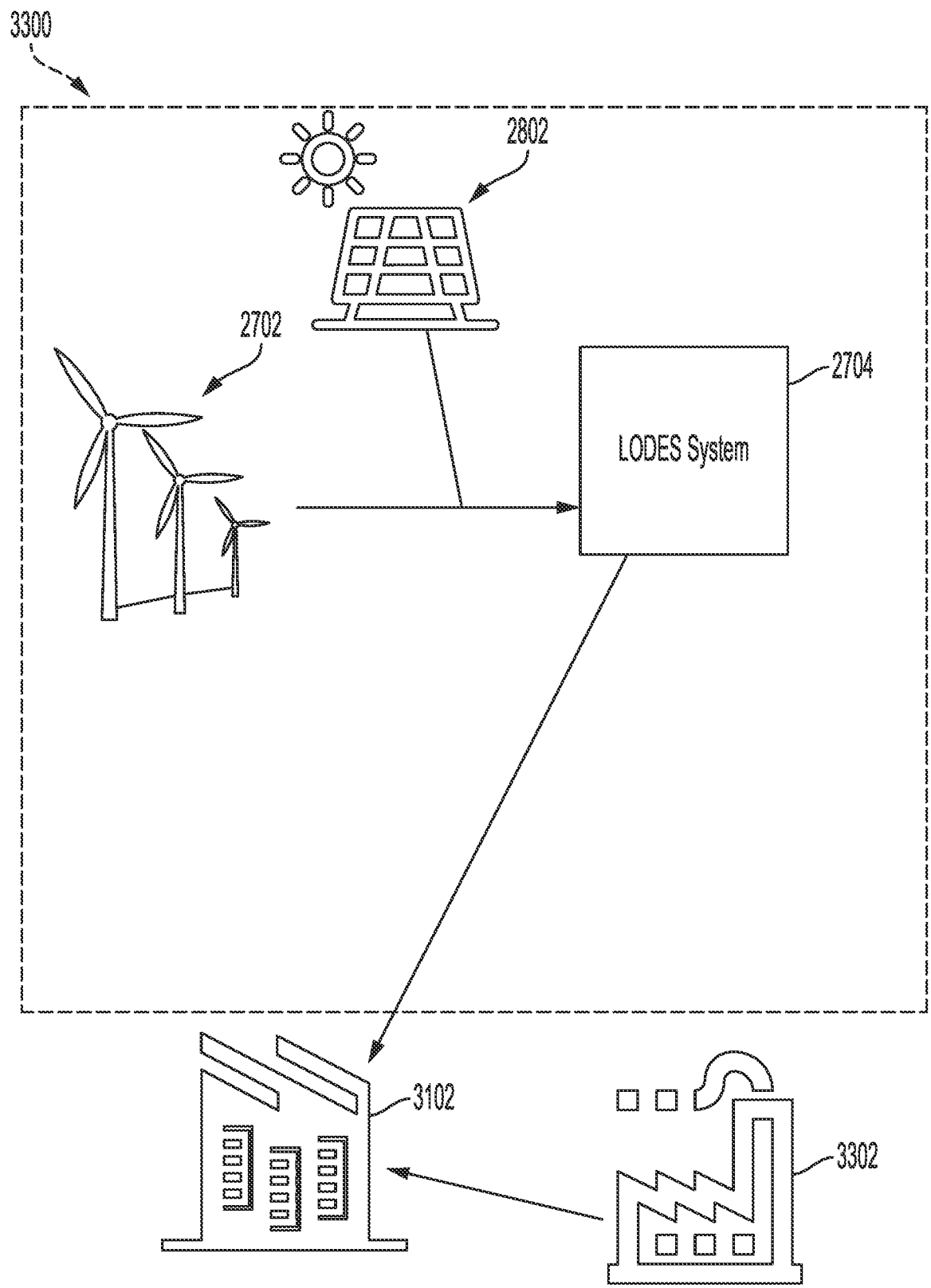

FIG. 33 illustrates an example system in which one or more aspects of the various embodiments may be used as part of bulk energy storage system. As a specific example, the bulk energy storage system incorporating one or more aspects of the various embodiments may be a LODES system 2704. As an example, the LODES system 2704 may include any of the various embodiment batteries, components of batteries, and/or stacks of batteries described herein (e.g., any of batteries 100, 400, 600, 800, air electrodes discussed with reference to FIGS. 10-12 and 20-25B, current collectors discussed with reference to FIGS. 13A-E, stacks of batteries discussed with reference to FIGS. 5A, 5B, 14A-D, and 15-19, etc.), singularly or in various combinations. The LODES system 2704 may be part of a power plant 3300 that is used to integrate large amounts of renewable generation in microgrids and harmonize the output of renewable generation by, for example a PV farm 2802 and wind farm 2702, with existing thermal generation by, for example a thermal power plant 3302 (e.g., a gas plant, a coal plant, a diesel generator set, etc., or a combination of thermal generation methods), while renewable generation and thermal generation supply the C&I customer 3102 load at high availability. Microgrids, such as the microgrid constituted by the power plant 3300 and the thermal power plant 3302, may provide availability that is 90% or higher. The power generated by the PV farm 2802 and/or the wind farm 2702 may be directly fed to the C&I customer 3102, or may be first stored in the LODES system 2704. In certain cases the power supplied to the C&I customer 3102 may come entirely from the PV farm 2802, entirely from the wind farm 2702, entirely from the LODES system 2704, entirely from the thermal power plant 3302, or from any combination of the PV farm 2802, the wind farm 2702, the LODES system 2704, and/or the thermal power plant 3302. As examples, the LODES system 2704 of the power plant 3300 may have a duration of 24 h to 500 h. As a specific example, the C&I customer 3102 load may have a peak of 100 MW, the LODES system 2704 may have a power rating of 14 MW and duration of 150 h, natural gas may cost $6/million British thermal units (MMBTU), and the renewable penetration may be 58%. As another specific example, the C&I customer 3102 load may have a peak of 100 MW, the LODES system 2704 may have a power rating of 25 MW and duration of 150 h, natural gas may cost $8/MMBTU, and the renewable penetration may be 65%.

Figure 34:
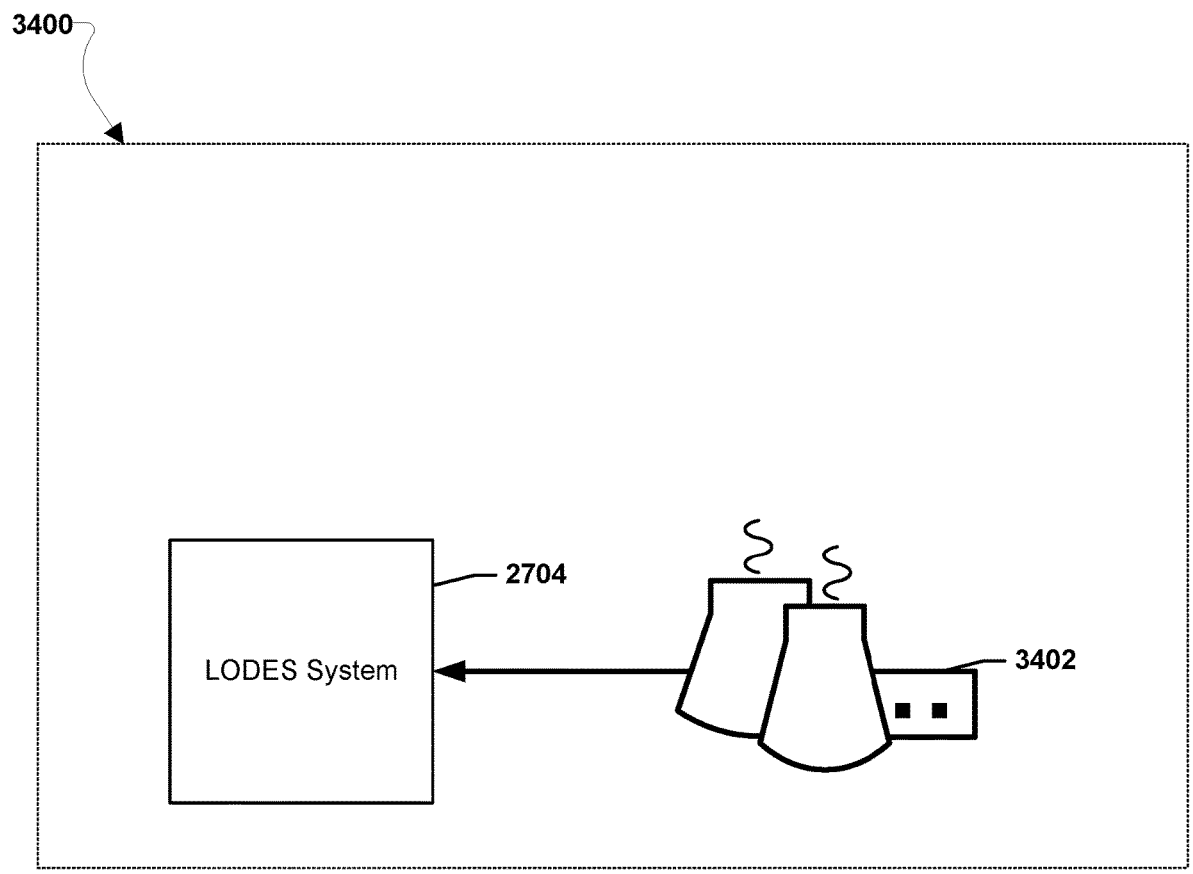

FIG. 34 illustrates an example system in which one or more aspects of the various embodiments may be used as part of bulk energy storage system. As a specific example, the bulk energy storage system incorporating one or more aspects of the various embodiments may be a LODES system 2704. As an example, the LODES system 2704 may include any of the various embodiment batteries, components of batteries, and/or stacks of batteries described herein (e.g., any of batteries 100, 400, 600, 800, air electrodes discussed with reference to FIGS. 10-12 and 20-25B, current collectors discussed with reference to FIGS. 13A-E, stacks of batteries discussed with reference to FIGS. 5A, 5B, 14A-D, and 15-19, etc.), singularly or in various combinations. The LODES system 2704 may be used to augment a nuclear plant 3402 (or other inflexible generation facility, such as a thermal, a biomass, etc., and/or any other type plant having a ramp-rate lower than 50% of rated power in one hour and a high capacity factor of 80% or higher) to add flexibility to the combined output of the power plant 3400 constituted by the combined LODES system 2704 and nuclear plant 3402. The nuclear plant 3402 may operate at high capacity factor and at the highest efficiency point, while the LODES system 2704 may charge and discharge to effectively reshape the output of the nuclear plant 3402 to match a customer electrical consumption and/or a market price of electricity. As examples, the LODES system 2704 of the power plant 3400 may have a duration of 24 h to 500 h. In one specific example, the nuclear plant 3402 may have 1,000 MW of rated output and the nuclear plant 3402 may be forced into prolonged periods of minimum stable generation or even shutdowns because of depressed market pricing of electricity. The LODES system 2704 may avoid facility shutdowns and charge at times of depressed market pricing; and the LODES system 2704 may subsequently discharge and boost total output generation at times of inflated market pricing.

Figure 35:
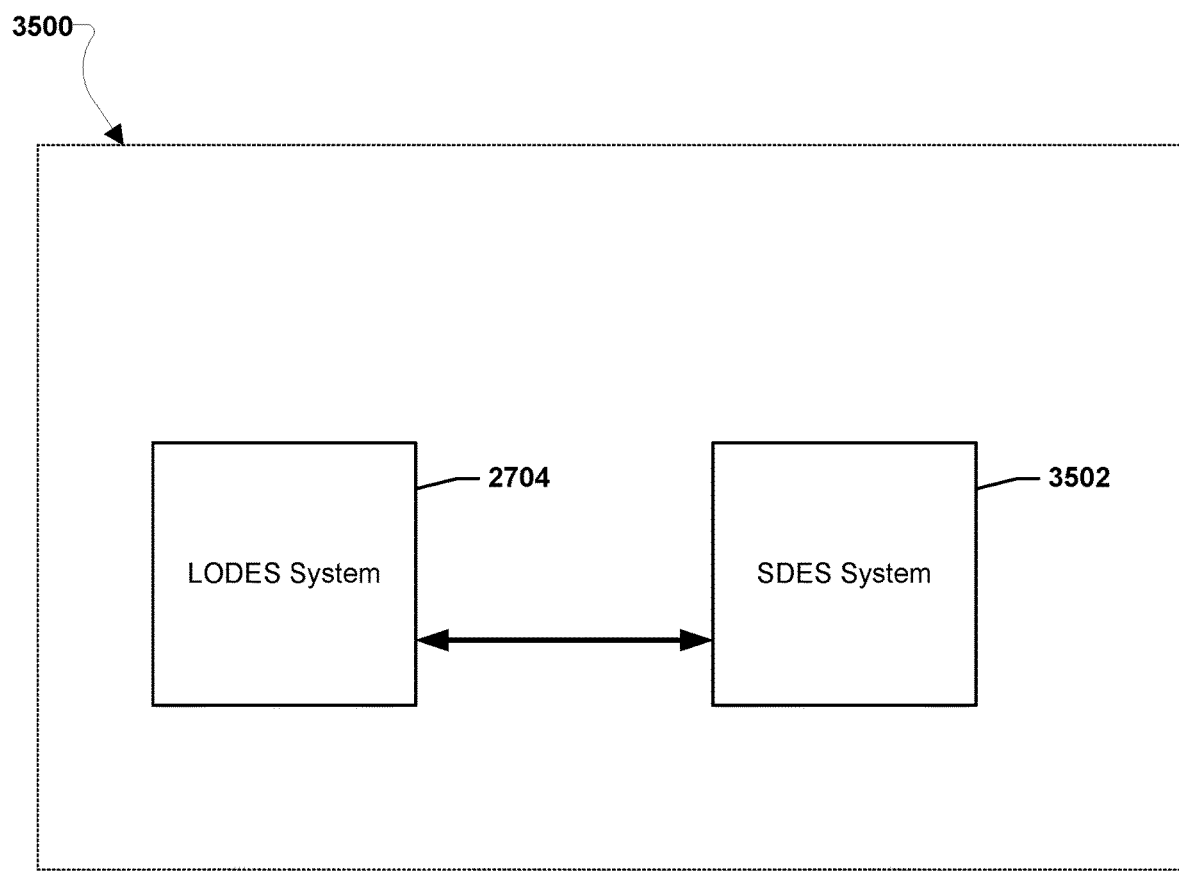

FIG. 35 illustrates an example system in which one or more aspects of the various embodiments may be used as part of bulk energy storage system. As a specific example, the bulk energy storage system incorporating one or more aspects of the various embodiments may be a LODES system 2704. As an example, the LODES system 2704 may include any of the various embodiment batteries, components of batteries, and/or stacks of batteries described herein (e.g., any of batteries 100, 400, 600, 800, air electrodes discussed with reference to FIGS. 10-12 and 20-25B, current collectors discussed with reference to FIGS. 13A-E, stacks of batteries discussed with reference to FIGS. 5A, 5B, 14A-D, and 15-19, etc.), singularly or in various combinations. The LODES system 2704 may operate in tandem with a SDES system 3502. Together the LODES system 2704 and SDES system 3502 may constitute a power plant 3500. As an example, the LODES system 2704 and SDES system 3502 may be co-optimized whereby the LODES system 2704 may provide various services, including long-duration back-up and/or bridging through multi-day fluctuations (e.g., multi-day fluctuations in market pricing, renewable generation, electrical consumption, etc.), and the SDES system 3502 may provide various services, including fast ancillary services (e.g. voltage control, frequency regulation, etc.) and/or bridging through intra-day fluctuations (e.g., intra-day fluctuations in market pricing, renewable generation, electrical consumption, etc.). The SDES system 3502 may have durations of less than 10 hours and round-trip efficiencies of greater than 80%. The LODES system 2704 may have durations of 24 h to 500 h and round-trip efficiencies of greater than 40%. In one such example, the LODES system 2704 may have a duration of 150 hours and support customer electrical consumption for up to a week of renewable under-generation. The LODES system 2704 may also support customer electrical consumption during intra-day under-generation events, augmenting the capabilities of the SDES system 3502. Further, the SDES system 3502 may supply customers during intra-day under-generation events and provide power conditioning and quality services such as voltage control and frequency regulation.

The foregoing method descriptions are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not necessarily intended to limit the order of the steps; these words may be used to guide the reader through the description of the methods. Further, any reference to claim elements in the singular, for example, using the articles "a," "an" or "the" is not to be construed as limiting the element to the singular.

Further, any step of any embodiment described herein can be used in any other embodiment. The preceding description of the disclosed aspects is provided to enable any person skilled in the art to make or use the present invention. Various modifications to these aspects will be readily apparent to those skilled in the art, and the generic principles defined herein may be applied to other aspects without departing from the scope of the invention. Thus, the present invention is not intended to be limited to the aspects shown herein but is to be accorded the widest scope consistent with the principles and novel features disclosed herein.

What is claimed is:

1. A stack of electric batteries, comprising:
    a series of unit cells arranged in stacked layers, wherein the stacked layers are stacked successively relative to one another such that a first stacked layer and second stacked layer are opposite side outer most stacked layers with any other stacked layers therebetween,
    wherein, prior to an initial charge and an initial discharge of the unit cell, each unit cell comprises:
        a bed of metal pellets; and
        an air electrode,
    wherein each stacked layer of unit cells is fluidly connected such that electrolyte from the first stacked layer flows to the second stacked layer, and
    wherein the air electrode of each unit cell is connected to load bearing bus bars fixing a height of the air electrode relative to the electrolyte in that unit cell and wherein the load bearing bus bars are configured to meet mechanical support requirements for that unit cell.

2. The stack of claim 1, wherein the first stacked layer consists of less unit cells than the second stacked layer.

* * * * *